United States Patent
Takagi et al.

(10) Patent No.: US 6,766,234 B2
(45) Date of Patent: Jul. 20, 2004

(54) OCCUPANT RESTRAINT SYSTEM AND OCCUPANT RESTRAINT METHOD

(75) Inventors: Hideo Takagi, Yokohama (JP); Hiromichi Ikumo, Chigasaki (JP)

(73) Assignee: Nissan Motor Co., Ltd., Kanagawa (JP)

( * ) Notice: Subject to any disclaimer, the term of this patent is extended or adjusted under 35 U.S.C. 154(b) by 26 days.

(21) Appl. No.: 10/316,825

(22) Filed: Dec. 12, 2002

(65) Prior Publication Data

US 2003/0114973 A1 Jun. 19, 2003

(30) Foreign Application Priority Data

Dec. 14, 2001 (JP) .......... 2001-381193
Sep. 25, 2002 (JP) .......... 2002-279179

(51) Int. Cl.$^7$ .......... B60R 22/00; B60R 21/32
(52) U.S. Cl. .......... 701/45; 701/46; 280/806
(58) Field of Search .......... 701/45, 46, 47; 280/735, 805, 806, 807, 808; 242/374; 180/282

(56) References Cited

U.S. PATENT DOCUMENTS 5,995,892 A * 11/1999 Kiribayashi et al. .......... 701/45
6,213,510 B1 * 4/2001 Suyama .......... 280/805

FOREIGN PATENT DOCUMENTS

JP 9-132113 5/1997

* cited by examiner

Primary Examiner—Tan Q. Nguyen
(74) Attorney, Agent, or Firm—McDermott Will & Emery LLP

(57) ABSTRACT

An occupant restraint system comprises a seat belt tension application device; a longitudinal acceleration detector; a lateral acceleration detector; and a control device that controls the tension applied by the seat belt tension application device based upon a longitudinal acceleration detection value and a lateral acceleration detection value and the control device engages the seat belt tension application device to apply the tension to the seat belt if a point on the map determined in conformance to the longitudinal acceleration detection value and the lateral acceleration detection value obtained as the vehicle decelerates is outside a range enclosed by the operation decision-making threshold line and the other axis.

25 Claims, 55 Drawing Sheets

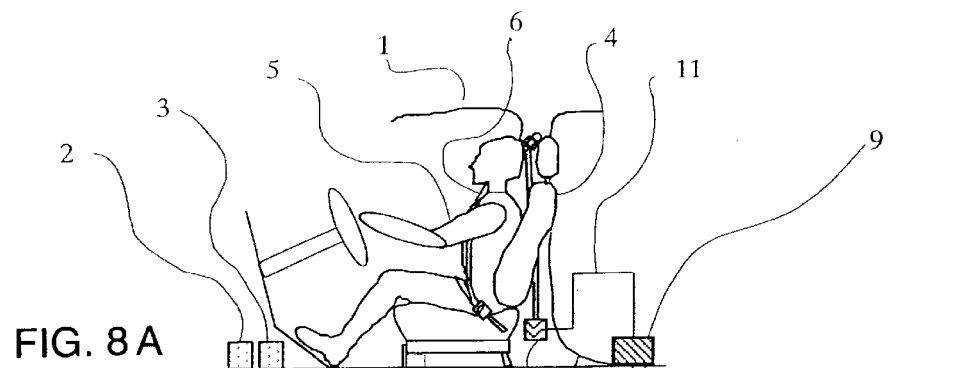
FIG. 8A DURING NORMAL DRIVING OPERATION
ACCELERATION MANIFESTING ALONG BRAKING DIRECTION
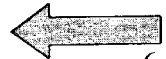
ACCELERATION MANIFESTING ALONG BRAKING DIRECTION
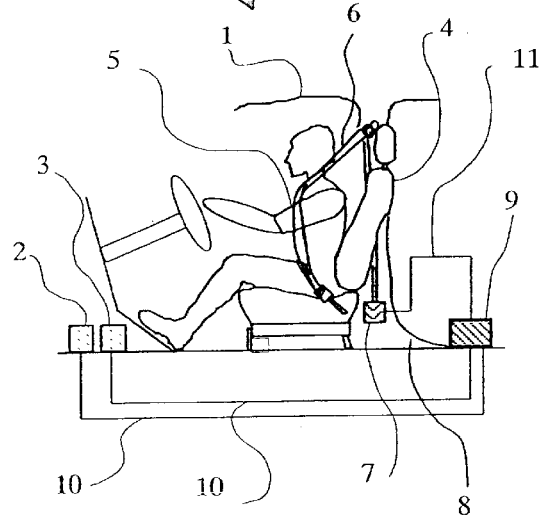
DURING BRAKING OPERATION
FIG. 8B
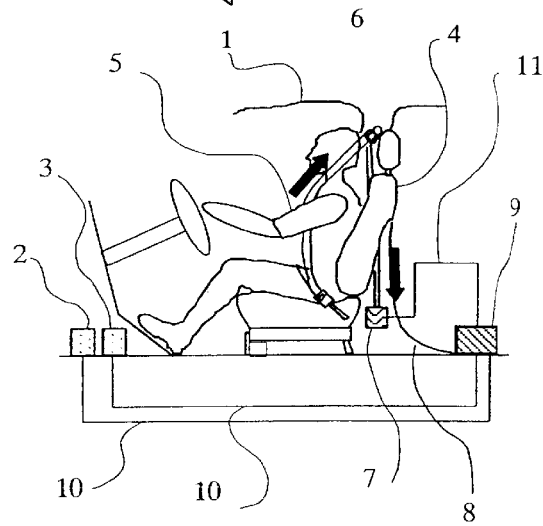
SEAT BELT TENSION APPLICATION DURING BRAKING OPERATION
FIG. 8C

DURING NORMAL DRIVING OPERATION

ACCELERATION MANIFESTING ALONG LEFT/RIGHT DIRECTION

DURING TURNING OPERATION

ACCELERATION MANIFESTING ALONG LEFT/RIGHT DIRECTION

SEAT BELT TENSION APPLICATION DURING TURNING OPERATION

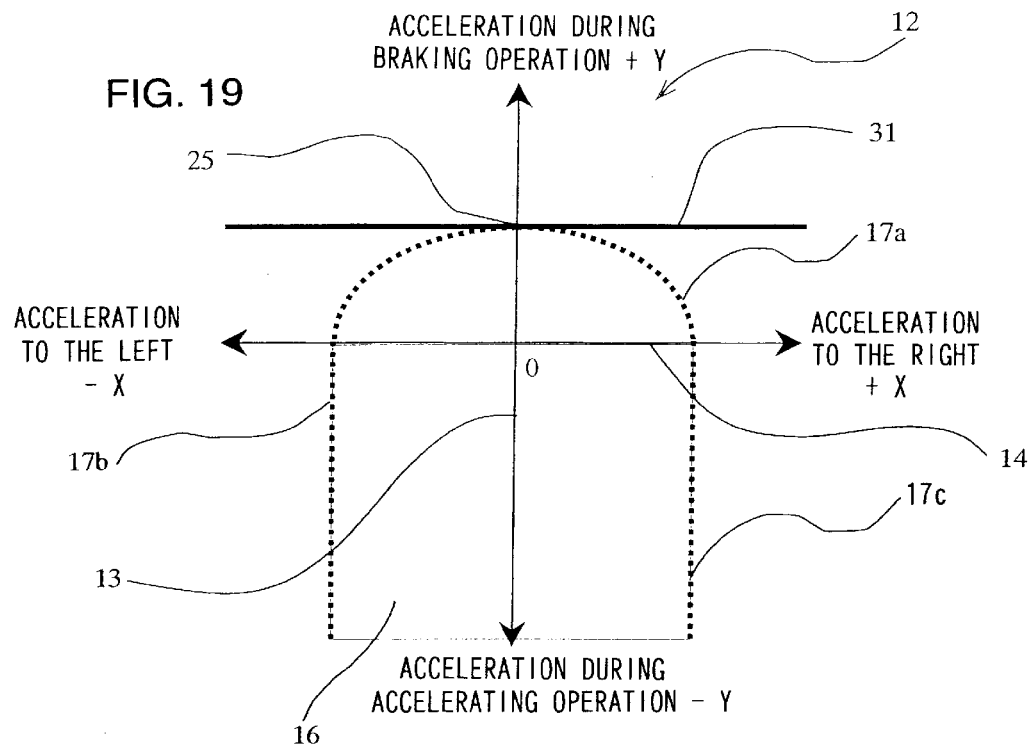
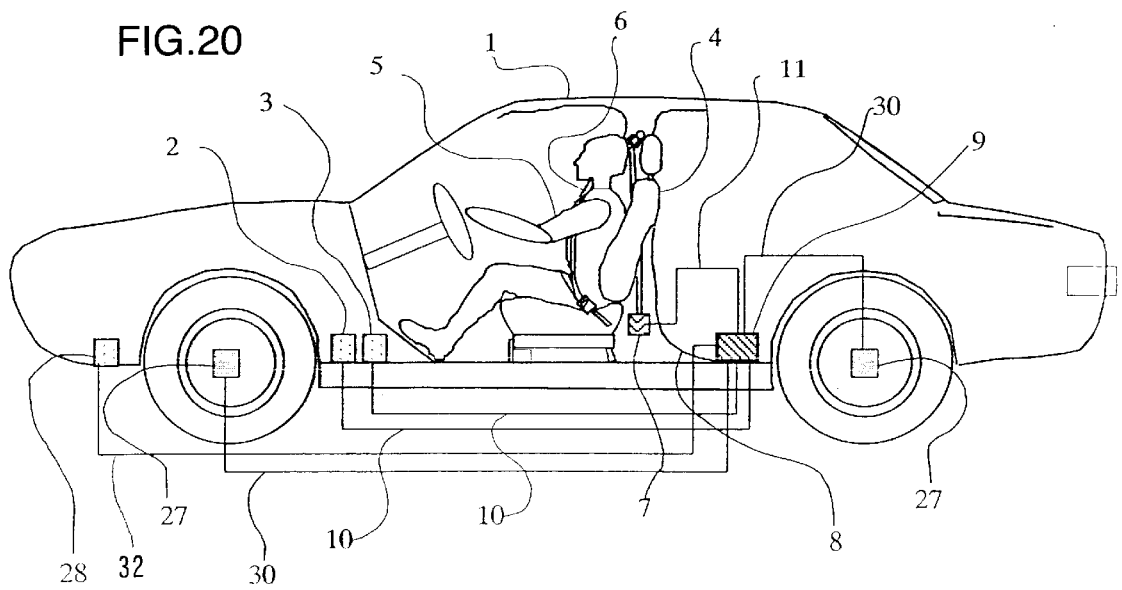

DURING NORMAL DRIVING OPERATION

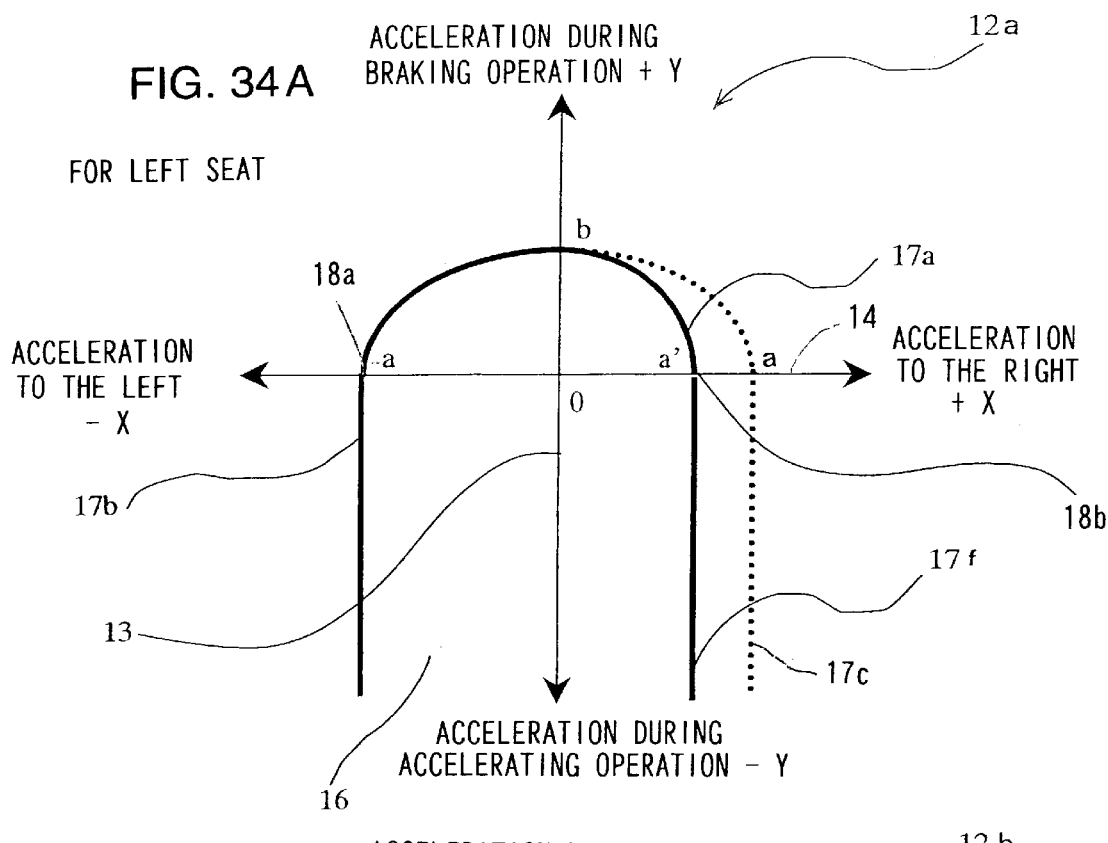
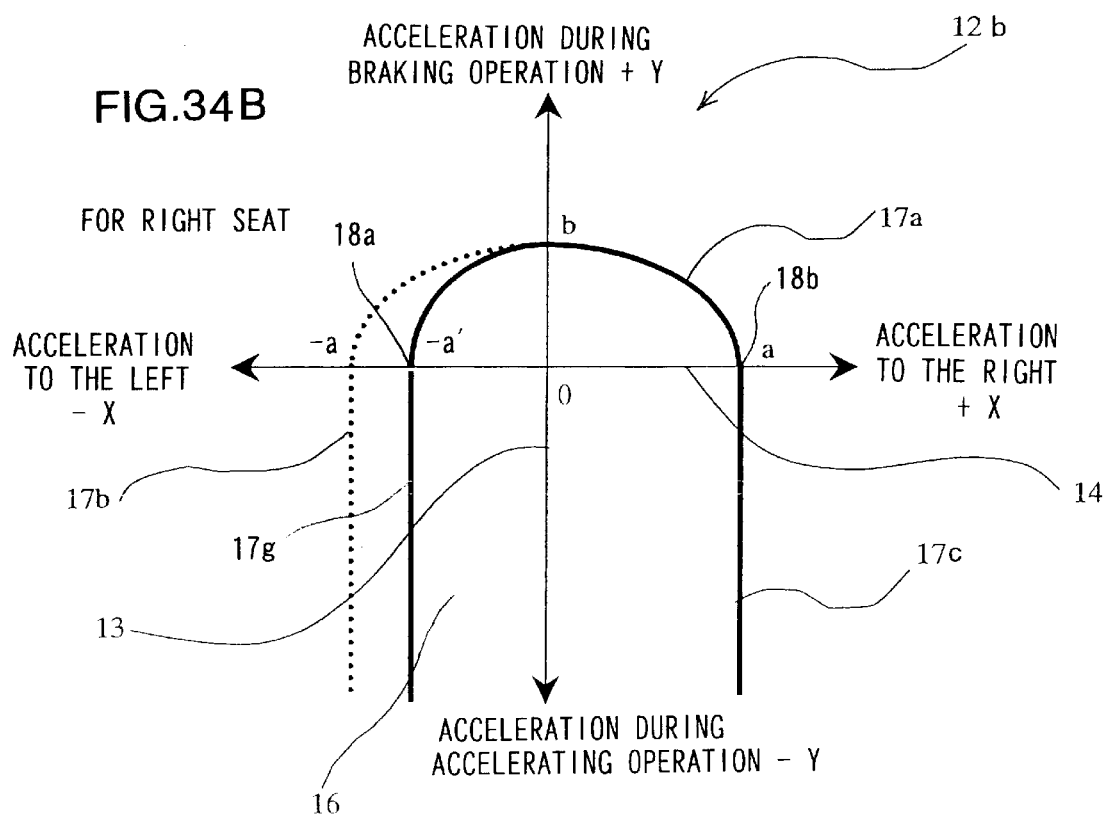

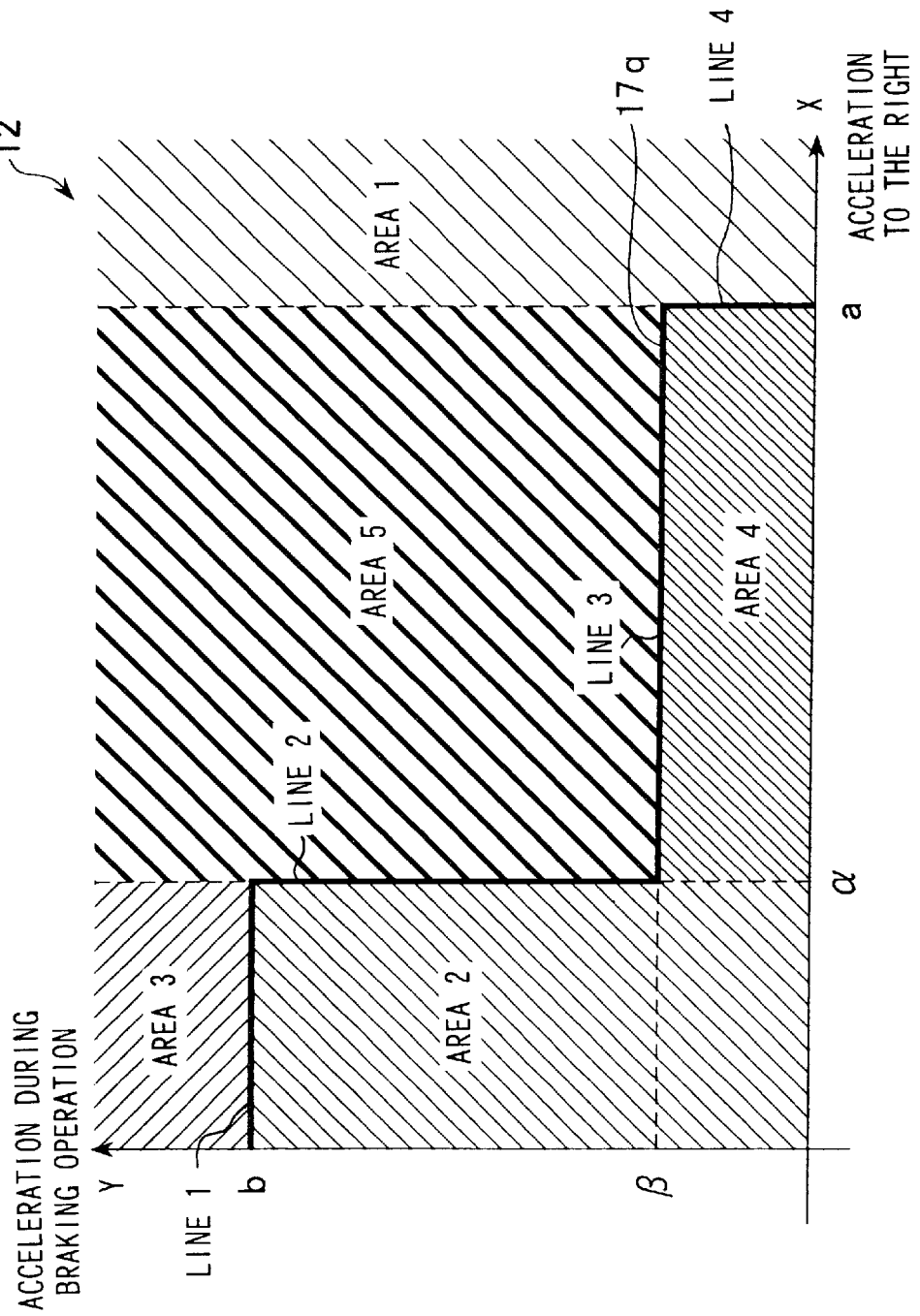

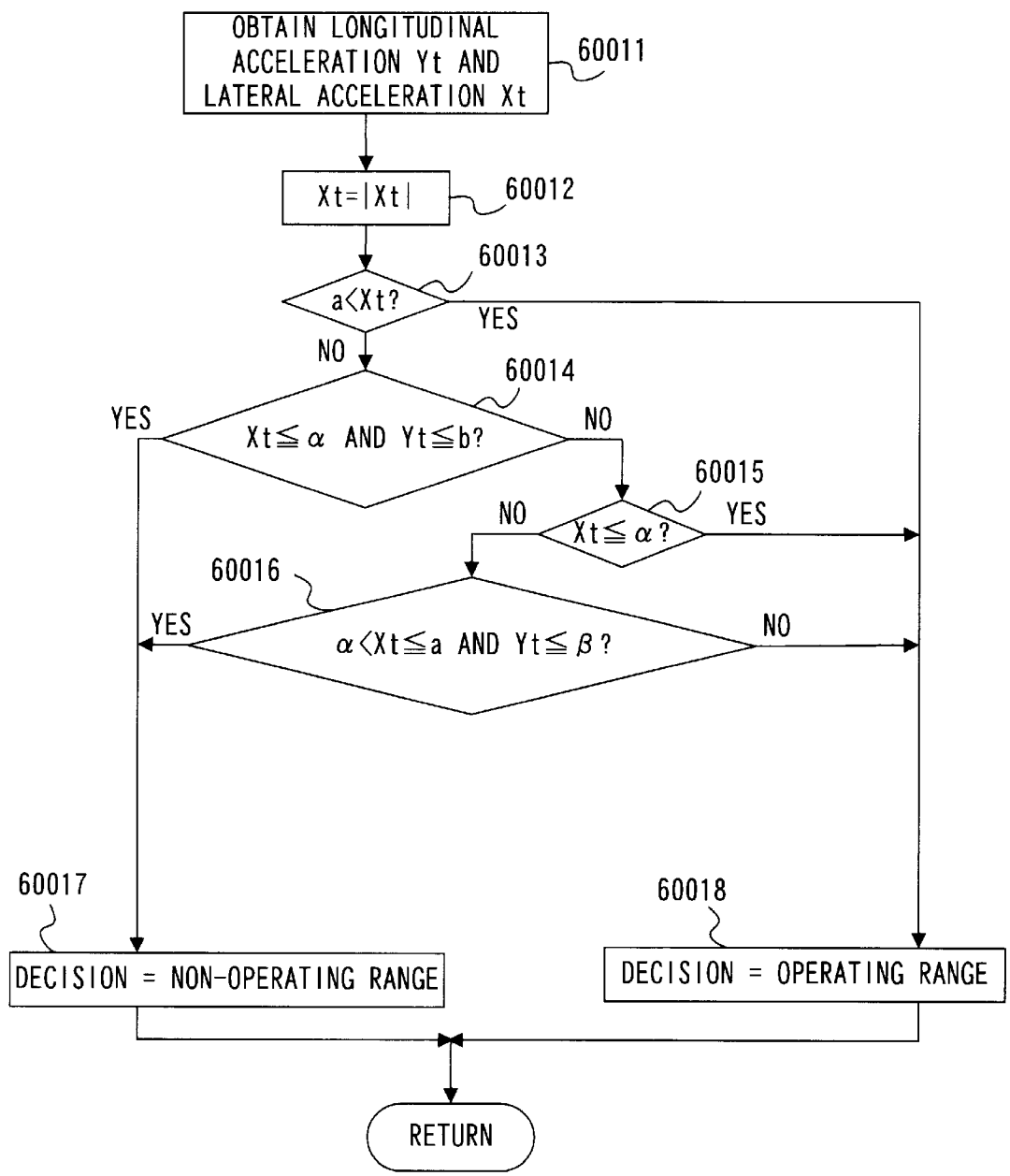

OCCUPANT RESTRAINT SYSTEM AND OCCUPANT RESTRAINT METHOD

BACKGROUND OF THE INVENTION

1. Field of the Invention

The present invention relates to a system and method that restrain a vehicle occupant with a seat belt.

2. Description of the Related Art

Occupant restraint systems in the known art include the system disclosed in Japanese Laid-Open Patent Publication No. H 09-132113. This occupant restraint system judges the condition manifesting between the vehicle and an object present ahead of the vehicle based upon the results of a detection of the object by an object detection sensor and adjusts the tension of a seat belt with an electric motor in conformance to the condition manifesting between the vehicle and the object. In addition, there is a mechanical lock device in the related art that prevents the seat belt from being drawn out if the vehicle undergoes a deceleration to an extent equal to or greater than a predetermined value through emergency braking or the like. Another mechanical lock device in the related art prevents a seat belt from feeding out if it is pulled abruptly.

In addition, there are occupant restraint systems in the related art that detect that the vehicle is currently traveling in a turn along a winding road by utilizing a steering angle sensor or the like when there is another vehicle approaching from the opposite direction on the other side of the winding road as the vehicle travels with its wheels turned on the outer side of the winding road, and adjust the tension of the seat belt.

SUMMARY OF THE INVENTION

However, the occupant restraint systems that detects an object present ahead of the vehicle with an object detection sensor described above is bound to be costly.

In the mechanical seat belt lock devices described above, factors such as play in the lock mechanism, slack in the seat belt as it is being taken up, stretching of the seat belt itself and slack in the seat belt as it is fastened are present. For this reason, the upper body of the occupant moves forward for a while even after the seat belt is locked, and thus, it is difficult to restrain the upper body of the occupant with a high degree of reliability at an early stage. This gives rise to a problem in that it is difficult to give the occupant a restricting feeling effectively.

It is desirable that the present invention provides an occupant restraint system that restrains an occupant of a vehicle in an effective manner with a seat belt.

An occupant restraint system comprises a seat belt tension application device that adjusts tension applied to a seat belt to restrain an occupant with the seat belt, a longitudinal acceleration detector that detects a longitudinal acceleration occurring in a vehicle along a longitudinal direction, a lateral acceleration detector that detects a lateral acceleration occurring in the vehicle along a lateral direction, and a control device that controls the tension applied by the seat belt tension application device based upon a longitudinal acceleration detection value detected by the longitudinal acceleration detector and a lateral acceleration detection value detected by the lateral acceleration detector. A two-dimensional map, with a deceleration (negative acceleration) occurring in the vehicle along the longitudinal direction set on a + side of one of two axes orthogonally intersecting each other in a two-dimensional coordinate system, an acceleration of the vehicle occurring along the longitudinal direction set on a − side of the one axis, an acceleration of the vehicle to a right set on a + side of the other axis in the two-dimensional coordinate system and an acceleration of the vehicle to a left set on a − side of the other axis, is provided, and an operation decision-making threshold line, which forms one of a semi-elliptic shape and a polygonal shape, intersects the other axis on the + side at A, intersects the other axis on the − side at −A and intersects the one axis on the + side at +B satisfying B<A, is set in a first quadrant and a second quadrant of the map. The control device engages the seat belt tension application device to apply the tension to the seat belt if a point on the map determined in conformance to the longitudinal acceleration detection value and the lateral acceleration detection value obtained as the vehicle decelerates is outside a range enclosed by the operation decision-making threshold line and the other axis.

An occupant restraint system comprises a seat belt tension application device that adjusts tension applied to a seat belt to restrain an occupant with the seat belt, a longitudinal acceleration detector that detects a longitudinal acceleration occurring in a vehicle along a longitudinal direction, a lateral acceleration detector that detects a lateral acceleration occurring in the vehicle along a lateral direction, and a control device that controls the tension applied by the seat belt tension application device based upon a longitudinal acceleration detection value detected by the longitudinal acceleration detector and a lateral acceleration detection value detected by the lateral acceleration detector. An XY two-dimensional map, with a deceleration (negative acceleration) of the vehicle occurring along the longitudinal direction set on a +Y axis, an acceleration of the vehicle occurring along the longitudinal direction set on a −Y axis, an acceleration of the vehicle to a right set on a +X axis and an acceleration of the vehicle to a left set on a −X axis, is provided, and a first operation decision-making threshold line, which forms one of a semi-elliptic shape and a polygonal shape, intersects the +X axis at A, intersects the −X axis at −A and intersects the +Y axis at +B satisfying B<A, is set in a first quadrant and a second quadrant of the map. The control device engages the seat belt tension application device to apply the tension to the seat belt if a point on the map determined in conformance to the longitudinal acceleration detection value and the lateral acceleration detection value obtained as the vehicle decelerates is outside a range enclosed by the first operation decision-making threshold line and the X axis.

An occupant restraint system comprises a seat belt tension application device that adjusts tension applied to a seat belt to restrain an occupant with the seat belt, a longitudinal acceleration detector that detects a longitudinal acceleration occurring in a vehicle along a longitudinal direction, a lateral acceleration detector that detects a lateral acceleration occurring in the vehicle along a lateral direction, and a control device that controls the tension applied by the seat belt tension application device based upon a longitudinal acceleration detection value detected by the longitudinal acceleration detector and a lateral acceleration detection value detected by the lateral acceleration detector. An XY two-dimensional map, with a deceleration (negative acceleration) of the vehicle occurring along the longitudinal direction set on a +Y axis, an acceleration of the vehicle occurring along the longitudinal direction set on a −Y axis, an acceleration of the vehicle to a right set on a +X axis and an acceleration of the vehicle to a left set on a −X axis, is provided, and an operation decision-making threshold line, which forms a substantial semi-elliptic shape achieved by connecting a plurality of quadratic curves at a plurality of inflection points intersects the +X axis at A, intersects the −X axis at −A and intersects the +Y axis at +B satisfying B<A, is set in a first quadrant and a second quadrant of the map. The control device engages the seat belt tension application device to apply the tension to the seat belt if a point on the map determined in conformance to the longitudinal acceleration detection value and the lateral acceleration detection value obtained as the vehicle decelerates is outside a range enclosed by the semi-elliptic operation decision-making threshold line and the X axis.

An occupant restraint system comprises a seat belt tension application device that adjusts tension applied to a seat belt to restrain an occupant with the seat belt, a longitudinal acceleration detector that detects a longitudinal acceleration occurring in a vehicle along a longitudinal direction, a lateral acceleration detector that detects a lateral acceleration occurring in the vehicle along a lateral direction, and a control device that controls the tension applied by the seat belt tension application device based upon a longitudinal acceleration detection value detected by the longitudinal acceleration detector and a lateral acceleration detection value detected by the lateral acceleration detector. An XY two-dimensional map, with a deceleration (negative acceleration) of the vehicle occurring along the longitudinal direction set on a +Y axis, an acceleration of the vehicle occurring along the longitudinal direction set on a −Y axis, an acceleration of the vehicle to a right set on a +X axis and an acceleration of the vehicle to a left set on a −X axis, is provided, and an operation decision-making threshold line, which forms a polygonal shape achieved by connecting a plurality of sides at, at least, one inflection point intersects the +X axis at A, intersects the −X axis at −A and intersects the +Y axis at +B satisfying B<A, is set in a first quadrant and a second quadrant of the map. The control device engages the seat belt tension application device to apply the tension to the seat belt if a point on the map determined in conformance to the longitudinal acceleration detection value and the lateral acceleration detection value obtained as the vehicle decelerates is outside a range enclosed by the polygonal operation decision-making threshold line and the X axis.

An occupant restraint system comprises a seat belt tension application means for adjusting tension applied to a seat belt to restrain an occupant with the seat belt, a longitudinal acceleration detection means for detecting a longitudinal acceleration occurring in a vehicle along a longitudinal direction, a lateral acceleration detection means for detecting a lateral acceleration occurring in the vehicle along a lateral direction, and a control means for controlling the tension applied by the seat belt tension application means based upon a longitudinal acceleration detection value detected by the longitudinal acceleration detection means and a lateral acceleration detection value detected by the lateral acceleration detection means. A two-dimensional map, with a deceleration (negative acceleration) occurring in the vehicle along the longitudinal direction set on a + side of one of two axes orthogonally intersecting each other in a two-dimensional coordinate system, an acceleration of the vehicle occurring along the longitudinal direction set on a − side of the one axis, an acceleration of the vehicle to a right set on a + side of the other axis in the two-dimensional coordinate system and an acceleration of the vehicle to a left set on a − side of the other axis, is provided, and an operation decision-making threshold line connecting an intersecting point +A at which the other axis is intersected on the + side, an intersecting point −A at which the other axis is intersected on the − side and an intersecting point +B satisfying B<A at which the one axis is intersected on the + side is set in a first quadrant and a second quadrant of the map. The control means engages the seat belt tension application means to apply the tension to the seat belt if a point on the map determined in conformance to the longitudinal acceleration detection value and the lateral acceleration detection value obtained as the vehicle decelerates is outside a range enclosed by the operation decision-making threshold line and the other axis.

An occupant restraint method achieved by using a two-dimensional map, with a deceleration (negative acceleration) of a vehicle occurring along a longitudinal direction set on a + side of one of two axes orthogonally intersecting each other in a two-dimensional coordinate system, an acceleration of the vehicle occurring along the longitudinal direction set on a − side of the one axis, an acceleration of the vehicle to a right set on a + side of the other axis in the two-dimensional coordinate system and an acceleration of the vehicle to a left set on a − side of the other axis, in which a semi-elliptic or polygonal decision-making threshold line intersecting the other axis on the + side at A, intersecting the other axis on the − side at −A and intersecting the one axis on the + side at +B satisfying B<A is set, comprises detecting an acceleration of the vehicle occurring along the longitudinal direction; detecting an acceleration of the vehicle occurring along the lateral direction; and applying tension to a seat belt so as to restrain an occupant when a point on the map determined in conformance to a longitudinal acceleration detection value and a lateral acceleration detection value obtained as the vehicle decelerates is outside a range enclosed by the operation decision-making threshold line and the other axis.

BRIEF DESCRIPTION OF THE DRAWINGS

FIGS. 8A~8C show the state of the driver viewed from a side as the brakes are applied in the vehicle;

FIG. 19 shows a tension application decision-making map used when the vehicle speed is low;

FIG. 20 shows the structure adopted in a fourth embodiment;

FIG. 34A shows the left-side seat tension application decision-making map;

FIG. 34B shows the right-side seat tension application decision-making map;

FIG. 57 shows an enlargement of the first quadrant of the map in FIG. 56; and

FIG. 58 presents a flowchart of the operating range/non-operating range decision-making subroutine executed in the fourteenth embodiment.

DESCRIPTION OF THE PREFERRED EMBODIMENTS (First Embodiment)

Figure 1:
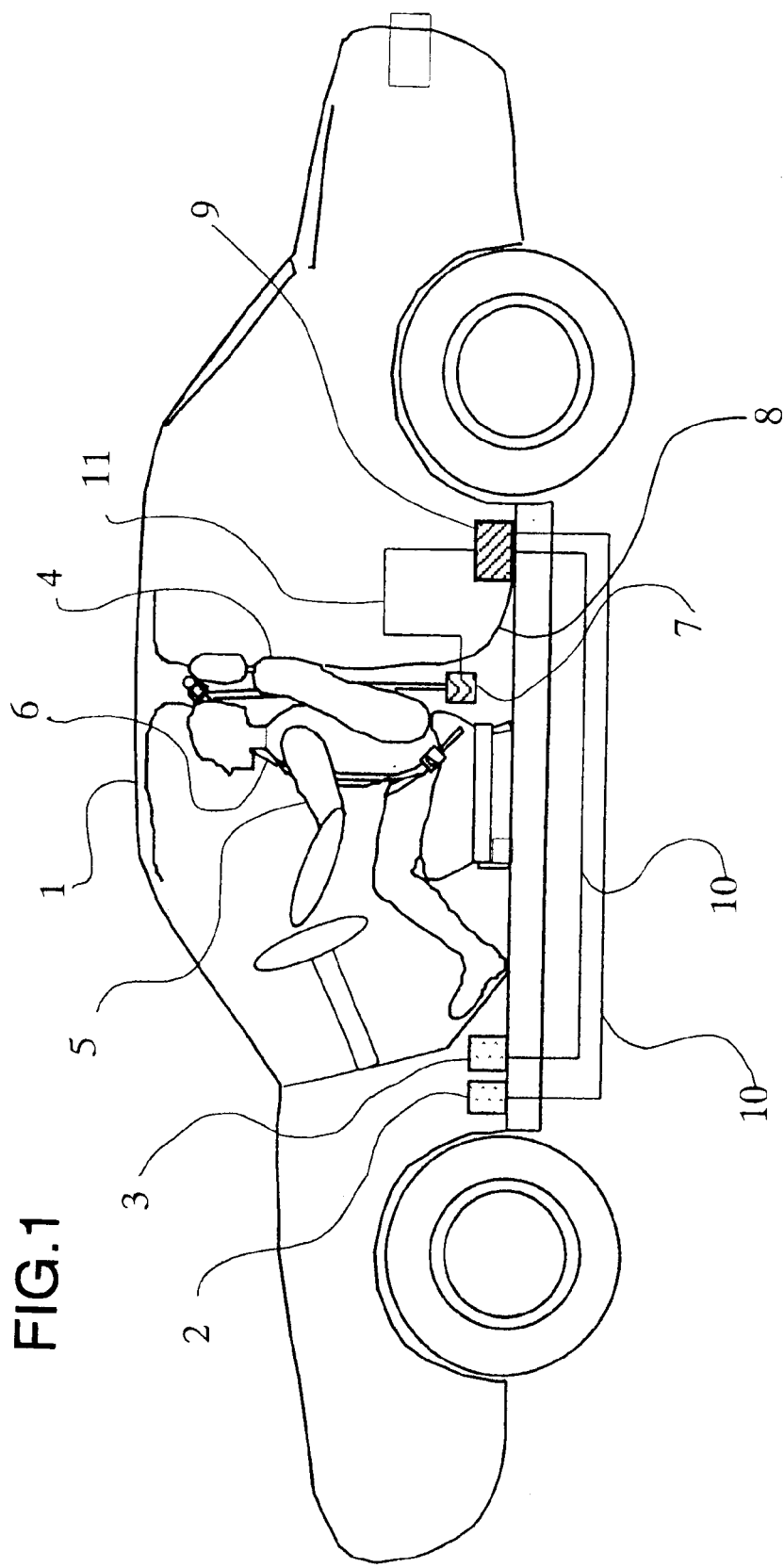
FIG. 1 shows the structure adopted in a first embodiment.

The first embodiment of the present invention is now explained in reference to FIGS. 1~10. FIG. 1 shows the structure adopted in the occupant restraint system achieved in the first embodiment. A vehicle 1 is mounted with a longitudinal acceleration sensor 2 that detects an acceleration of the vehicle occurring along the forward/backward direction and a vehicle lateral acceleration sensor 3 that detects an acceleration of the vehicle to the left or right. A reversible seat belt tension application mechanism 7 capable of freely taking up and delivering a seat belt 6 for restraining an occupant 5 is mounted either at the body of the vehicle 1 or an interior component of the vehicle 1 such as a seat 4. To be more specific, the reversible seat belt tension application mechanism 7 is mounted at the base of a central pillar 8 of the vehicle 1.

It is to be noted that the reversible seat belt tension application mechanism 7 may instead be provided at an ELR (emergency locking retractor) seat belt which rotates a pulley with a motor to allow the seat belt to be taken up and delivered. Alternatively, the reversible seat belt tension application mechanism 7 may be provided at a reversible buckle pre-tensioner that is installed to retract the inner buckle portion of the seat belt. In this embodiment, the explanation is given to the reversible seat belt tension application mechanism 7 which is provided at the center pillar 8.

As shown in FIG. 1, a controller 9 is provided to judge the timing with which the seat belt 6 is retracted, the tension of the seat belt 6 and the retracting speed at which the seat belt 6 is retracted based upon acceleration detection signals provided from the acceleration sensors 2 and 3 and generate an operation signal to be provided to the reversible seat belt tension application mechanism 7. In addition a harness 10 that communicates the signals from the acceleration sensors 2 and 3 to the controller 9 and a harness 11 that communicates the signal from the controller 9 to the reversible seat belt tension application mechanism 7 are provided. While the power to the vehicle 1 is on, the acceleration sensors 2 and 3 constantly detect acceleration of the vehicle along the longitudinal direction (forward and backward) and acceleration of the vehicle along the lateral direction (to the left and right) and the results of the detection are communicated to the controller 9 via the harness 10. The controller 9 is internally provided with a storage device and a CPU and engages in an arithmetic operation over constant sampling intervals.

Figure 2:
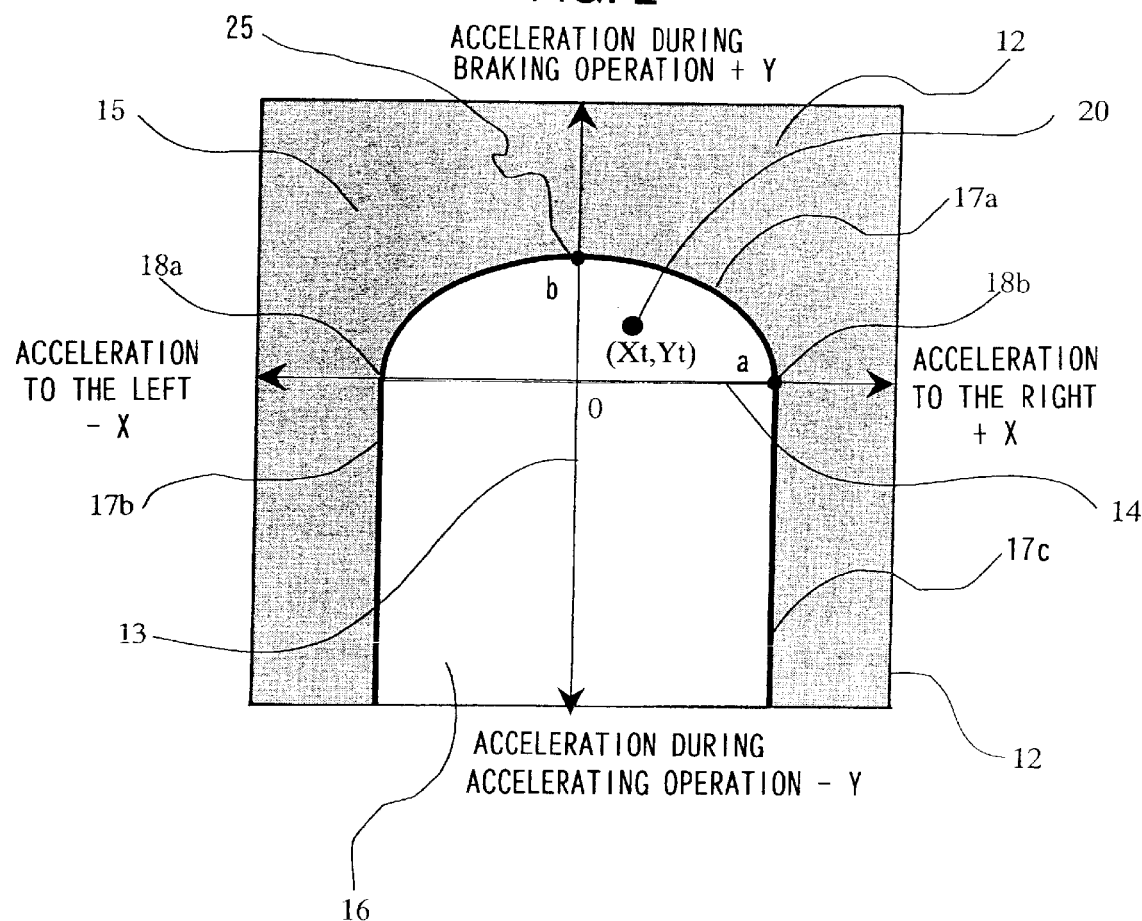
FIG. 2 presents an example of the tension application decision-making map used in the first embodiment.

As shown in FIG. 2, the controller 9 stores in memory a specific map 12 which is used to define the operating range and the non-operating range of the reversible seat belt tension application mechanism 7. In the map 12, the acceleration of the vehicle in the longitudinal direction is set along the vertical axis (Y axis) 13 and the acceleration of the vehicle in the lateral direction (to the left or right) is set along the horizontal axis (X axis) 14. The upper side (+Y direction) of the vertical axis 13 represents the deceleration (negative acceleration) of the vehicle 1 that occurs as the vehicle 1 is braked (decelerating), whereas the lower side (−Y direction) of the vertical axis 13 represents the acceleration occurring as the vehicle 1 increases speed. The right side (+X direction) of the horizontal axis 14 in the map 12 represents the acceleration occurring as the vehicle 1 is turned to the left, i.e., the acceleration of the vehicle to the right, whereas the left side (−X direction) of the horizontal axis 14 represents the acceleration of the vehicle 1 occurring as the vehicle 1 is turned to the right, i.e., the acceleration of the vehicle to the left.

In the map 12, operation decision-making threshold lines 17a, 17b and 17c for defining an operating range 15 and a non-operating range 16 are set. With the operating decision-making threshold lines 17a, 17b and 17c, the operating range 15 over which the reversible seat belt tension application mechanism 7 is engaged in operation to apply tension to the seat belt 6 and the non-operating range 16 over which the reversible seat belt tension application mechanism 7 is not engaged in operation and thus, the application of tension to the seat belt 6 is disallowed are set.

In the first quadrant and the second quadrant of the map 12, the semi-elliptic decision-making threshold line 17a (a first operation decision-making threshold line) with its major axis aligned with the horizontal axis (X axis) 14 i.e., the axis representing acceleration to the left or right, is set.

In the third quadrant of the map 12, the operation decision-making threshold line 17b (a second operation decision-making threshold line) is set as a straight line satisfying X=−a, with X indicating the intersecting value 18a at which the semi-elliptic operation decision-making threshold line 17a intersects the horizontal axis. Likewise, in the fourth quadrant, the operation decision-making threshold line 17c (a third operation decision-making threshold line) is set as a straight line satisfying X=a with X indicating the intersecting value 18b at which the semi-elliptic operation decision-making threshold line 17a intersects the horizontal axis. In other words, the operation decision-making threshold lines 17a, 17b and 17c are set on the map 12 so as to form an inverted U. The area outside the operation decision-making threshold lines 17a, 17b and 17c is defined as the operating range 15 of the reversible seat belt tension application mechanism 7, whereas the area enclosed by the operation decision-making threshold lines 17a, 17b and 17c is defined as the non-operating range 16 of the reversible seat belt tension application mechanism 7.

During a braking (decelerating) operation of the vehicle 1, tension is applied to the seat belt 6 by the reversible seat belt tension application mechanism 7 if the point on the map 12, which is determined by the acceleration of the vehicle along the forward/backward direction and the acceleration of the vehicle to the left/right, is outside the range enclosed by the semi ecliptic operation decision-making threshold line 17a and the X axis. During an accelerating operation of the vehicle 1, tension is applied to the seat belt 6 by the reversible seat belt tension application mechanism 7 if the lateral acceleration of the vehicle is outside the range enclosed by the rectilinear operation decision-making threshold lines 17b and 17c and the X axis.

Figure 3:
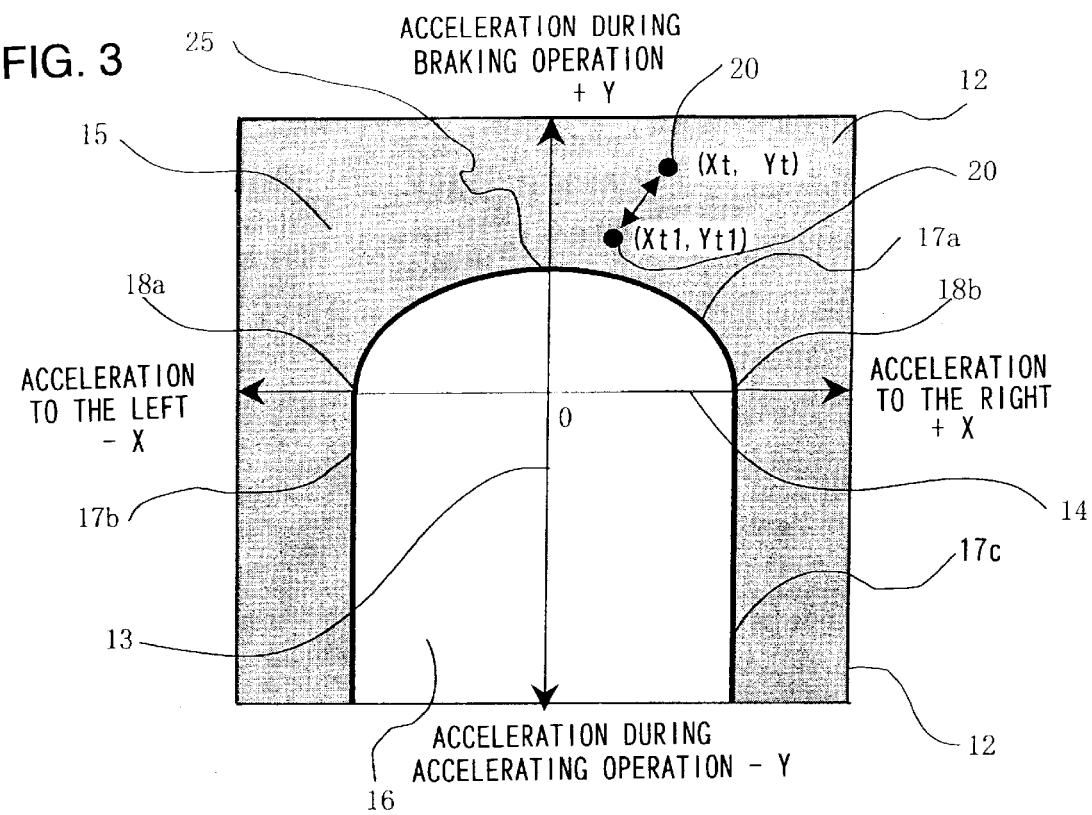
FIG. 3 shows a change in the vehicle acceleration in the tension application decision-making map.

In addition, the controller 9 calculates an acceleration change rate $\Delta L$ for the vehicle 1. As shown in FIG. 3, Xt represents the lateral acceleration of the vehicle at a time point t and Yt represents the longitudinal acceleration of the vehicle (along the forward/backward direction) at the same time point t on the map 12. By using these two variables Xt and Yt, a single acceleration indicator point 20 which indicates the level of the acceleration and the direction along which the vehicle is accelerated at the time point t can be plotted on the map 12. Likewise, by definition, Xt1 and Yt1 respectively represent the lateral acceleration of the vehicle and the longitudinal acceleration of the vehicle at a time point preceding the current time point t by a single time step in the microcomputer. By using these four variables, the shift rate of the acceleration indicator point 20 on the map 12, i.e., the acceleration change rate $\Delta L$ of the vehicle 1, is calculated through the formula presented in (expression 1), as shown in FIG. 3.

$$\Delta L = \frac{\sqrt{(Xt - Xt1)^2 + (Yt - Yt1)^2}}{\Delta t} \quad \text{(expression 1)}$$

with $\Delta t$ in the expression above representing the length of time required for a single time step in the microcomputer.

In addition, the controller 9 stores in memory a first acceleration change rate threshold value $\Delta Gcr1$ and a second acceleration change rate threshold value $\Delta Gcr2$ belonging in the same unit system as the acceleration change rate $\Delta L$. Using these two acceleration change rate threshold values $\Delta Gcr1$ and $\Delta Gcr2$ and the acceleration change rate $\Delta L$, the controller 9 selects an operating mode for the reversible seat belt tension application mechanism 7. When the controller 9 transmits an operation signal to the reversible seat belt tension application mechanism 7, a decision is made as to the setting for the level of tension to be applied to the seat belt 6 and the setting for the retracting speed of the seat belt. The method adopted to make this decision, and the retracting tension setting and the retracting speed setting are to be detailed later.

Figure 4:
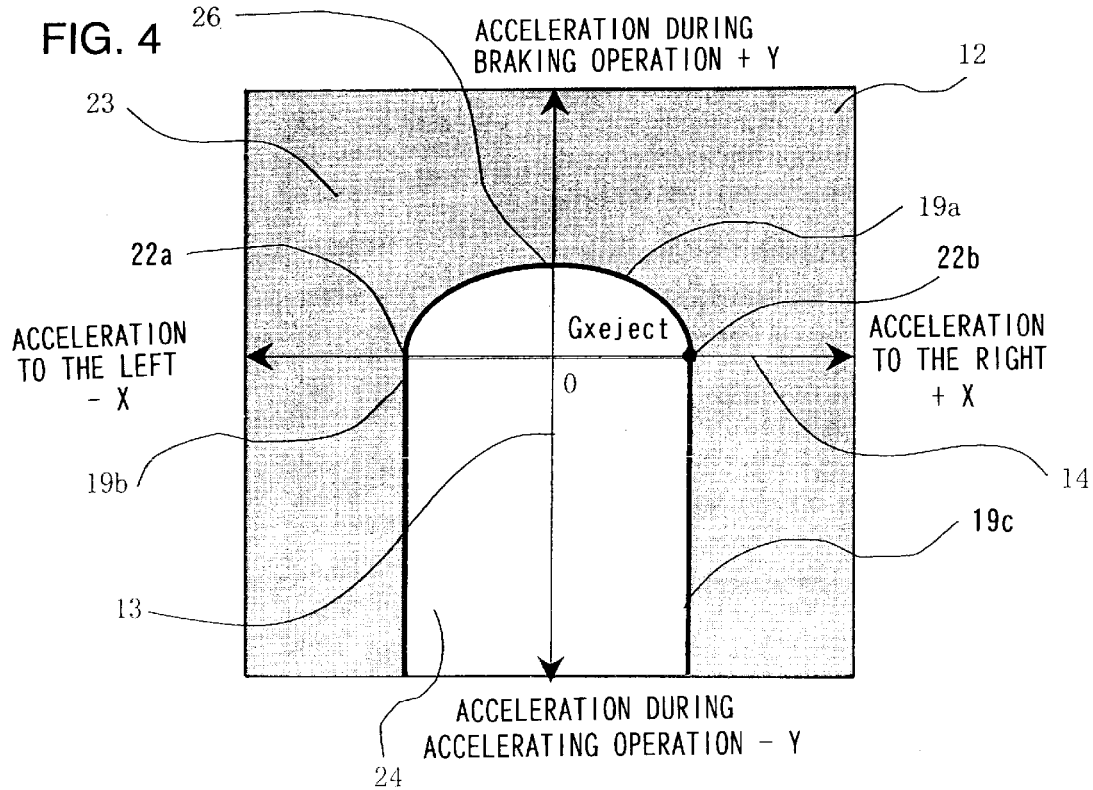
FIG. 4 presents an example of the tension release decision-making map used in the first embodiment.

Also, as shown in FIG. 4, release decision-making threshold lines 19a, 19b and 19c used for determining the timing with which the retraction force of the seat belt 6 is released, eliminating the tension applied to the seat belt 6 after the reversible seat belt tension application mechanism 7 is engaged in operation are set on the map 12. The release decision-making threshold lines 19a, 19b and 19c are different from the operation decision-making threshold lines 17a, 17b and 17c.

As shown in FIG. 4, in the first quadrant and the second quadrant of the map 12, the semi-elliptic release decision-making threshold line 19a with its major axis aligned with the horizontal axis (X axis) i.e., the axis representing lateral acceleration, is set.

In addition, in the third quadrant of the map 12, the release decision-making threshold line 19b is set as a straight line satisfying X=−Gxeject (22a), with X indicating the intersecting value at which the semi-elliptic release decision-making threshold line 19a intersects the horizontal axis. Likewise, in the fourth quadrant, the release decision-making threshold line 19c is set as a straight line satisfying X=Gxeject (22b) with X indicating the intersecting value at which the semi-elliptic release decision-making threshold line 19a intersects the horizontal axis. In other words, the release decision-making threshold line 19a, 19b and 19c are set on the map 12 so as to form an inverted U. The area outside the release decision-making threshold lines 19a, 19b and 19c is defined as an operation sustaining range 23 of the reversible seat belt tension application mechanism 7, and area enclosed by the release decision-making threshold lines 19a, 19b and 19c is defined as a release range 24 of the reversible seat belt tension application mechanism 7.

Figure 5:
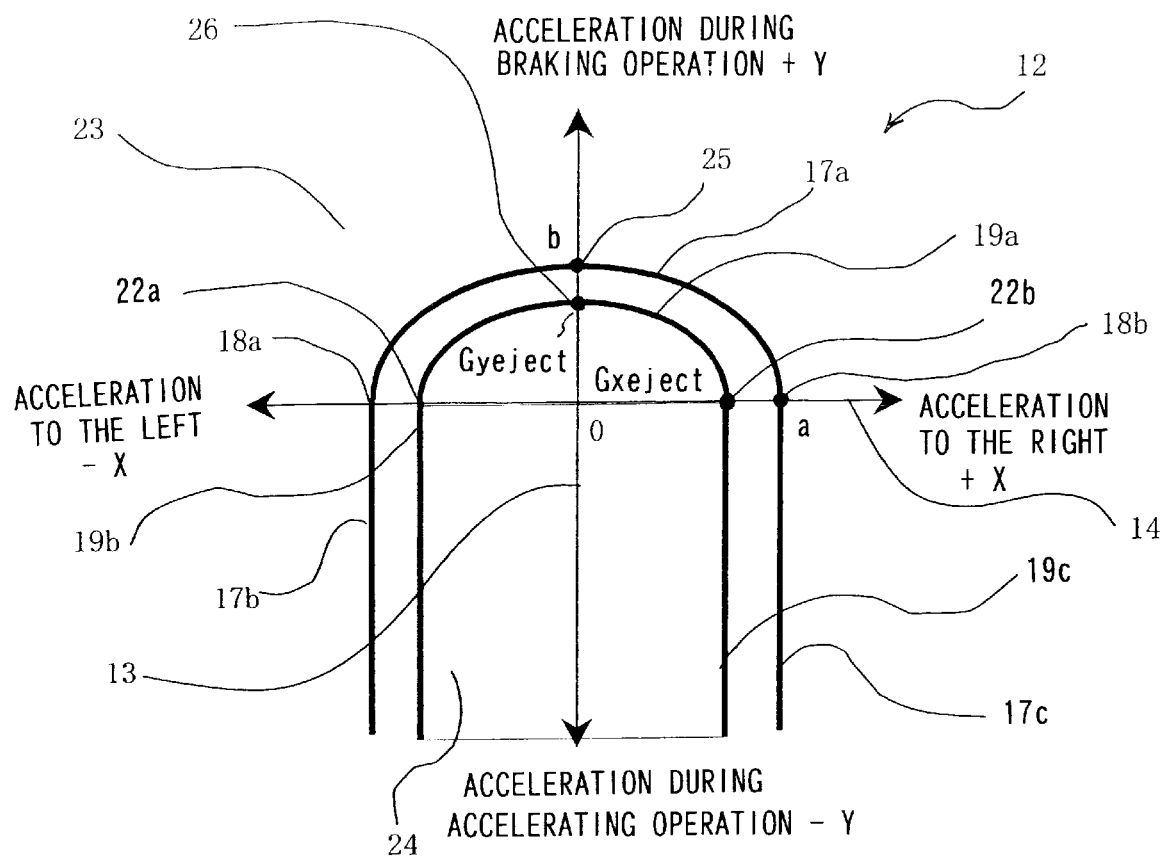
FIG. 5 shows a tension application decision-making map and the tension release decision-making map in the first embodiment superimposed on each other.

As shown in FIG. 5, the intersecting value a (18b) at which the semi-elliptic operation decision-making threshold line 17a intersects the horizontal axis and the intersecting value Gxeject (22b) at which the release decision-making threshold line 19a intersects the horizontal axis must satisfy the following relationship.

$$Gxeject \leq a \qquad \text{(expression 2)}$$

Furthermore, the intersecting value b (25) at which the operation decision-making threshold line 17a intersects the vertical axis (Y axis), i.e., the axis 13 representing the longitudinal acceleration along the forward/backward direction, and the intersecting value Gyeject (26) at which the release decision-making threshold line 19a intersects the vertical axis (Y axis; the axis representing the longitudinal acceleration) 13 must be set so as to satisfy the following relationship.

$$Gyeject \leq b \qquad \text{(expression 3)}$$

As shown in FIG. 5, the release decision-making threshold lines 19a, 19b and 19c are set inside the operation decision-making threshold lines 17a, 17b and 17c. As a result, hysteresis can be achieved when applying tension to the seat belt 6 and releasing the tension applied to the seat belt 6 based upon the longitudinal acceleration of the vehicle and the lateral acceleration of the vehicle by setting conditions for applying tension that are different from the conditions for releasing the tension. Thus, unnecessary frequent switching between tension application and tension release is prevented.

It is to be noted that in the map 12 described above, the vertical axis (Y axis, one of the axes) 13 represents the longitudinal acceleration of the vehicle, the horizontal axis (X axis, the other axis) 14 represents the lateral acceleration of the vehicle and the operation decision-making threshold lines 17a, 17b and 17c forming an inverted U shape and the release decision-making threshold lines 19a, 19b and 19c forming an inverted U shape are set. However, the vertical axis (Y axis) 13 may represent the acceleration of the vehicle to the left/right and the horizontal axis (X axis, the other axis) 14 may represent the acceleration of the vehicle along the forward/backward direction, instead, with the operation decision-making threshold lines 17a, 17b and 17c forming the inverted U shape and the release decision-making threshold lines 19a, 19b and 19c forming the inverted U shape mentioned above rotated by 90°. Moreover, the upper side (+Y direction, + side) of the axis (Y axis) representing the longitudinal acceleration may represent the acceleration of the vehicle and the lower side (−Y direction, − side) of the axis may represent the deceleration of the vehicle occurring as the vehicle is braked. Likewise, the right side (+X, + side) of the axis (X axis) representing the lateral acceleration may represent the acceleration to the left and the left side (−X, − side) of the axis may represent acceleration to the right. In other words, the axes on the map 12 may be used to represent any combination of specific types of acceleration of the vehicle 1 and their directions.

Next, the operation achieved in the first embodiment is explained. The longitudinal acceleration sensor 2 and the lateral acceleration sensor 3 of the vehicle 1 constantly measure the acceleration of the vehicle along the forward/backward direction and the acceleration of the vehicle along the lateral direction (to the left/right) respectively. The accelerations that have been measured are transmitted to the controller 9 via the harness 10. The controller 9 digitizes the acceleration signals from the acceleration sensors 2 and 3 and recognizes them as accelerations. The controller 9 makes a decision with regard to the operation of the reversible seat belt tension application mechanism 7 by using the accelerations of the vehicle along the forward/backward direction and along the left/right direction. The decision-making method adopted in the embodiment is now explained in reference to the flowchart presented in FIGS. 6 and 7.

First, in step 101, the longitudinal acceleration Yt and the lateral (left/right) acceleration Xt are obtained from the acceleration sensors 2 and 3. In step 102, the direction along which the vehicle is accelerated is determined by checking the sign attached to the longitudinal acceleration Yt of the vehicle. If the longitudinal acceleration Yt indicates that the vehicle 1 is being braked (decelerating), the operation proceeds to step 103, whereas if the longitudinal acceleration Yt indicates that the vehicle 1 is being accelerated, the operation proceeds to step 104. This decision must be made since there are different operation decision-making threshold lines 17a, 17b and 17c on the side indicating the acceleration of the vehicle 1 and on the side indicating the deceleration of the vehicle 1 and it is necessary to select the correct operation decision-making threshold line depending upon whether the vehicle 1 is being accelerated or decelerated.

Now, an explanation is imparted on the operation decision-making sequence executed after the operation proceeds to step 104, i.e., when the vehicle is accelerating. As shown in FIG. 2, the operation decision-making threshold lines 17b and 17c are used when the vehicle is accelerating. In step 104, a decision is made as to whether the lateral acceleration Xt which has been measured is larger or smaller than the operation decision-making threshold line intersecting value a (18b). Since the level indicated by the value of the measured lateral acceleration Xt alone must be judged, absolute value processing is executed in this decision-making process. The condition to be determined is one of the following.

Condition 1; a>|Xt| (the operation returns to step 101)

Condition 2; |Xt|≧a (the operation proceeds to step 105) (expression 4)

Condition 1 indicates that the lateral acceleration occurring at the vehicle is lower than the acceleration level at which the movement of the occupant along the lateral direction (to the left/right) must be restricted by applying tension to the seat belt 6. Thus, no operation signal is provided to the reversible seat belt tension application mechanism 7. Namely, the seat belt 6 is not taken up. Consequently, the operation returns to step 101 to obtain signals from the longitudinal acceleration sensor 2 and the lateral acceleration sensor 3. If, on the other hand, condition 2 is satisfied, the operation shifts to step 105 to determine the operating mode to be assumed for the reversible seat belt tension application mechanism 7.

If the value provided by the longitudinal acceleration sensor 2 is determined to indicate that the vehicle 1 is being braked (decelerating) in step 102, the operation proceeded to step 103. As shown in FIG. 2, the operation decision-making threshold line 17a is used when the vehicle is being braked (decelerating). In step 103, a decision is made as to whether the values indicating the longitudinal acceleration and the lateral acceleration at the current time point are in the operating range 15 or in the non-operating range 16. Instep 103, the following calculation is executed by using four values, i.e., the operation decision-making threshold line intersecting values a (18b) and b (25) and the vehicle accelerations Xt and Yt, before the operation shifts to step 106.

$$XY = Xt^2/a^2 + Yt^2/b^2$$ (expression 5)

In step 106, the operation decision-making is executed by using the XY value calculated in step 103.

Condition 3; XY<1 (the operation returns to step 101)

Condition 4; 1≦XY (the operation proceeds to step 105) (expression 6)

Condition 3 indicates that the lateral acceleration and the longitudinal acceleration of the vehicle have not reached the acceleration level at which it is necessary to restrict the movement of the occupant 5 either along the lateral direction (to the left/right) or the longitudinal direction, or along both directions by applying tension to the seat belt 6. Accordingly, no operation signal is provided to the reversible seat belt tension application mechanism 7. Namely, the seat belt 6 is not taken up. Thus, the operation returns to step 101 again to obtain signals from the longitudinal acceleration sensor 2 and the lateral acceleration sensor 3. If, on the other hand, the condition 4 is satisfied, the operation shifts to step 105 to determine the operating mode to be assumed for the reversible seat belt tension application mechanism 7.

Since the operation decision-making threshold lines 17d and 17c on the vehicle acceleration side are rectilinear lines, the operation decision-making sequence can be performed for the reversible seat belt tension application mechanism 7 based upon the lateral acceleration of the vehicle alone without depending upon the longitudinal acceleration when the vehicle is accelerating. Thus, the reversible seat belt tension application mechanism 7 is not engaged in operation too frequently to minimize the feeling of restriction that the occupant 5 may experience if tension is applied to the seat belt 6 too often.

Figure 9A:
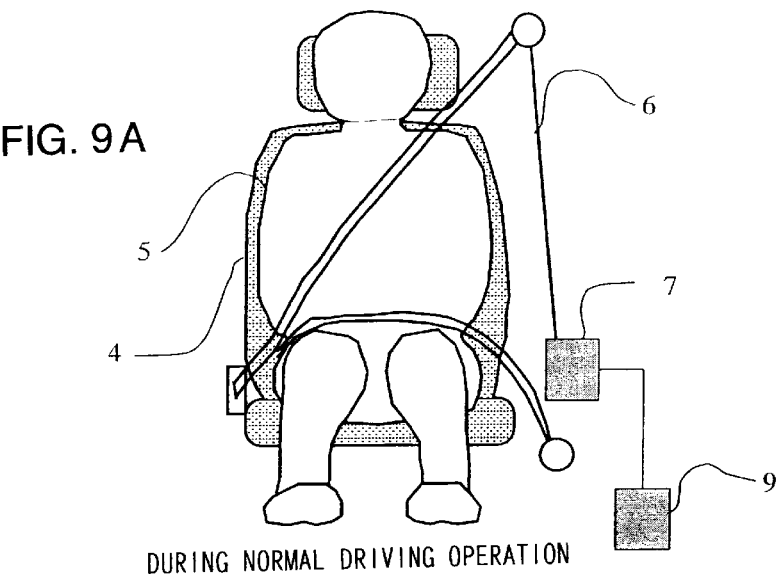
FIGS. 9A~9C show the state of an occupant, viewed from the front as the vehicle turns.
Figure 9B:
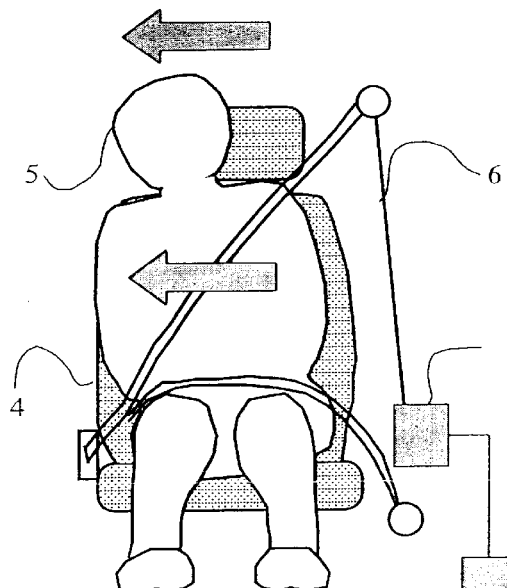
Figure 9C:
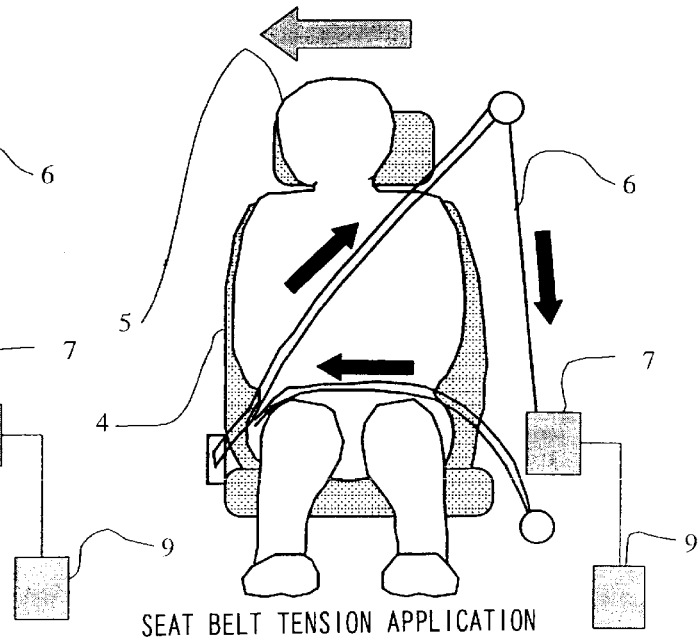

In addition, since the operation decision-making threshold line 17a on the vehicle deceleration side has a semi-elliptic shape, the forward movement of the occupant 5 resulting from the deceleration as the vehicle 1 is being braked can be minimized, as shown in FIGS. 8A~8C and the lateral movement of the occupant 5 from an acceleration of the vehicle 1 to the left/right can be minimized, as shown in FIGS. 9A~9C.

It is to be noted that FIG. 8A shows the attitude of the driver viewed from a side of the vehicle traveling in a normal state, FIG. 8B shows the attitude of the driver viewed from a side of the vehicle as the vehicle is braked and FIG. 8C shows the attitude of the driver viewed from a side of the vehicle as tension is applied to the seat belt during the braking operation of the vehicle. In addition, FIG. 9A shows the attitude of a passenger viewed from the front while the vehicle travels in a normal state, FIG. 9B shows the attitude of the passenger viewed from the front as the vehicle is turned and FIG. 9C shows the attitude of the passenger viewed from the front as tension is applied to the seat belt while the vehicle turns.

Figure 10:
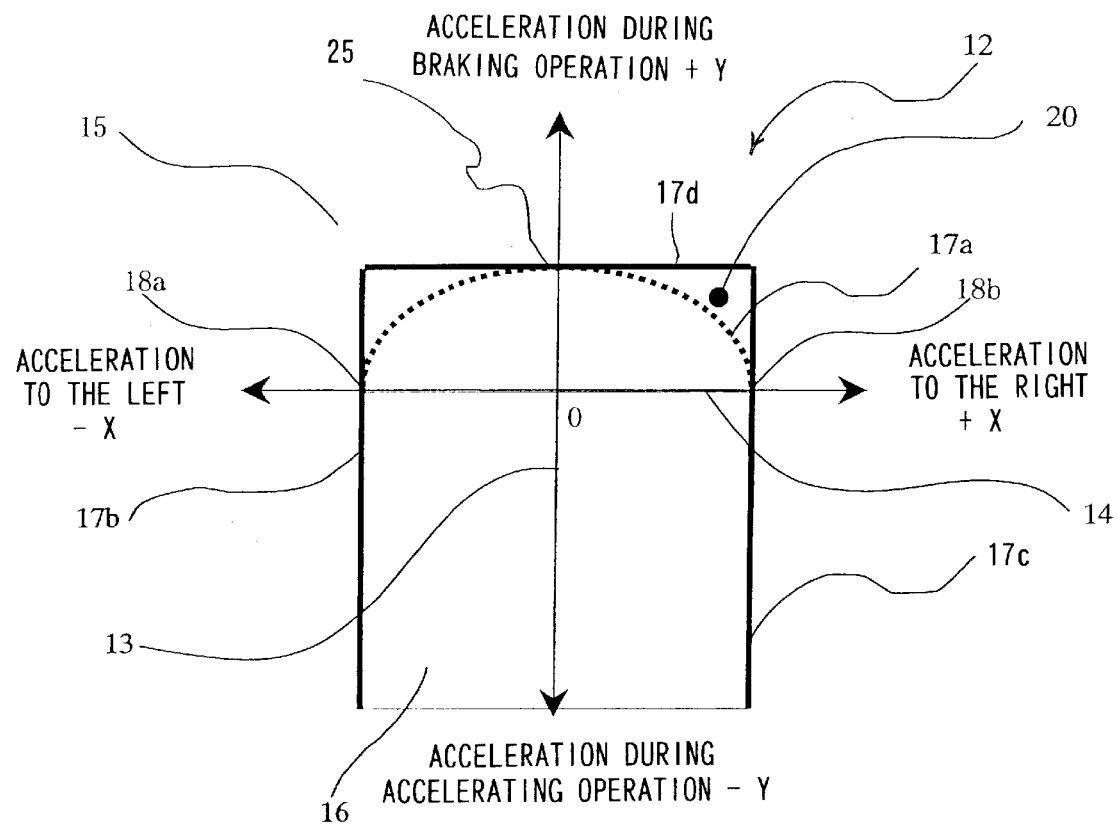
FIG. 10 shows a tension application decision-making map in which the operation decision-making threshold lines on the vehicle braking side form a rectangle.
Figure 11:
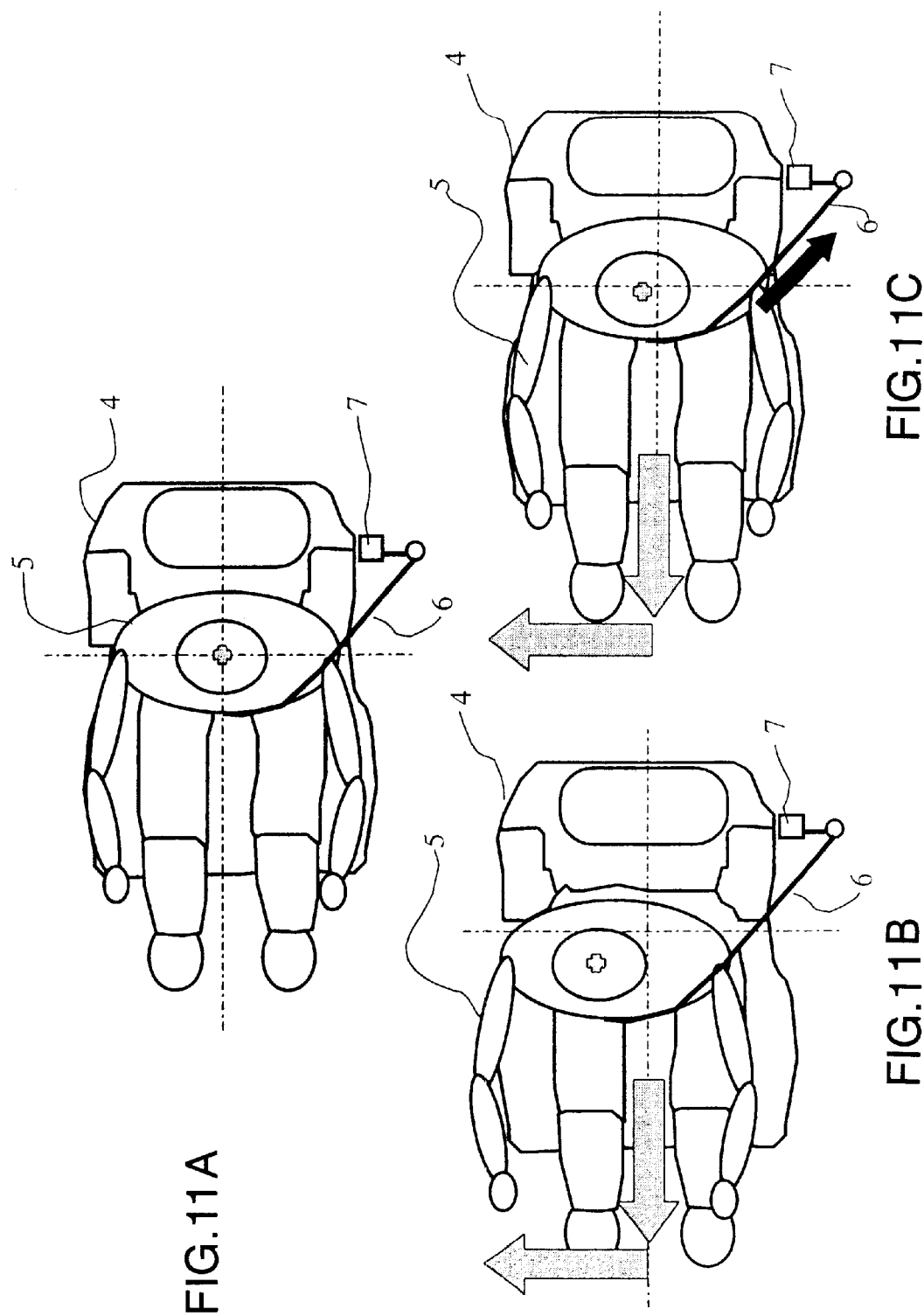
FIGS. 11A~11C illustrate the tension application operation executed by using the tension application decision-making map in which the operation decision-making threshold old lines on the vehicle braking side form a rectangle.

It is to be noted that similar advantages maybe achieved when a braking-side operation decision-making threshold line 17a forms a rectangular shape 17d as indicated by the solid line in FIG. 10. However, when the operation decision-making threshold line 17a forms the rectangular shape, the operating condition is not achieved even if a longitudinal acceleration and a lateral acceleration have occurred at the same time and the upper body of the occupant has been propelled diagonally in the vehicle until the acceleration indicator point 20 in FIG. 10 moves beyond the threshold line 17d along the longitudinal direction or the lateral direction. For this reason, when the braking-side operation decision-making threshold line assumes the rectangular shape 17d indicated by the solid line in FIG. 10, the upper body of the occupant moves by a greater degree, as shown in FIGS. 11A~11C than the extent of the movement of the upper body of the occupant occurring when the braking-side operation decision-making threshold line assumes the elliptic shape 17a indicated by the dotted line in FIG. 10. Thus, it is difficult to effectively achieve the object of giving the occupant an appropriate amount of restraint by applying tension to the seat belt 6 with the braking-side operation decision-making threshold line 17d.

FIG. 11A shows the attitude of the occupant viewed from above as the vehicle travels in a normal state and FIG. 11B shows the attitude of the occupant viewed from above as a longitudinal acceleration and a lateral acceleration occur at the same time. In addition, FIG. 11C shows the attitude of the occupant viewed from above as tension is applied to the seat belt after a longitudinal acceleration and a lateral acceleration have occurred at the same time, based upon the braking-side operation decision-making threshold line assuming the rectangular shape 17d indicated by the solid line in FIG. 10.

Figure 12:
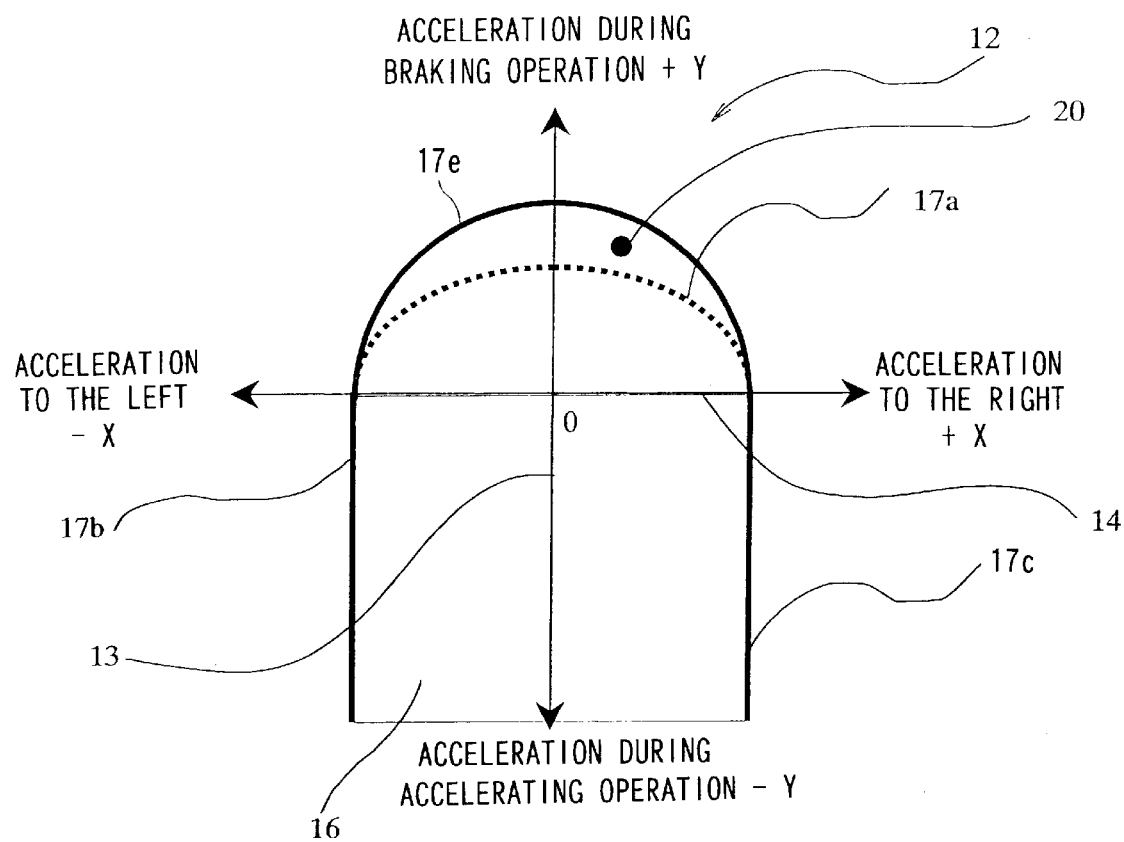
FIG. 12 shows a tension application decision-making map in which the operation decision-making threshold lines on the vehicle braking side form a semicircle.

The threshold line that is used when a braking (deceleration)-side acceleration is occurring at the vehicle 1 maybe set as a semicircular threshold line 17e, as indicated by the solid line in FIG. 12. However, the threshold line 17e uses a single value as the operation starting acceleration level both when only a longitudinal acceleration has occurred and when a lateral acceleration alone has occurred. Namely, when the braking-side operation decision-making threshold line forms the semicircular shape 17e as indicated by the solid line in FIG. 12, the timing with which tension is applied to the seat belt during the braking operation of the vehicle is delayed compared to the timing with which tension is applied based upon the semi-elliptic threshold line 17a indicated by the dotted in FIG. 12.

An appropriate amount of restraint can be provided to the occupant 5 by applying tension to the seat belt 6 as the vehicle 1 is accelerating along the forward/backward direction more effectively if the tension is applied to the seat belt 6 before the upper body of the occupant 5 has moved by a significant extent so as to minimize the degree to which the attitude of the seated occupant 5 is caused to change. In other words, it is desirable to apply tension to the seat belt 6 as early as possible to tighten the seat belt 6 in response to a longitudinal acceleration of the vehicle 1. For this reason, the braking-side operation decision-making threshold line should not form the semicircular shape 17e indicated by the solid line in FIG. 12.

Figure 6:
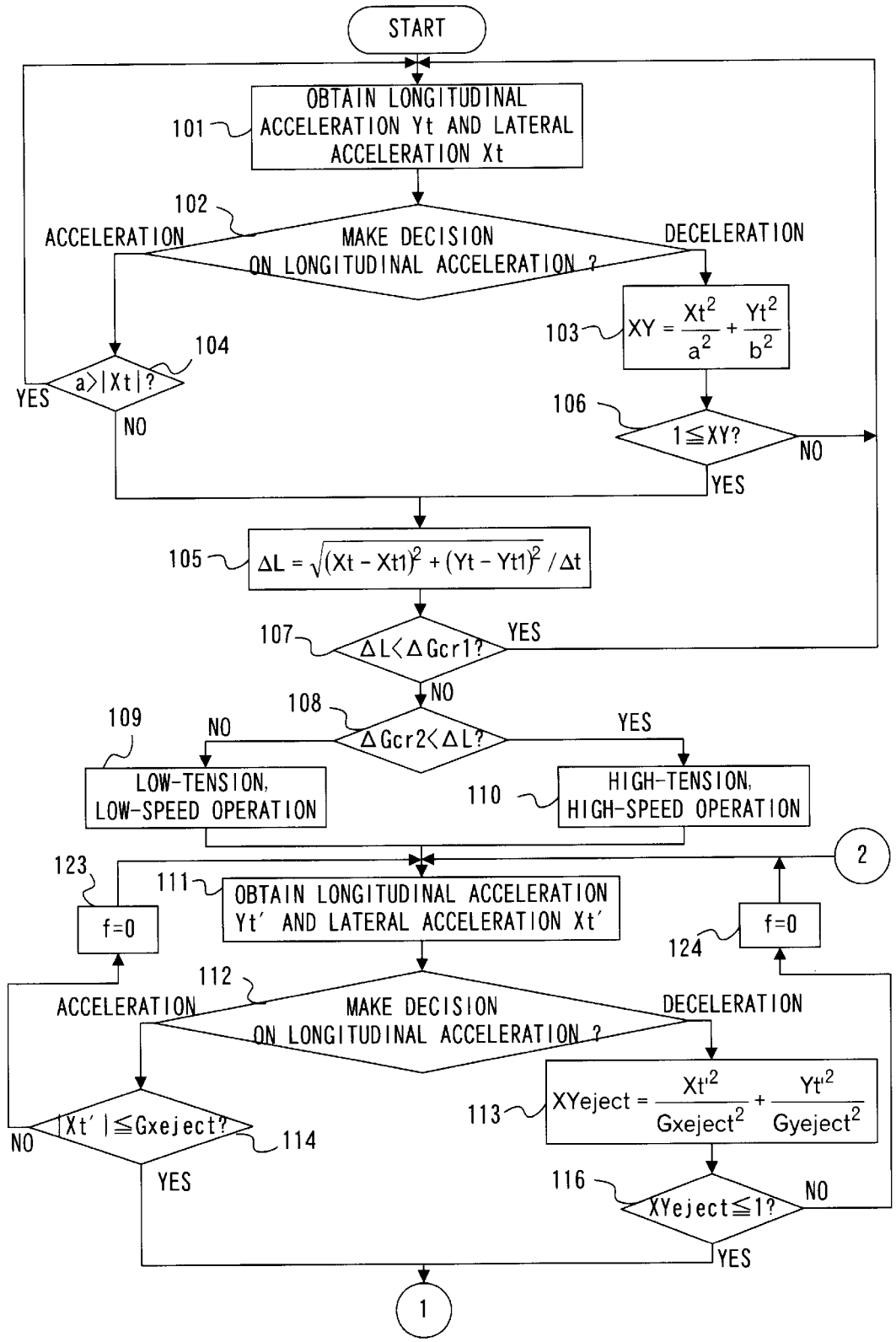
FIG. 6 presents a flowchart of the tension application operation executed in the first embodiment.
Figure 7:
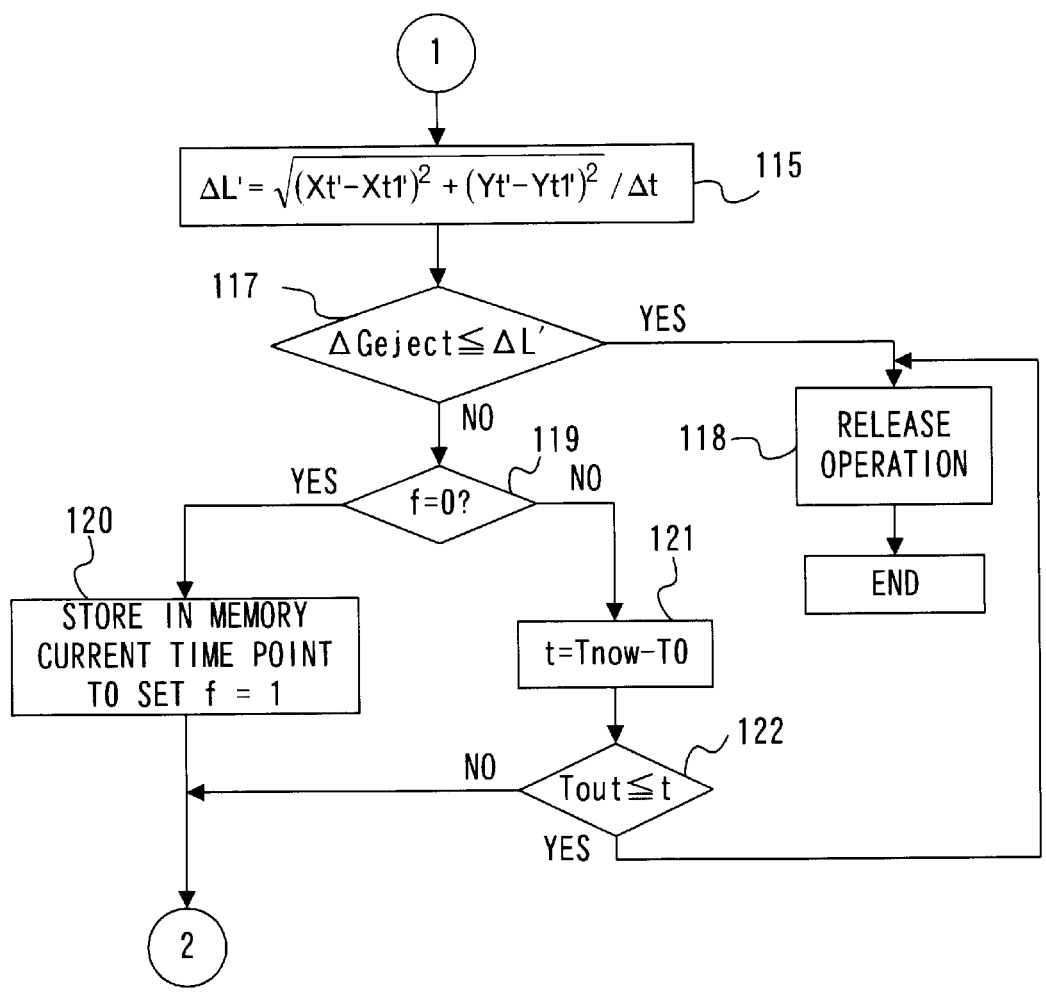
FIG. 7 presents a flowchart of the tension application operation executed in the first embodiment, in continuation from FIG. 6.

The tension application operation executed in the first embodiment is further explained in reference to the flowchart presented in FIGS. 6 and 7. In step 105, the acceleration change rate $\Delta L$ is calculated through the formula presented in (expression 1). After the acceleration change rate $\Delta L$ is calculated, the operation shifts to a decision-making step 107 to select the operating mode for the reversible seat belt tension application mechanism 7. First, in step 107, the acceleration change rate $\Delta L$ is compared with the first acceleration change rate threshold value $\Delta Gcr1$. The applicable comparison conditions are as follows.

Condition 5; $\Delta L < \Delta Gcr1$ (the operation returns to step 101)

Condition 6; $\Delta Gcr1 \leq \Delta L$ (the operation shifts to step 108) (expression 7)

Condition 5 indicates that while the acceleration of the vehicle 1 exceeds the acceleration level at which the occupant 5 should be restrained and imparted an appropriate amount of restraint by generating tension at the seat belt 6, the rate at which the acceleration is increasing is slow. This means that the occupant 5 is capable of making a movement against the acceleration, e.g., pressing his feet against the floor or holding onto a handle, and thus, he does not need the restraint of the seat belt 6. If tension is applied to the seat belt 6 while condition 5 is satisfied, the occupant 5 feels that he is being unnecessarily restrained by the seat belt 6 and thus, he may feel uncomfortable. For this reason, it is not a desirable operating mode for the seat belt 6. Accordingly, the operation returns to step 101 to obtain the longitudinal acceleration and the lateral acceleration at the current time point and the operation decision-making is executed.

Condition 6, on the other hand, indicates that the acceleration of the vehicle 1 exceeds the acceleration level at which the upper body of the occupant 5 needs to be restrained by applying tension to the seat belt 6 and the occupant 5 cannot make a movement against the acceleration occurring at the vehicle 1 with ease. This means that it is necessary to restrain the occupant 5 by applying tension to the seat belt 6. Thus, the operation shifts to step 108 in this case and the operating mode to be assumed for the reversible seat belt tension application mechanism 7 is determined.

In step 108, a decision is made as to whether the following condition 7 or condition 8 is satisfied by using the second acceleration change rate threshold value $\Delta Gcr2$.

Condition 7; $\Delta L \leq \Delta Gcr2$ (the operation shifts to step 109)

Condition 8; $\Delta Gcr2 < \Delta L$ (the operation shifts to step 110) (expression 8)

Condition 7 means that while the acceleration of the vehicle 1 exceeds the acceleration level at which the occupant 5 should be restrained by generating tension at the seat belt 6 to provide an appropriate amount of restraint, the acceleration is rising slowly. Accordingly, the suitable operating mode is determined to be a low-tension, low-speed operating mode in which the seat belt 6 is retracted at low speed and, at the same time, the occupant 5 is restrained at a low tension level so as to avoid making the occupant 5 feel uncomfortable due to high tension while giving him the appropriate sense of restraint. Thus, in step 109, a signal for prompting the reversible seat belt tension application mechanism 7 to engage in a tension application operation in the low-tension, low-speed operating mode is generated. In response to the signal, the reversible seat belt tension application mechanism 7 applies a low level of tension to the seat belt 6 by retracting the seat belt 6 at low speed and restrains the occupant 5.

If, on the other hand, condition 8 is satisfied, the acceleration of the vehicle 1 exceeds the acceleration level at which the occupant 5 should be restrained by generating tension at the seat belt 6 to give him the appropriate amount of restraint and, at the same time, the acceleration is rising quickly. Accordingly, the suitable operating mode is determined to be a high-tension, high-speed operating mode in which the occupant 5 is restrained at a high level of tension by retracting the seat belt 6 at high speed so as to restrain the occupant 5 with a high degree of reliability to minimize the movement of the upper body of the occupant 5. Thus, in step 110, a signal for prompting the reversible seat belt tension application mechanism 7 to engage in a tension application operation in the high-tension, high-speed operating mode is generated. In response to the signal, the reversible seat belt tension application mechanism 7 applies a high level of tension to the seat belt 6 by retracting the seat belt 6 at high speed and restrains the occupant 5.

Conditions 5~8, the varying relationships among the acceleration change rate $\Delta L$ and the change rate threshold value $\Delta Gcr1$ and $\Delta Gcr2$ and the corresponding operating modes assumed in the reversible seat belt tension application mechanism 7, are summarized below.

$\Delta L < \Delta Gcr1$: the tension application mechanism 7 is not engaged in operation $\Delta Gcr1 \leq \Delta L \leq \Delta Gcr2$: the tension application mechanism 7 is engaged in low-tension, low-speed operation $\Delta Gcr2 < \Delta L$: the tension application mechanism 7 is engaged in high-tension, high-speed operation (expression 9)

Values representing the tension levels and the retracting speeds corresponding to the low-tension, low-speed operating mode and the high-tension, high-speed operating mode are set in advance in the controller 9 in conformance to the characteristics of each vehicle. By determining the operating mode to be assumed in the reversible seat belt tension application mechanism 7 through steps 107 and 108, the occupant 5 is allowed to experience the optimal feeling of restraint at the vehicle seat in conformance to the acceleration change rate $\Delta L$ of the vehicle 1. Thus, it becomes possible to give the occupant 5 the appropriate amount of restraint at all times whether the vehicle 1 is engaged in a turning operation or is decelerating or the vehicle 1 is engaged in a turning operation and, at the same time, decelerating.

In addition, since it is possible to regulate the attitude of the occupant 5 seated in the vehicle 1 by restraining the occupant 5 with the seat belt 6 while the vehicle 1 is being braked or is turning, the protection provided by another restraint system such as an air bag system can be enhanced in the event that the vehicle 1 subsequently becomes involved in a collision.

For instance, even if the vehicle 1 collides with an object at the front of the vehicle after it is braked, the distance between the steering wheel and the upper body of the occupant 5 is not reduced by a great extent as tension has been applied to the seat belt 6 prior to the collision, compared to the seat belt system in the related art that includes a mechanical lock. Namely, a larger distance can be assumed between the occupant 5 and the air bag that is subsequently deployed to enhance the effect of the occupant restraint achieved by the air bag.

Furthermore, if an impact occurs at a side of the vehicle 1 after the vehicle is decelerated to the left/right, it is difficult to restrain the upper body of the occupant 5 effectively with the seat belt system in the related art, which includes a mechanical lock device. As a result, the upper body of the occupant 5 is allowed to move toward the door or the trim of the vehicle 1, which, in turn, reduces the space between the occupant 5 and the vehicle interior. However, by utilizing the occupant restraint system in the embodiment it becomes possible to minimize the change in the occupant attitude caused by lateral acceleration of the vehicle and thus, a more effective protection is provided for the occupant 5.

While the operating signal is transmitted to the reversible seat belt tension application mechanism 7 in step 109 or step 110 to engage the reversible seat belt tension application mechanism 7 in a specific operation as described above, the processing at the controller 9 shifts to step 111. Instep 111, a decision is made with regard to a release whereby the operation of the tension application mechanism 7 is ended and the tension generated at the seat belt 6 is eliminated. In step 111, a longitudinal acceleration Yt' and a lateral acceleration Xt' are measured with the longitudinal acceleration sensor 2 and the lateral acceleration sensor 3 again so as to enable a decision as to whether or not the current acceleration of the vehicle 1 is at a level at which the tension at the seat belt 6 should be eliminated.

After measuring the accelerations Xt' and Yt', a decision is made in step 112 as to whether the vehicle 1 is currently accelerating or decelerating by ascertaining the sign of the longitudinal acceleration Yt'. If the longitudinal acceleration Yt' indicates that the vehicle 1 is being braked (decelerating), the operation proceeds to step 113. If, on the other hand, the longitudinal acceleration Yt' indicates that the vehicle 1 is being accelerated, the operation proceeds to step 114. This decision must be made since there are different release decision-making threshold lines 19a, 19b and 19c on the side indicating acceleration of the vehicle 1 and on the side indicating deceleration of the vehicle 1 and it is necessary to select the correct release decision-making threshold line depending upon whether the vehicle 1 is being accelerated or decelerated.

Now, an explanation is imparted on the release decision-making sequence executed after the operation proceeds to step 114, i.e., when the vehicle 1 is accelerating. It is to be noted that, as shown in FIG. 4, the release decision-making threshold lines 19b and 19c are used when the vehicle is accelerating. In step 114, a decision is made as to whether the lateral acceleration Xt' which has been measured is larger or smaller than the release decision-making threshold line intersecting value Gxeject (22b). Since the level indicated by the value of the measured lateral acceleration Xt' alone must be judged, absolute value processing is executed in this decision-making sequence. The decision-making criteria are as follows.

condition 9; Gxeject<|Xt'| (the operation returns to step 111)

condition 10; |Xt'|≦Gxeject (the operation shifts to step 115) (expression 10)

Condition 9 means that the lateral acceleration Xt' currently occurring in the vehicle 1 is at a level at which a lateral movement of the occupant 5 needs to be limited by retracting the seat belt 6. Accordingly, the reversible seat belt tension application mechanism 7 needs to sustain the current tension to continuously restrain the occupant 5 and, therefore, no release signal is transmitted to the reversible seat belt tension application mechanism 7. Then, the operation proceeds to step 123 to reset a tension release decision-making flag f to 0. Subsequently, the operation returns to step 111 to obtain signals from the longitudinal acceleration sensor 2 and the lateral acceleration sensor 3.

If, on the other hand, condition 10 is satisfied, the operation shifts to step 115 (see FIG. 7). In the processing executed in step 115 and subsequent steps, a decision is made as to whether or not the tension generated at the seat belt 6 should be eliminated by stopping the retracting operation by the reversible seat belt tension application mechanism 7.

If the value provided by the longitudinal acceleration sensor 2 is determined to indicate that the vehicle 1 is being braked (decelerating) in step 112, the operation proceeded to step 113. It is to be noted that, as shown in FIG. 4, the release decision-making threshold line 19a is used when the vehicle is being braked (decelerating). In step 113, a decision is made as to whether the values indicating the longitudinal acceleration Yt' and the lateral acceleration Xt' at the current time point are in the operation sustaining range 23 or in the release range 24. In step 113 current the following calculation is executed by using four values, i.e., the fixed values Gxeject and Gyeject and the accelerations Xt' and Yt', before the operation shifts to step 116.

$$XYeject = Xt'^2/Gxeject^2 + Yt'^2/Gyeject^2 \quad \text{(expression 11)}$$

In step 116, a decision is made as to whether or not the tension should be released by using the value XYeject calculated in step 113. The conditions considered in the decision-making process are as follows.

Condition 11; 1<XYeject (the operation returns to step 111)

Condition 12; XYeject≦1 (the operation shifts to step 115) (expression 12)

Condition 11 means that the longitudinal acceleration Yt' and the lateral acceleration X' occurring at the vehicle 1 currently are at an acceleration level at which the movement of the occupant 5 both along the longitudinal direction and along the lateral direction should be continuously limited by retracting the seat belt 6. Accordingly, the reversible seat belt tension application mechanism 7 needs to continuously restrain the occupant 5 by sustaining the current tension and, therefore, no release signal is transmitted to the reversible seat belt tension application mechanism 7. Then, the operation proceeds to step 124 to reset the tension release decision-making flag f to 0. Subsequently, the operation returns to step 111 to obtain the signals from the longitudinal acceleration sensor 2 and the lateral acceleration sensor 3.

If, on the other hand, condition 12 is satisfied, the operation shifts to step 115 (see FIG. 7). In the processing executed in step 115 and subsequent steps, a decision is made as to whether or not the tension generated at the seat belt 6 should be eliminated by stopping the retracting operation by the reversible seat belt tension application mechanism 7.

In step 115, the acceleration change rate ΔL' is recalculated through the following formula. The formula used to calculate the acceleration change rate ΔL' is basically identical to the formula presented in (expression 1) earlier.

$$\Delta L' = \frac{\sqrt{(Xt' - XtI')^2 + (Yt' - YtI')^2}}{\Delta t} \quad \text{(expression 13)}$$

After the acceleration change rate ΔL' is calculated in step 115, the operation shifts to step 116 to make a decision as to whether or not the condition for releasing the tension is present for the reversible seat belt tension application mechanism 7.

In step 117, the acceleration change rate ΔL' is compared with a release decision-making acceleration change rate threshold value ΔGeject set in advance in the controller 9. The possible conditions that are ascertained through the comparison are as follows.

Condition 13; ΔL'<ΔGeject (the operation shifts to step 119)

condition 14; ΔGeject≦ΔL' (the operation shifts to step 118) (expression 14)

Condition 13 means that while at least either the longitudinal acceleration Yt' or the lateral acceleration Xt' is at an acceleration level at which the restraint on the occupant 5 should be ended by stopping the tension application at the seat belt 6 and thus by eliminating the tension at the seat belt 6, the change rate of the acceleration is low. For this reason, there is a possibility that the acceleration rises again to a level at which the restraint on the occupant 5 should be sustained within a very short period of time. Or, the acceleration of the vehicle 1 may continue to decrease only very slightly even when condition 13 is satisfied. Accordingly, if condition 13 is present, the operation shifts to step 119. Through the processing executed in step 119 and subsequent steps, the length of time elapsing after the operation first shifts to step 117 is counted with a timer and a signal for stopping the tension application is transmitted to the reversible seat belt tension application mechanism 7 after a predetermined length of time elapses even if condition 13 is satisfied.

Condition 14, on the other hand, means that at least either the longitudinal accelerations Yt' or the lateral acceleration Xt' is at an acceleration level at which the restraint on the occupant 5 should be ended by stopping the tension application to the seat belt 6 and thus eliminating the tension of the seat belt 6 and, at the same time, the acceleration change rate is high. Accordingly the possibility of the acceleration rising again to the level at which the restraint on the occupant 5 should be sustained within a very short period of time is low. Thus, the operation shifts to step 118 if condition 14 is satisfied to transmit a release signal to the reversible seat belt tension application mechanism 7, which will stop the tension application to the seat belt 6.

By making a decision with regard to the acceleration change rate ΔL' in step 117, the reversible seat belt tension application mechanism 7 is not engaged in frequent operations to apply tension to the seat belt 6 immediately after releasing tension at the seat belt 6, and thus, the occupant does not need to experience any discomfort. In addition, the problem of eliminating the tension at the seat belt 6 while the vehicle 1 is being accelerated to a level at which the tension needs to be sustained to result in a loss of the required restraining force and failing to give the occupant 5 the appropriate feeling of restraint can be avoided.

In step 119, a decision is made on the value set for the release decision-making flag f. The decision-making conditions are as follows.

Condition 15; f=0 (the operation shifts to step 120)

Condition 16; f is not equal to 0 (the operation shifts to step 121) (expression 15)

By checking the value of the release decision-making flag f, it is possible to ascertain whether or not the application of tension to the seat belt 6 is being sustained due to a small acceleration change rate although either the longitudinal acceleration or the lateral acceleration of the vehicle 1 has been already lowered to a level at which the tension of the seat belt 6 should be eliminated. If f=0, the operation has shifted to step 119 for the first time, whereas if f is not equal to 0, it is not the first time the operation has shifted to step 119.

If condition 15 is satisfied, the current time point T0 is stored in memory and 1 is set for the release decision-making flag f in step 120. By executing the processing in step 120, the time point at which the longitudinal acceleration or the lateral acceleration of the vehicle 1 has entered the release range on the map 12 is stored in memory and also the fact that acceleration of the vehicle 1 is in the release range can be indicated. Following step 120, the operation shifts to step 111 to measure the current longitudinal acceleration and lateral acceleration of the vehicle 1 again and the release decision-making sequence is executed.

If, on the other hand, the flag f is already set to 1 and thus condition 16 is satisfied in step 119, the operation shifts to step 121. In step 121, the length of time t that has elapsed since the time point T0 is calculated by subtracting the time point T0 stored in step 120 from the current time point Tnow. In the following step 122, a decision is made as to whether or not a predetermined length of time Tout stored in memory in the controller 9 has elapsed. The decision-making conditions are as follows.

Condition 17; t<Tout (the operation returns to step 111)

Condition 18; Tout≦t (the operation shifts to step 118) (expression 16)

Condition 17 means that the length of time t elapsed up to the current time point after the acceleration value of the vehicle 1 entered the release range on the map 12 still does not match the predetermined length of time Tout. Thus, the operation of the reversible seat belt tension application mechanism 7 is sustained and, at the same time, the operation shifts to step 111 to execute the release decision-making sequence again. Condition 18, on the other hand, indicates that the predetermined length of time Tout has elapsed after the acceleration value of the vehicle 1 entered the release range. In this case, the operation shifts to step 118 to transmit a release signal to the reversible seat belt tension application mechanism 7.

By executing the processing from step 119 through step 122, it is possible to avoid imposing unnecessary restraint on the occupant 5 or causing an uncomfortable feeling of restriction to the occupant 5 due to a continuous operation of the reversible seat belt tension application mechanism 7 resulting from a negative decision of release decision-making in step 117 due to a very slight decrease in the change rate of the deceleration at the vehicle 1.

It is to be noted that if condition 9 is satisfied in step 114 or if condition 11 is satisfied in step 116, the operation shifts to step 123 or step 124 respectively. In steps 123 and 124, the release decision-making flag f is reset to 0. By executing the processing in these steps 123 and 124, the function of the timer engaged in operation in steps 119 through 122 can be stopped if a longitudinal acceleration or a lateral acceleration occurs again at the vehicle 1 and a shift from the release range 24 to the operation sustaining range 23 occurs on the map 12 after the acceleration value enters the release range 24 on the map 12 and the timer becomes engaged in operation in steps 119 through 122.

In step 118, a release signal is transmitted to the reversible seat belt tension application mechanism 7. In response to the signal transmitted via the harness 11, the reversible seat belt tension application mechanism 7 halts the tension application to the seat belt 6 and eliminates the tension from the seat belt 6. Subsequently, the tension application decision-making operation described above is repeatedly executed until the operation of the controller 9 ends as the engine of the vehicle 1 is stopped or the power is turned off, to determine the operating mode to be assumed in the reversible seat belt tension application mechanism 7 based upon the state of the vehicle 1.

(Second Embodiment)

Figure 13:
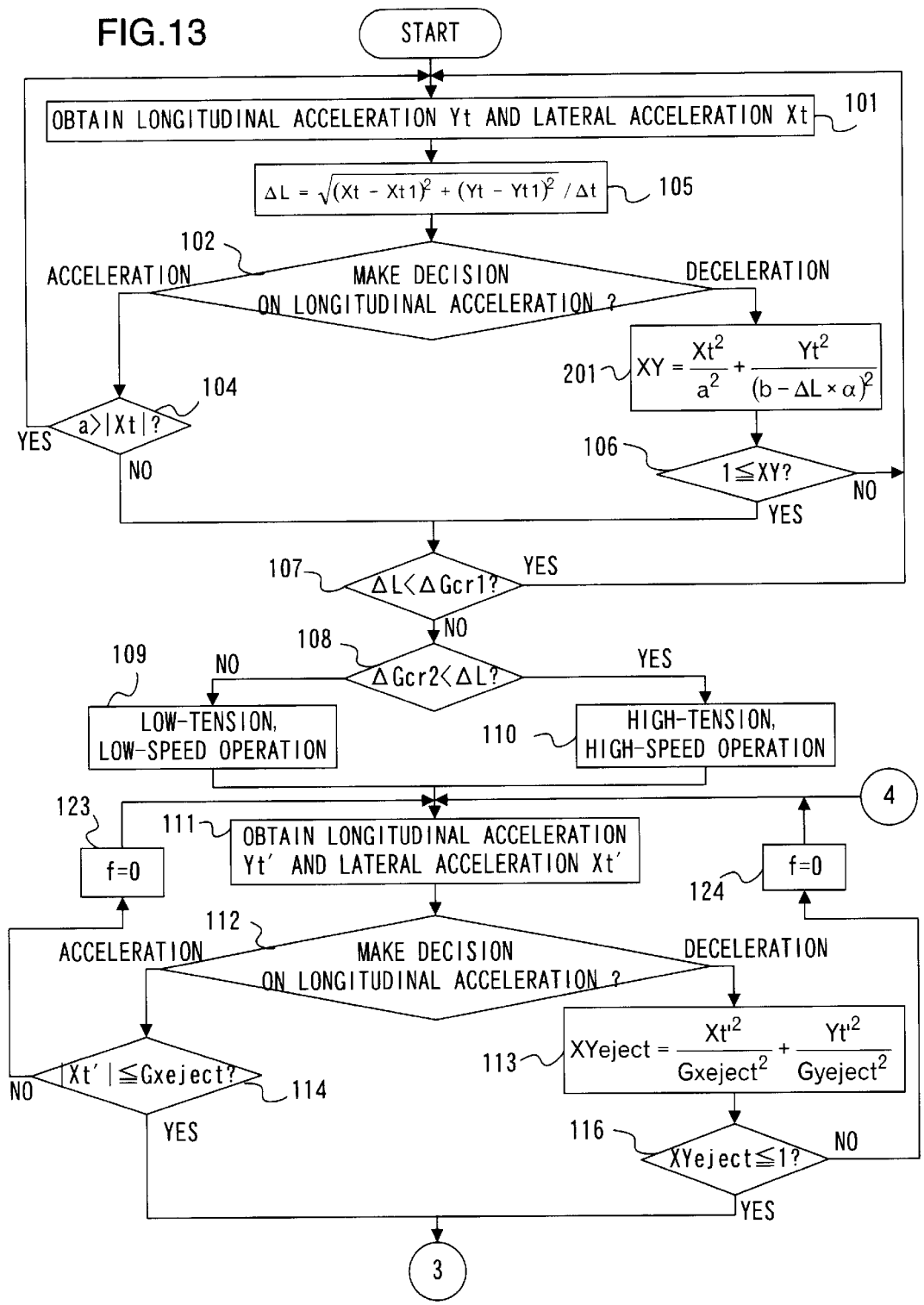
FIG. 13 presents a flowchart of the tension application operation executed in a second embodiment.
Figure 14:
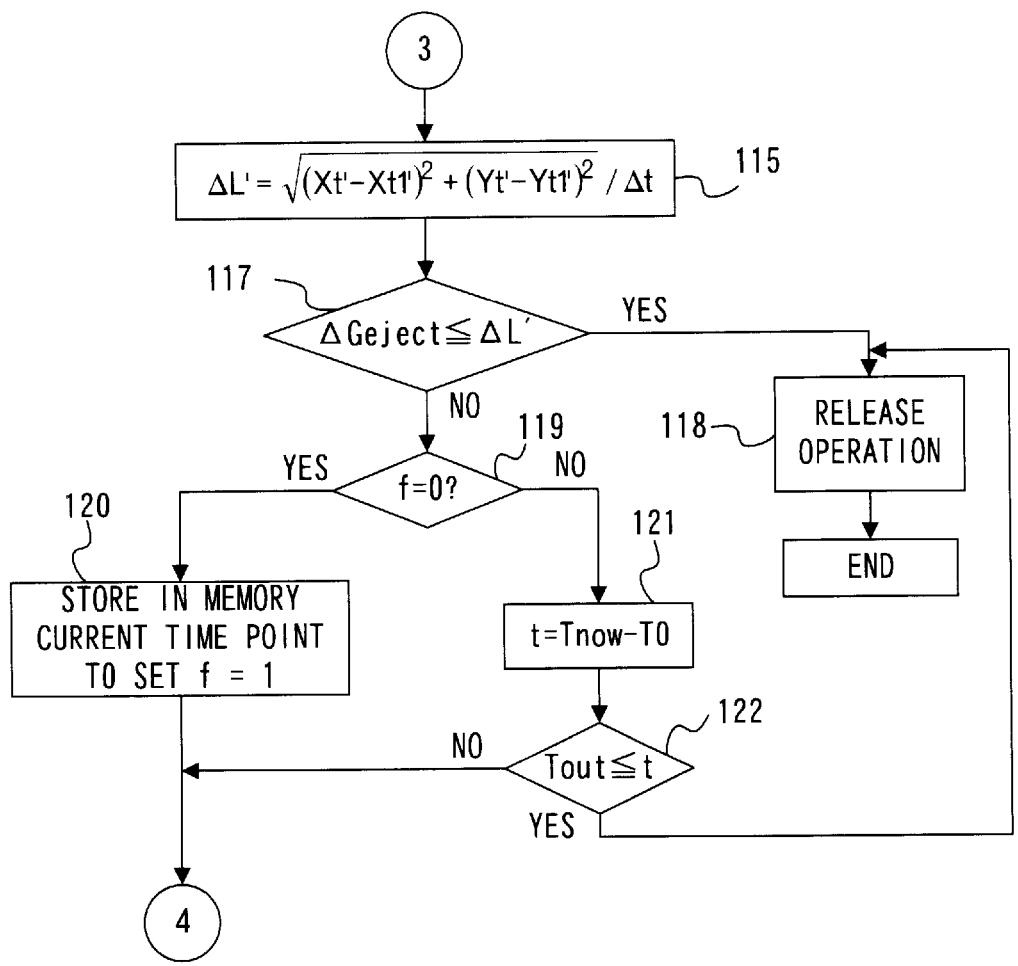
FIG. 14 presents a flowchart of the tension application operation executed in the second embodiment, in continuation from FIG. 13.

Next, the second embodiment is explained in reference to FIGS. 13 and 14. It is to be noted that the structure adopted in the second embodiment is identical to that shown in FIG. 1, and for this reason, its illustration and explanation are omitted. FIGS. 13 and 14 present a flowchart of the tension application operation achieved in the second embodiment. It is to be noted that the same step numbers are assigned to steps in which processing similar to that in the flowchart presented in FIGS. 6 and 7, in reference to which the first embodiment has been explained, is executed. The following explanation focuses on the differences from the first embodiment.

As is shown in FIG. 13, step 105 executed after step 104 or step 106 in the first embodiment is executed immediately after step 101 in the second embodiment. In addition, step 103 in the first embodiment is eliminated and instead, step 201 is executed. The parameters and the formula used in step 105 in the second embodiment are identical to those used in step 105 in the first embodiment. In short, the second embodiment differs from the first embodiment in that the acceleration change rate ΔL is calculated after obtaining the longitudinal acceleration and the lateral acceleration.

In step 201, the intersecting value b at which the semi-elliptic operation decision-making threshold line 17a intersects the vertical axis can be varied depending upon the value of the acceleration rate ΔL calculated in step 105. The right side of the formula used in step 201 to calculate the XY value represents the shape of the semi-epileptic operation decision-making threshold line 17a. In the formula for calculating the XY value, the portion that represents the vertical axis intersecting value is expressed as;

$$b - \Delta L \cdot \alpha \quad \text{(expression 17)}$$

b represents the vertical axis intersecting value 25 of the semi-elliptic operation decision-making threshold line 17a which is set in advance in the controller 9 and is equal to that used in the first embodiment. The acceleration change rate ΔL is the value calculated in step 105. In addition, α, which is a fixed value, is a parameter used to adjust to the scale of the b value.

Figure 15:
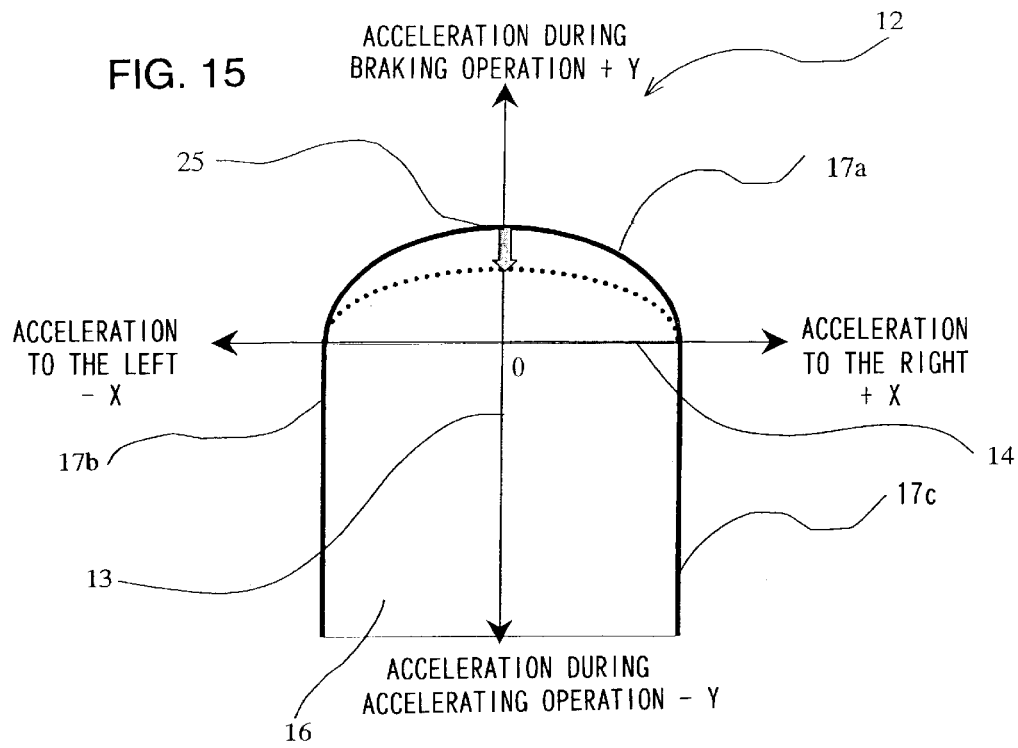
FIG. 15 shows the tension application decision-making map used in the second embodiment, in which the operation decision-making threshold line on the vehicle braking side is varied in conformance to the vehicle acceleration change rate.

Next, the tension application operation executed in the second embodiment is explained. After obtaining the longitudinal acceleration and the lateral acceleration of the vehicle 1 in step 101 in FIG. 13, the acceleration change rate ΔL is calculated in step 105. If it is decided in step 102 by judging the direction along which the longitudinal acceleration is occurring that the vehicle 1 is decelerating, the operation shifts to step 201. In step 201, the vertical axis intersecting value 25 of the semi-elliptic operation decision-making threshold line 17a is reduced in conformance to the level of the acceleration change rate ΔL as shown in FIG. 15. If the acceleration change rate ΔL is 0, the vertical axis intersecting value 25 is set to a predetermined value b. As the acceleration change rate ΔL increases, the vertical axis intersecting value 25 is set to a smaller value.

The vertical axis intersecting value 25 is lowered in conformance to the acceleration change rate ΔL in step 201. As a result, if the acceleration change rate ΔL of the vehicle 1 is high and especially if the change rate of the longitudinal acceleration of the vehicle 1 is high, the operation decision-making threshold line 17a is set closer to the origin point 0 of the map 12. Thus, the operation decision-making can be executed earlier than the decision-making performed by using the predetermined value b.

A high change rate of the acceleration occurring at the vehicle 1 means that the occupant 5 in the vehicle is present at emergency braking or an abrupt turn. In such a case, it is desirable to engage the reversible seat belt tension application mechanism 7 in operation at an early stage so as to restrain the upper body of the occupant 5 as soon as possible. In the second embodiment, by increasing the tension at the seat belt 6 quickly to inhibit the movement of the upper body of the occupant 5, a more appropriate amount of restraint can be imparted to the occupant 5. In addition, even if the vehicle 1 becomes involved in a collision while the occupant 5 is already restrained by the seat belt 6 or after the seat belt 6 starts to restrain the occupant 5 with tension generated at the seat belt 6 by the reversible seat belt tension application mechanism 7, the extent to which the upper body of the occupant 5 is allowed to move is further reduced, so that the protection provided by another safety apparatus such as an air bag is enhanced. It is to be noted that other functions and advantages of the second embodiment are identical to those of the first embodiment.

(Third Embodiment)

Figure 16:
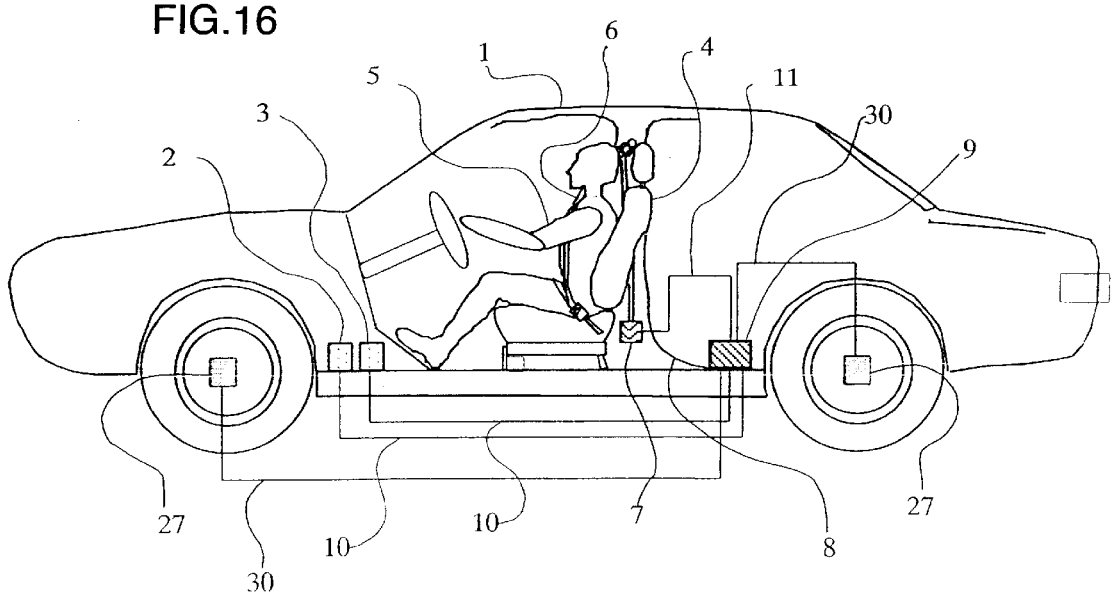
FIG. 16 shows the structure adopted in a third embodiment.

Next, the third embodiment is explained in references to FIGS. 16~19. FIG. 16 shows the structure adopted in the occupant restraint system in the third embodiment. It is to be noted that the same reference numbers are assigned to components identical to those shown in FIG. 1 and the following explanation focuses on the differences from the structure shown in FIG. 1. The third embodiment further includes a vehicle speed sensor 27 installed to detect the speed of the vehicle. The existing speedometer may be utilized as the vehicle speed sensor 27 or the wheel speed sensors used in an anti-lock brake system or the like may be utilized for a vehicle speed sensor 27. It is to be noted that when the wheel speed sensors are utilized, the average of the wheel speeds of two wheels or four wheels should be used. In addition, a vehicle speed signal obtained through the vehicle speed sensor 27 is transmitted to the controller 9 via a harness 30.

Figure 17:
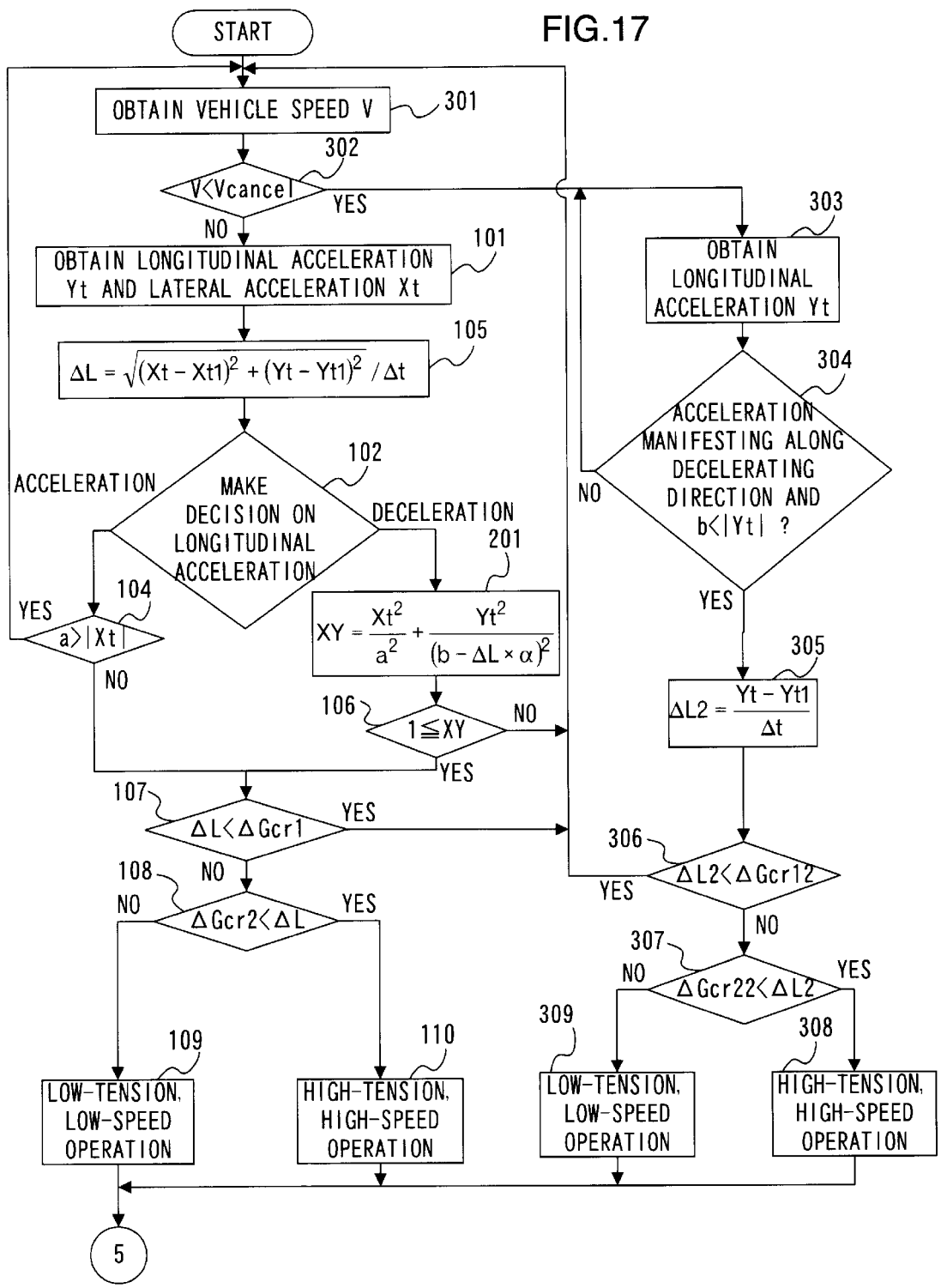
FIG. 17 presents a flowchart of the tension application operation executed in the third embodiment.
Figure 18:
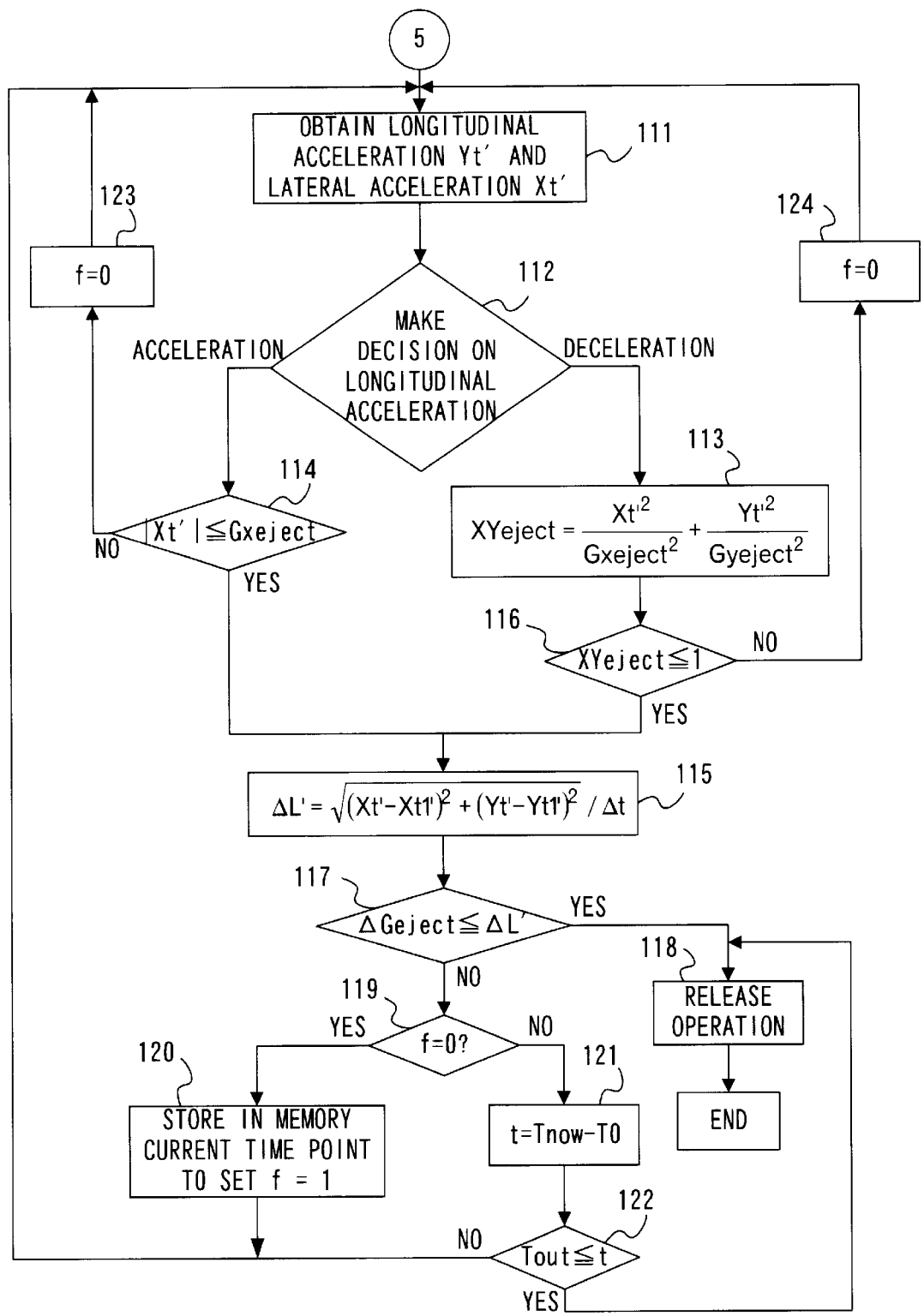
FIG. 18 presents a flowchart of the tension application operation executed in the third embodiment, in continuation from FIG. 17.

FIGS. 17 and 18 present a flowchart of the tension application operation executed in the third embodiment. It is to be noted that the same step numbers are assigned to steps in which processing identical to that in the flowchart presented in FIGS. 13 and 14, in reference to which the second embodiment has been explained, is executed. The following explanation focuses on the differences from the second embodiment.

Steps 301 and 302 are executed immediately before the longitudinal acceleration and the lateral acceleration of the vehicle are obtained in step 101 and, in addition, steps 303–309 are executed concurrently while steps 101–110 identical to the second embodiment are executed.

In step 301, the speed V of the vehicle 1 is obtained from the vehicle speed sensor 27. In the following step 302, the condition of the vehicle speed obtained in step 301 is judged. More specifically, the vehicle speed V is compared with a preset operation decision-making threshold line selection threshold speed Vcancel, and an operation start decision-making threshold line 17 is selected in conformance to the current vehicle speed. The possible selection conditions are as follows.

Condition 19; Vcancel≦V (the operation shifts to step 101)

Condition 20; V<Vcancel (the operation shifts to step 303)  (expression 18)

Condition 19 means that the speed V of the vehicle 1 is equal to or higher than the operation decision-making threshold line selection threshold speed Vcancel set in advance in the controller 9. Accordingly, the operation shifts to step 101 to execute the operation decision-making sequence by using the semi-elliptic operation decision-making threshold line 17a if the vehicle 1 is being braked (decelerating) or to execute the operation decision-making sequence by using the rectilinear operation decision-making threshold lines 17b and 17c indicating a constant lateral acceleration if the vehicle 1 is accelerating as in the second embodiment. The operation executed in step 101 and subsequent steps is identical to the operation executed in the second embodiment explained earlier.

If, on the other hand, condition 20 is satisfied, the speed V of the vehicle 1 is lower than the operation decision-making threshold line selection threshold speed Vcancel set in advance in the controller 9. Accordingly, the operation shifts to step 303 to set a rectilinear operation decision-making threshold line 31 (a fourth operation decision-making threshold line) indicating a constant longitudinal acceleration of the vehicle 1 as shown in FIG. 19 to supersede the operation decision-making threshold line 17a used in the second embodiment if the vehicle 1 is being braked (decelerating) and to supersede the rectilinear operation decision-making threshold lines 17b and 17c indicating a constant lateral acceleration used in the second embodiment when the vehicle 1 is accelerating.

In step 303, the longitudinal acceleration Yt alone is obtained from the longitudinal acceleration sensor 2. In step 304, the direction along which the acceleration obtained in step 303 is occurring is determined and also, the level of the acceleration obtained in step 303 is determined. The applicable decision-making conditions are as follows.

Condition 21; the longitudinal acceleration Yt is on the deceleration side and b<|Yt| (the operation shifts to step 305)

Condition 22; the longitudinal acceleration Yt is on the acceleration side or |Yt|≦b (the operation returns to step 303)  (expression 19)

Condition 21 means that the vehicle 1 is decelerating and, at the same time, the deceleration rate of the decelerating vehicle 1 exceeds a preset operation decision-making threshold value b. This, in turn, means that an acceleration is occurring at a level at which the occupant 5 should be restrained by engaging the reversible seat belt tension application mechanism 7 in operation and thus applying tension to the seat belt 6. Accordingly, the operation shifts to step 305 to determine the operating mode to be assumed in the reversible seat belt tension application mechanism 7.

If, on the other hand, condition 22 is satisfied, the vehicle 1 is accelerating or the deceleration rate of the decelerating vehicle 1 is lower than the preset operation decision-making threshold value b. This means that the condition which requires the reversible seat belt tension application mechanism 7 to be engaged in operation is not present. Accordingly, the operation returns to step 303 to ascertain the acceleration rate.

By executing the processing in steps 303 and 304, a decision is made with regard to the tension application regardless of the lateral acceleration of the vehicle 1 if the current vehicle speed V of the vehicle 1 is lower than the preset vehicle speed. Thus, if a lateral acceleration occurs at the vehicle while it is traveling at low speed in an urban area or the like, the activation of the reversible seat belt tension application mechanism 7 based on the lateral acceleration is disallowed to prevent the reversible seat belt tension application mechanism 7 from becoming engaged in unnecessary operation. As a result, the occupant 5 does not need to feel unnecessary pressure or discomfort due to tension applied to the seat belt.

In addition, through the processing executed in steps 303 through 309, the reversible seat belt tension application mechanism 7 is engaged in operation in response to the longitudinal acceleration even when the vehicle speed is low, as is to be detailed later. As a result, an appropriate amount of restraint can be effectively imposed on the occupant 5 through the restraint by the seat belt 6 when emergency braking is applied while the vehicle is traveling at a low speed, for instance. Furthermore, since the movement of the upper body of the occupant 5 is minimized as the vehicle decelerates while traveling at low speed, the effect of the protection provided by another restraint system can be enhanced in the event of the vehicle 1 becoming involved in a collision subsequently.

In step 305, the acceleration change rate ΔL2 is calculated based upon the current longitudinal acceleration Yt and the previously obtained longitudinal acceleration Yt1. The formula used in the step 305 is presented in the following expression 20.

$$\Delta L2 = (Yt - Yt1)/\Delta t$$  (expression 20)

In steps 306 and 307, a decision is made with regard to the operating mode to be assumed in the seat belt tension application mechanism 7 as in steps 107 and 108 in the second embodiment. In this embodiment, the operating mode is determined by using the acceleration change rate ΔL2 calculated in step 305, a first acceleration change rate threshold value ΔGcr12 for the longitudinal acceleration and a second acceleration change rate threshold value ΔGcr22 for the longitudinal acceleration. The applicable decision-making conditions are as follows.

Condition 23; ΔL2<ΔGcr12 (the operation returns to step 301)

Condition 24; ΔGcr11≦ΔL2≦ΔGcr22 (the operation shifts to step 309)

Condition 25; ΔGcr22≦ΔL2 (the operation shifts to step 308)  (expression 21)

Condition 23 means that while the longitudinal acceleration of the vehicle 1 exceeds the acceleration level at which the reversible seat belt tension application mechanism 7 should be engaged in operation, the change rate ΔL2 of the acceleration currently occurring is low. For this reason, the condition does not indicate any operating mode for the seat belt tension application mechanism 7. Accordingly, the operation returns to step 301 to re-execute the operation decision-making sequence.

If condition 24 is satisfied, the longitudinal acceleration of the vehicle 1 exceeds the acceleration level at which the reversible seat belt tension application mechanism 7 should be engaged in operation and, at the same time, the acceleration currently occurring manifests an intermediate change rate. Accordingly, the operating mode to be assumed in the reversible seat belt tension application mechanism 7 is determined to be a mode in which a low level of tension is applied to the reversible seat belt tension application mechanism 7 at low speed. Condition 25, on the other hand, means that the acceleration of the vehicle is at a level at which tension should be applied to the seat belt 6 and, at the same time, the acceleration manifest a high change rate. Thus, the operating mode is determined to be a mode in which the reversible seat belt tension application mechanism 7 is engaged in operation at a high tension level and at high speed.

By judging the applicable condition through steps 306 and 307, the correct level of tension to be applied to the seat belt 6 can be selected in conformance to the rate at which the acceleration is rising. Thus, an optimal balance can be achieved in the tension application to result in an appropriate level of restraint, holding the occupant 5 firmly but without causing unnecessary discomfort. This advantage is similar to that achieved by executing the processing in steps 107 and 108 in the first embodiment.

As a specific operation signal is transmitted by the controller 9 in step 308 or 309, the reversible seat belt tension application mechanism 7 engages in operation in response to the signal. Subsequently, the operation shifts to the release decision-making process starting in step 111. It is to be noted that other functions and advantages achieved in the third embodiment are similar to those of the second embodiment.

(Fourth Embodiment)

Figure 21:
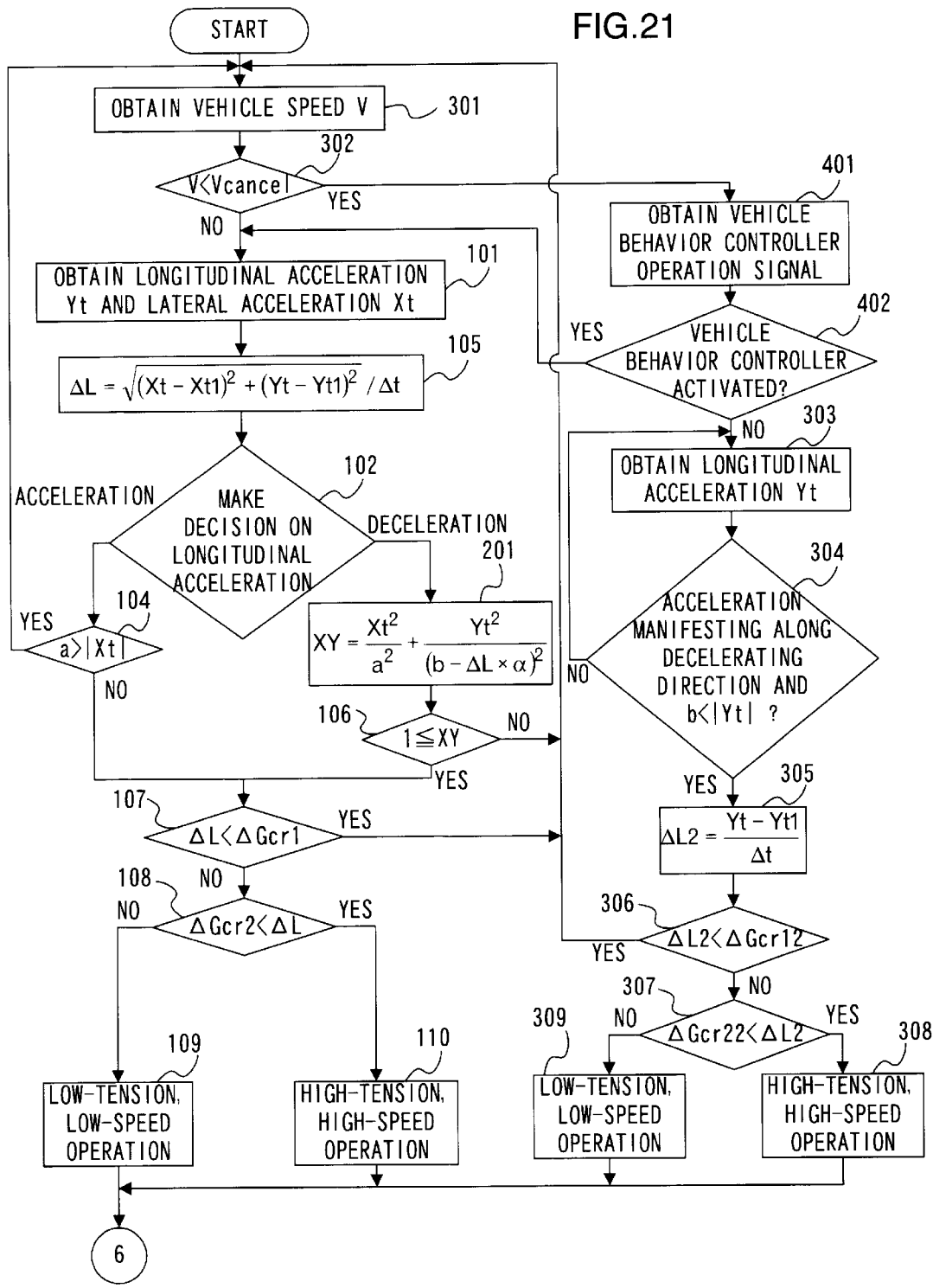
FIG. 21 presents a flowchart of the tension application operation executed in the fourth embodiment.
Figure 22:
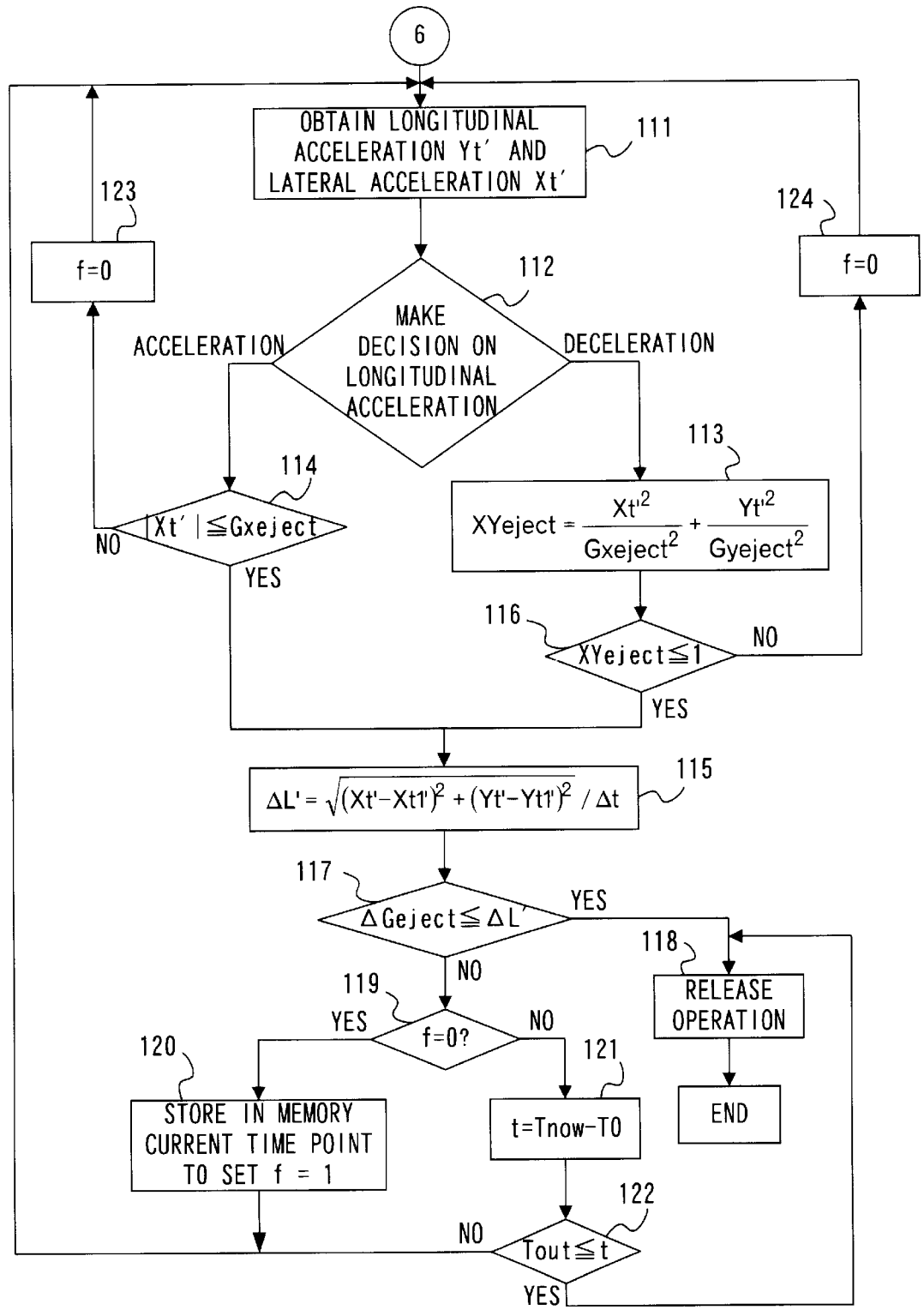
FIG. 22 presents a flowchart of the tension application operation executed in the fourth embodiment, in continuation from FIG. 21.

The fourth embodiment is explained in references to FIGS. 20~22. FIG. 20 shows the structure adopted in the occupant restraint system in the fourth embodiment. It is to be noted that the same reference numbers are assigned to components identical to those shown in FIGS. 1 and 16 and the following explanation focuses on the differences from the above-described embodiments.

The fourth embodiment further includes a vehicle behavior controller operation signal generating device 28 installed to notify that the behavior controller for the vehicle 1 is engaged in operation. The vehicle behavior controller in this structure, which may be an anti-lock brake system, a traction control system, a vehicle dynamics control system or the like of the known art, actively controls the behavior of the vehicle 1 by detecting that the vehicle 1 is in a slip or spin. The embodiment further includes a harness 32 through which the signal generated at the vehicle behavior controller operation signal generating device 28 is transmitted to the controller 9.

FIGS. 21 and 22 present a flowchart of the tension application operation executed in the fourth embodiment. It is to be noted that the same step numbers are assigned to steps in which processing similar to that in the flowchart presented in the FIGS. 17 and 18, in reference to which the third embodiment has been explained, is executed and the following explanation focuses on features that differentiate the fourth embodiment. Steps 401 and 402 are executed between steps 302 and 303. In step 401, a signal indicating that the behavior controller of the vehicle 1 is engaged in operation is obtained, and in step 402, an operation decision-making mode for the reversible seat belt tension application mechanism 7 is selected by using the vehicle behavior controller operation signal. Other aspects of the processing are similar to those of the processing executed in the third embodiment as shown in FIGS. 17 and 18.

After the signal indicating whether or not the behavior controller for the vehicle 1 is engaged in operation is obtained in step 401, the operation shifts to step 402. In step 402, a decision is made to select the correct operation decision-making threshold line for the reversible seat belt tension application mechanism 7 based upon the signal obtained in step 401. The applicable decision-making conditions are as follows.

Condition 26; the behavior controller for the vehicle 1 is engaged in operation (the operation shifts to step 101)

Condition 27; the behavior controller for the vehicle 1 is not engaged in operation (the operation shifts to step 303) (expression 22)

When the operation shifts to step 402 from step 302, the speed V of the vehicle 1 is low and thus, the decision-making with regard to the operation of the reversible seat belt tension application mechanism 7 is made only in conformance to the longitudinal acceleration of the vehicle 1. However, if condition 26 is satisfied, the behavior of the vehicle 1 tends to become unstable due to slipping or spinning. Accordingly, the risk potential of the vehicle 1 is judged to be high even if the vehicle speed is low. Then, the operation shifts to step 101 to execute the operation decision-making sequence by using two values, i.e., the longitudinal acceleration value and the lateral acceleration value, in preparation for a possible subsequent vehicle collision.

If, on the other hand, condition 27 is satisfied, the tendency of the behavior of the vehicle 1 becoming unstable is not present. Accordingly, the operation shifts to step 303 to execute the decision-making sequence with regard to the operation of the reversible seat belt tension application mechanism 7 based upon the longitudinal acceleration alone.

By executing the processing in steps 401 and 402, a decision is made with regard to the tension application to the seat belt 6, depending upon whether or not high-risk behavior is detected at the vehicle 1. Thus, the occupant 5 can be restrained more effectively to give him an even more appropriate amount of restraint and, at the same time, the forward movement or the lateral movement of the upper body of the occupant 5 is minimized in preparation for a possible subsequent vehicle collision to enhance the effect of the protection provided by another restraint system. In addition, by making the decision with regard to the tension application to the seat belt 6 based upon the presence/absence of high-risk behavior at the vehicle 1, frequent tension application to the seat belt is prevented and thus, the occupant 5 does not need to experience the discomfort of being restricted due to unnecessary activation of the reversible seat belt tension application mechanism 7. It is to be noted that other functions and advantages achieved in the fourth embodiment are at identical to those of the third embodiment.

(Fifth Embodiment)

Figure 23:
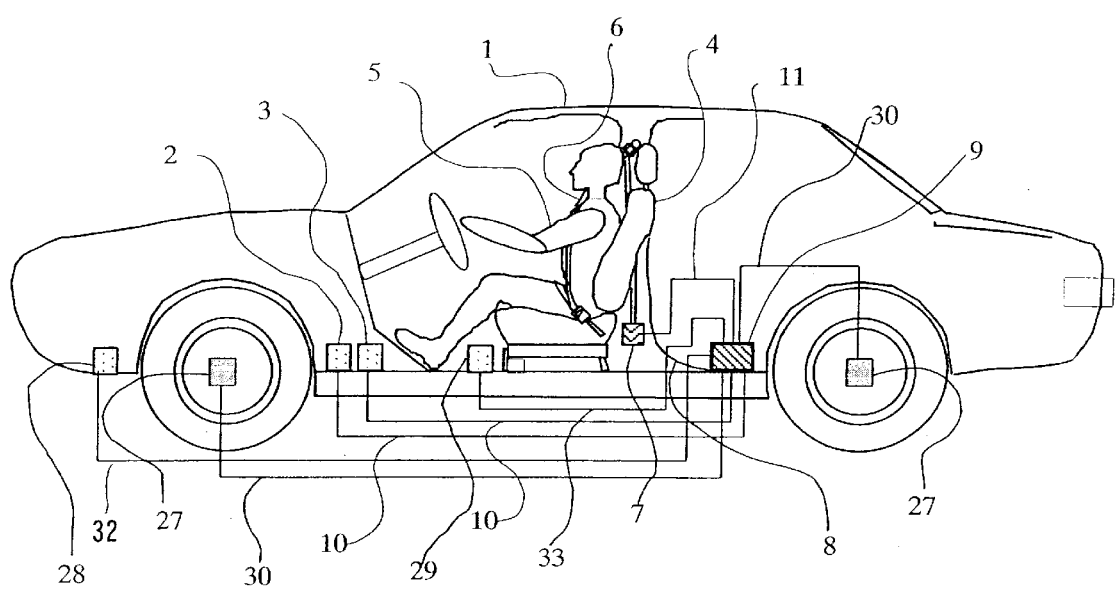
FIG. 23 shows the structure adopted in a fifth embodiment.
Figure 24:
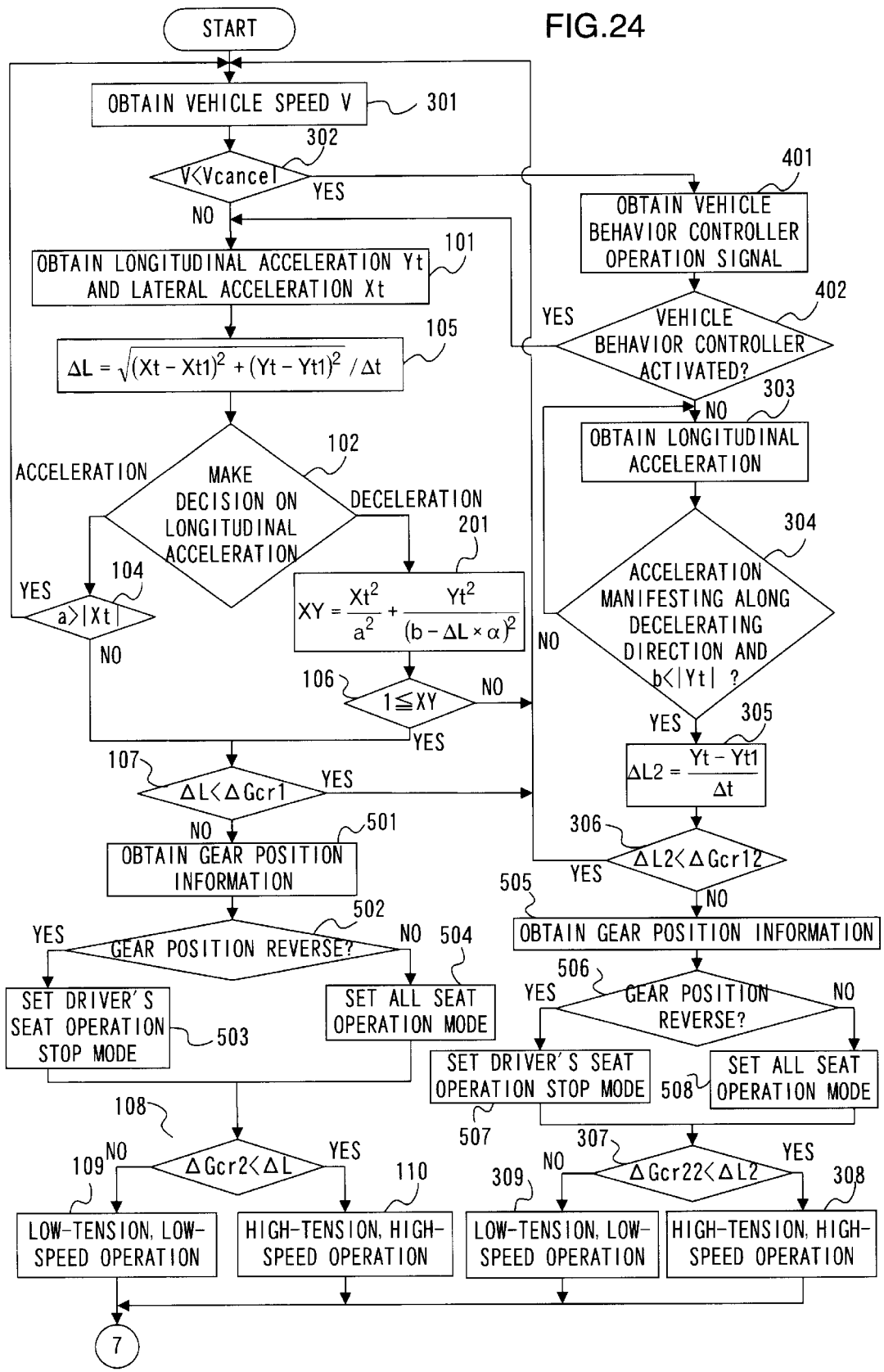
FIG. 24 presents a flowchart of the tension application operation executed in the fifth embodiment.
Figure 25:
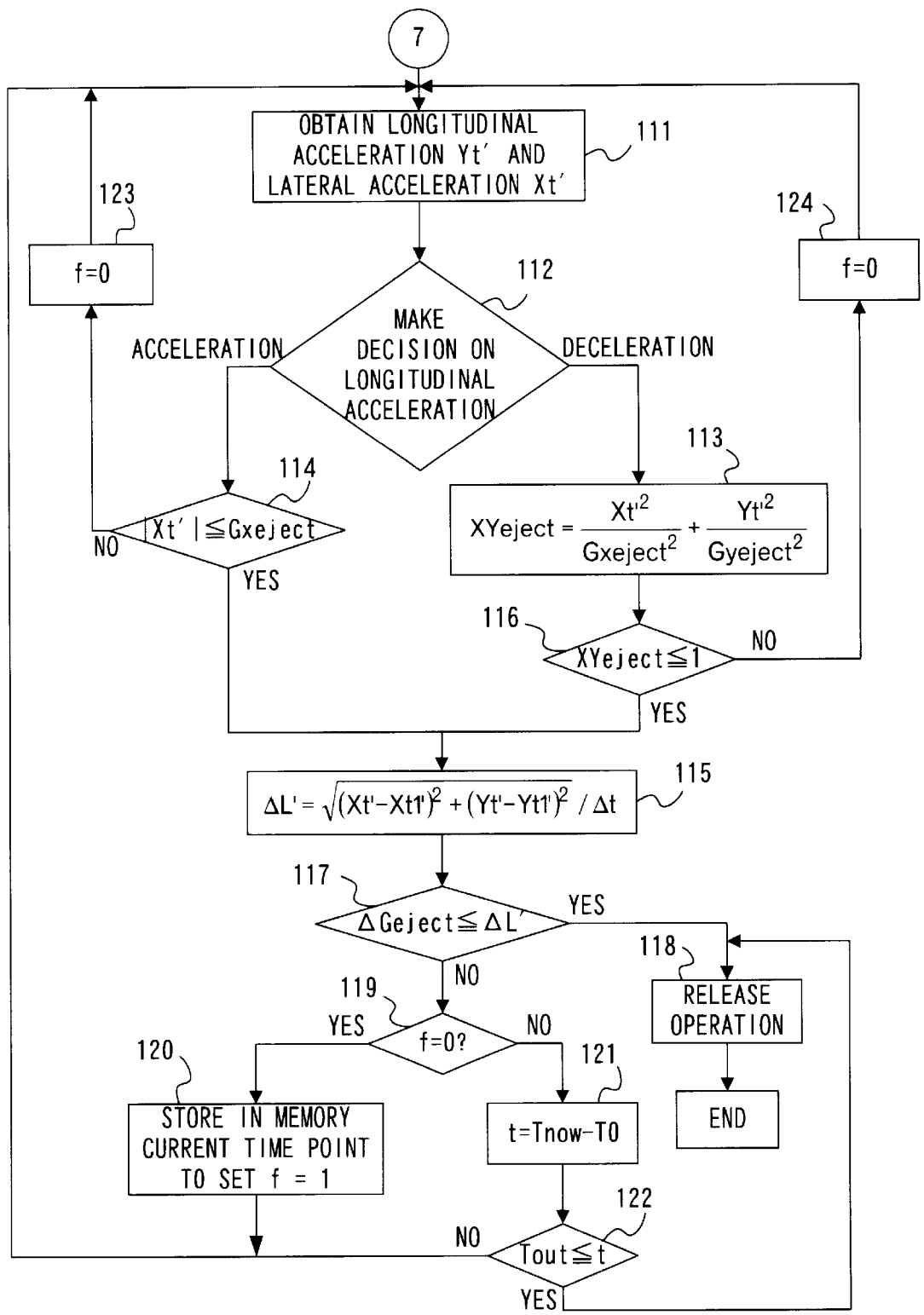
FIG. 25 presents a flowchart of the tension application operation executed in the fifth embodiment, in continuation from FIG. 24.

The fifth embodiment is explained in references to FIGS. 23~25. FIG. 23 shows the structure adopted in the occupant restraint system in the fifth embodiment. It is to be noted that the same reference numbers are assigned to components identical to those shown in FIGS. 1 and 20. The following explanation focuses on the differences from the above-described embodiments.

The fifth embodiment further includes a gear position identification signal device 29 installed to indicate the gear position of the transmission of the vehicle 1. The existing automatic transmission shift position indicator may be utilized as the gear position identification signal device 29, or a reverse lamp lighting device may be utilized as the gear position identification signal device 29. It further includes a harness 33 through which the signal generated at the gear position identification signal device 29 is transmitted to the controller 9.

The gear position identification 29 is provided to detect the reverse operation of the vehicle 1 in this embodiment, however, a reverse operation detector that detects the reverse operation of vehicle 1 based upon, for instance, a rotational direction of a wheel installed on the vehicle 1.

FIGS. 24 and 25 present a flowchart of the tension application operation executed in the fifth embodiment. It is to be noted that the same step numbers are assigned to steps in which processing similar to that in the flowchart presented in the FIGS. 21 and 22, in reference to which the fourth embodiment has been explained, is executed and the following explanation focuses on features that differentiate the fifth embodiment.

In the fifth embodiment, steps 501~504 are executed between steps 107 and 108 and steps 505~508 are executed between steps 306 and 307. In steps 501 and 505, the gear position identification signal is obtained, and in steps 502 and 506, the gear position is determined based upon the signal. In steps 503 and 504, and in steps 507 and 508, a mode for disallowing the operation of the reversible seat belt tension application mechanism 7 at the driver's seat or a mode for enabling the operation of the reversible seat belt tension application mechanism 7 at all the seats is set based upon the results of the decision made on the gear position. Other aspects of the processing are identical to those of the fourth embodiment.

After the current gear position is ascertained in step 501, the gear position is determined to be a reversing gear position or an advancing gear position in the following step 502. The decision-making conditions are as follows.

Condition 28; reversing gear position (the operation shifts to step 503)

Condition 29; advancing or neutral gear position (the operation shifts to step 504) (expression 23)

If condition 28 is satisfied, i.e., if the transmission assumes the reversing gear position, the operation shifts to step 503 to set the mode for disallowing the operation of the reversible seat belt tension application mechanism 7 at the driver's seat. If, on the other hand, condition 29 is satisfied, i.e., if the transmission assumes the advancing or neutral gear position, the operation shifts to step 504 to set the mode for allowing the operation of the reversible seat belt tension application mechanisms 7 at all the seats.

Subsequently, in step 109 or 110, the controller 9 issues an operation signal for the reversible seat belt tension application mechanism 7. At this time, the controller 9 generates the signal corresponding to the operation location mode set in step 503 or 504 to activate the reversible seat belt tension application mechanisms 7 for the seats other than the driver's seat or the reversible seat belt tension application mechanisms 7 for all the seats.

By executing the processing in steps 501~504, the operation of the reversible seat belt tension application mechanism 7 for the driver's seat is disallowed if the vehicle 1 is being reversed through a driver's operation. Thus, the driving operation during which the driver may have to lean out to check the rear of the vehicle is not hindered. If the vehicle 1 is abruptly accelerated or is abruptly turned during the reverse movement and either the longitudinal acceleration or the lateral accelerations of the vehicle 1 enters the operating range 15 of the reversible seat belt tension application mechanisms 7, the reversible seat belt tension application mechanisms 7 for the seats except for the driver's seat are activated to restrain the occupants other than the driver. Thus, the appropriate amount of restraint can be imparted to the occupants other than the driver. In addition, since the movement of the upper bodies of the occupants 5 can be restrained in preparation for a possible subsequent collision, the effect of the protection provided by another restraint system can be enhanced.

Furthermore, an appropriate amount of restraint can be imparted to the occupants 5 in all the seats while the vehicle 1 is advancing or is in a stationary state through a driver's operation and, at the same time, the protection provided by another safety system can be enhanced in the event of a subsequent collision. Moreover, since the reversible seat belt tension application mechanisms 7 are not activated unnecessarily, the occupants do not need to experience an unnecessary feeling of discomfort from being held too tightly. It is to be noted that other functions and advantages achieved in this embodiment are identical to those of the fourth embodiment.

(Sixth Embodiment)

The sixth embodiment is now explained in reference to FIGS. 26~31. Since the structure adopted in the occupant restraint system in the sixth embodiment is identical to that of the fifth embodiment shown in FIG. 23, its explanation is omitted.

Figure 26:
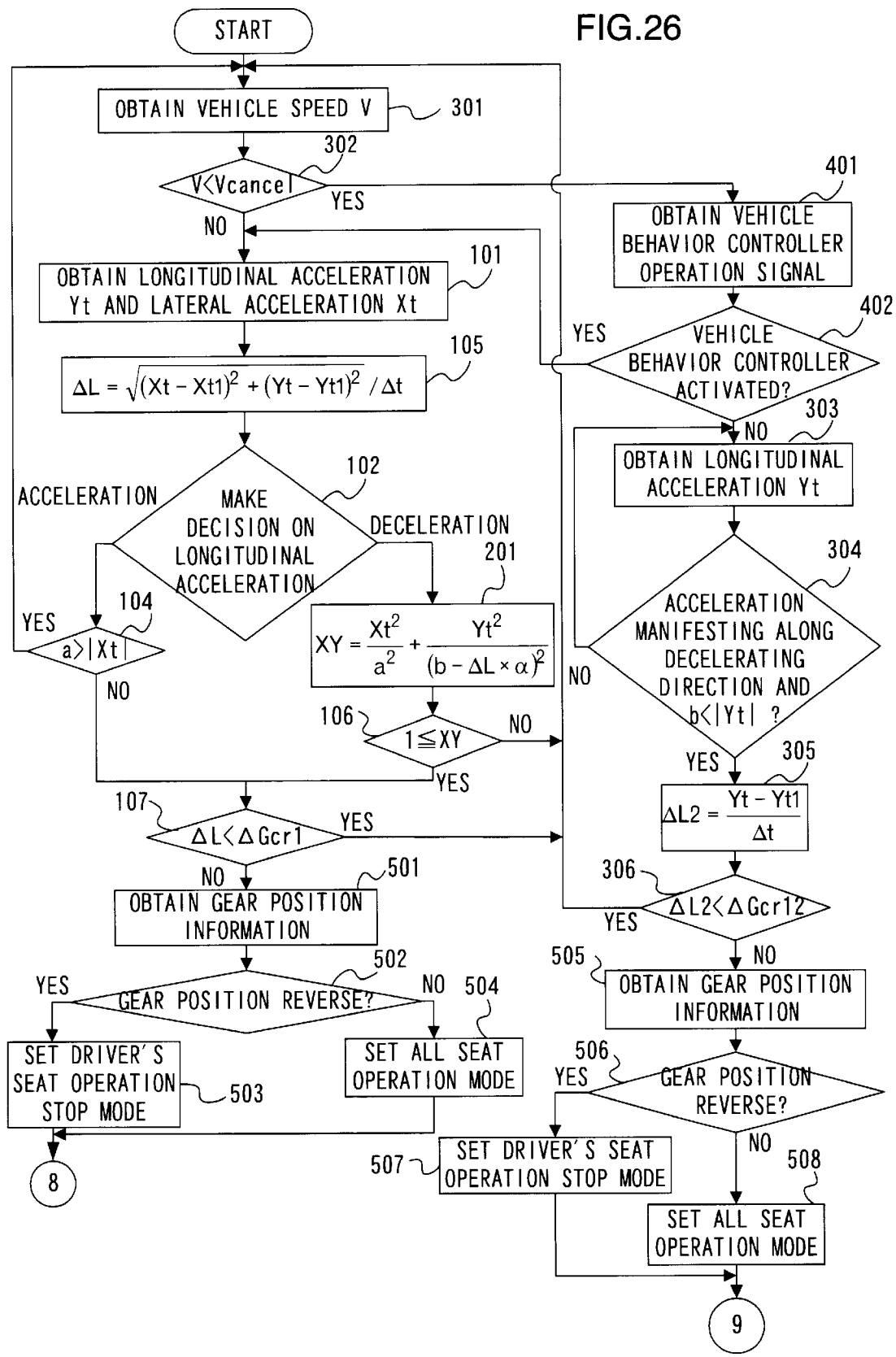
FIG. 26 presents a flowchart of the tension application operation executed in a sixth embodiment.
Figure 27:
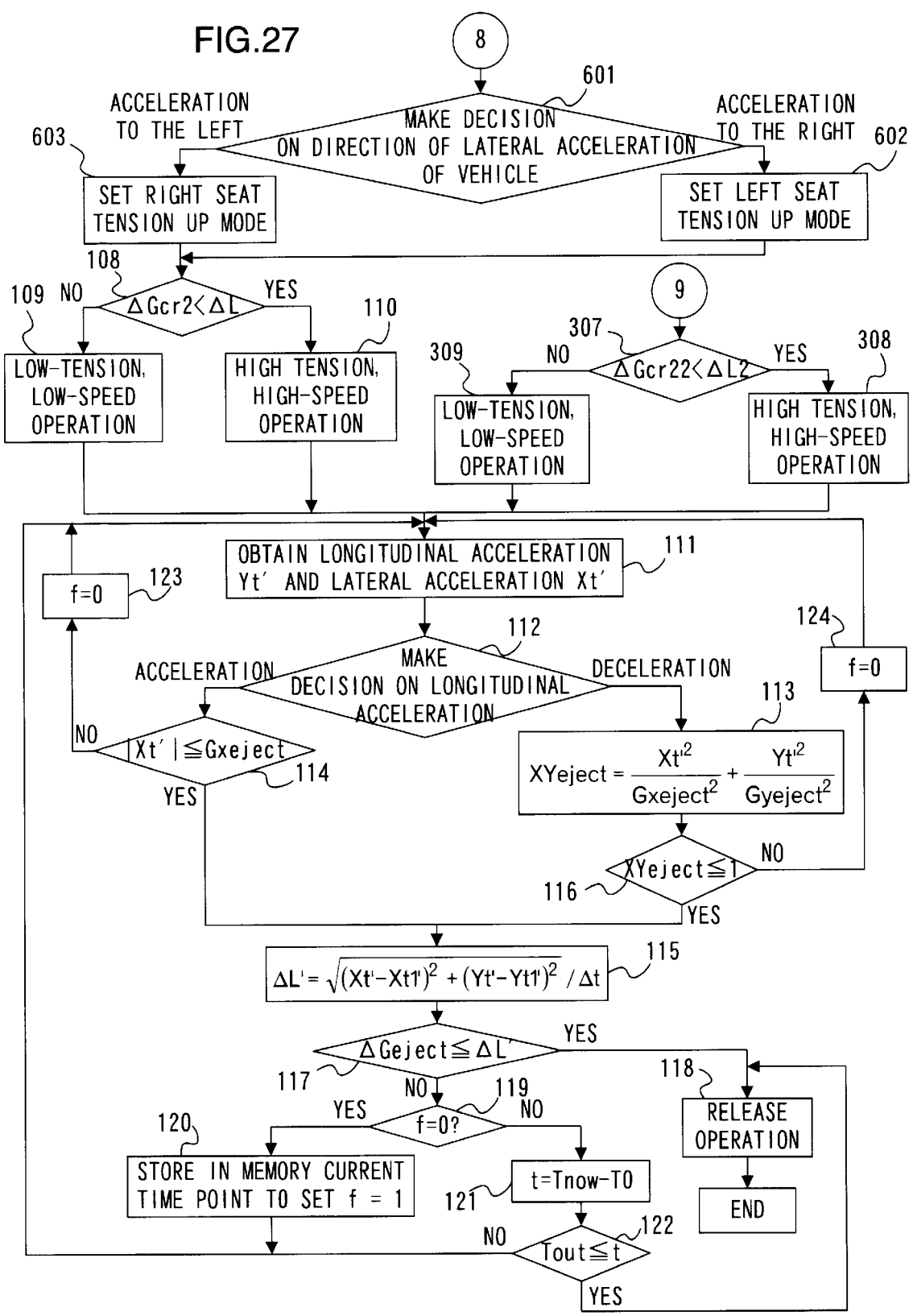
FIG. 27 presents a flowchart of the tension application operation executed in the sixth embodiment, in continuation from FIG. 26.

FIGS. 26 and 27 present a flowchart of the tension application operation executed in the sixth embodiment. It is to be noted that the same step numbers are assigned to steps in which processing identical to that in FIGS. 24 and 25 is executed, and the following explanation focuses on the features that differentiate the sixth embodiment. In the sixth embodiment, steps 601~603 are executed between steps 503 and 504 and step 108 (see FIG. 27). In steps 601~603, a decision is made with regard to the lateral acceleration of the vehicle 1 to determine the operating mode to be assumed in the reversible seat belt tension application mechanisms 7. The other operational features are identical to those of the fifth embodiment explained earlier.

In step 601, a decision is made as to whether or not the lateral acceleration of the vehicle 1 obtained in step 101 is manifesting to the right or to the left of the vehicle 1, and then the operation shifts to the next step. The applicable decision-making conditions are as follows.

Condition 30; acceleration to the right of the vehicle 1 (the operation shifts to step 602)

Condition 31; acceleration to the left of the vehicle 1 (the operation shifts to step 603) (expression 24)

If condition 30 is satisfied, the vehicle 1 is undergoing a left turn. In this case, the operation shifts to step 602 to set an operating mode for the reversible seat belt tension application mechanisms 7 in which the level of tension applied to the seat belts at all the seats on the left side in the vehicle 1 is set higher than the level of tension applied to the seat belts at the seats on the right side. The tension level settings are reversed from those assumed in correspondence to condition 30 if condition 31 is satisfied.

Figure 28:
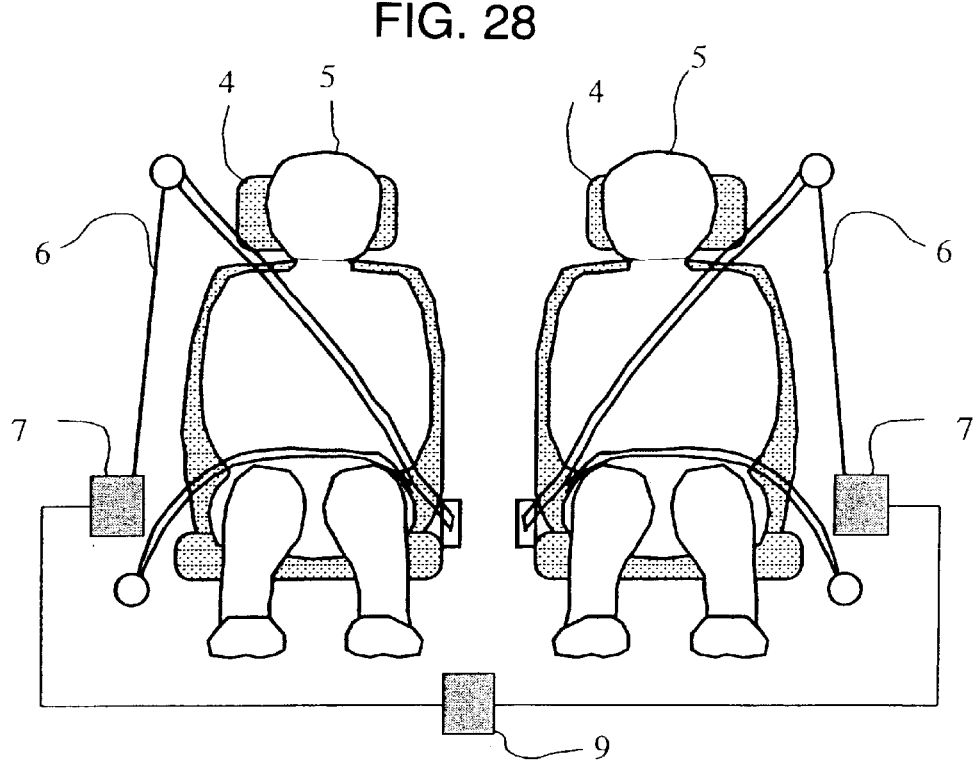
FIG. 28 shows the states of the occupants viewed from the front as the vehicle in a normal travelling operation.
Figure 29:
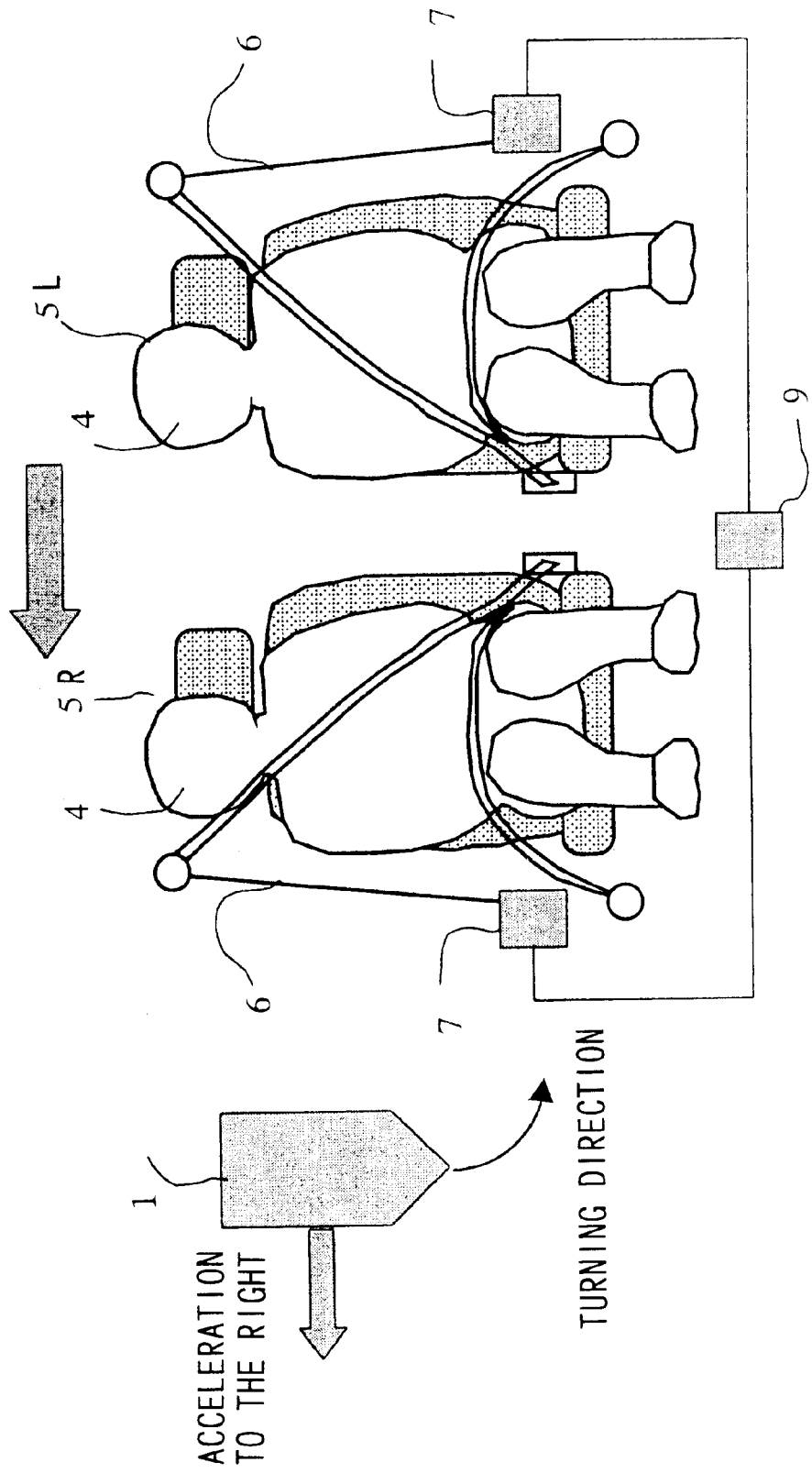
FIG. 29 shows the states of the occupants viewed from the front as the vehicle is turned to the left.
Figure 30:
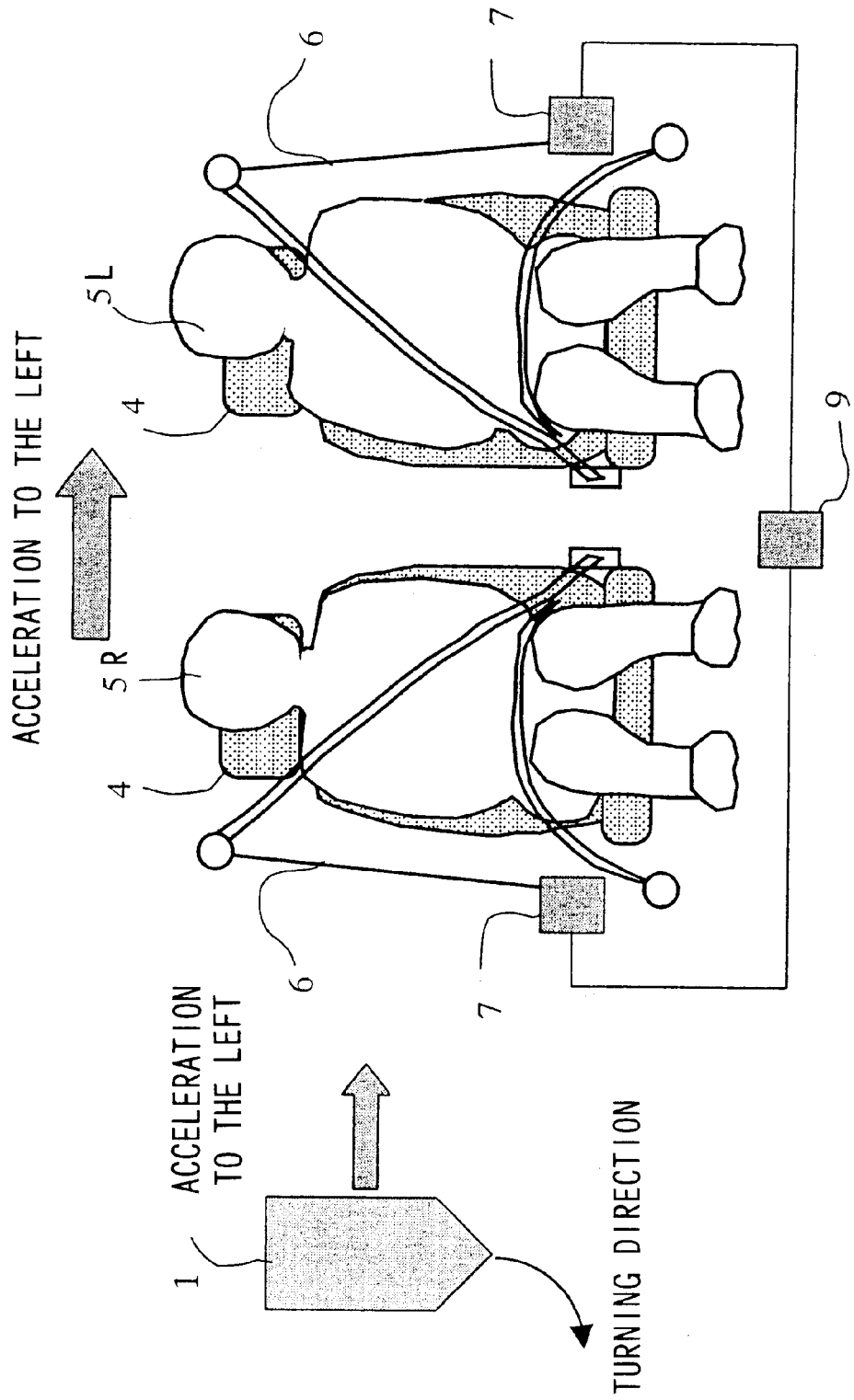
FIG. 30 shows the states of the occupants viewed from the front as the vehicle is turned to the right.

As shown in FIG. 28, the shoulder belt of a standard 3-point seat belt 6 is diagonally stretched from the right shoulder toward the left hip at a right-side seat whereas the shoulder belt is stretched from the left shoulder toward the right hip at a left-side seat. The upper bodies of the occupants 5 wearing seat belts 6 move to the right due to acceleration to the right at the vehicle while the vehicle 1 is being turned to the left, as shown in FIG. 29. While the vehicle 1 is turned right, on the other hand, the upper bodies of the occupants 5 move to the left, as shown in FIG. 30.

When the reversible seat belt tension application mechanisms 7 are activated to apply tension to the seat belts 6 and the movements of the upper bodies of the occupants 5 are restrained as a result, the body of the occupant 5L seated in the left-side seat moves as if to slip out of the shoulder-side seat belt 6 due to acceleration to the right as the vehicle makes a left turn as shown in FIG. 29. In contrast, the body of the occupant 5R seated in the right-side seat moves as if to slip out of the shoulder-side seat belt 6 due acceleration to the left while the vehicle is being turned to the right, as shown in FIG. 30.

Figure 31:
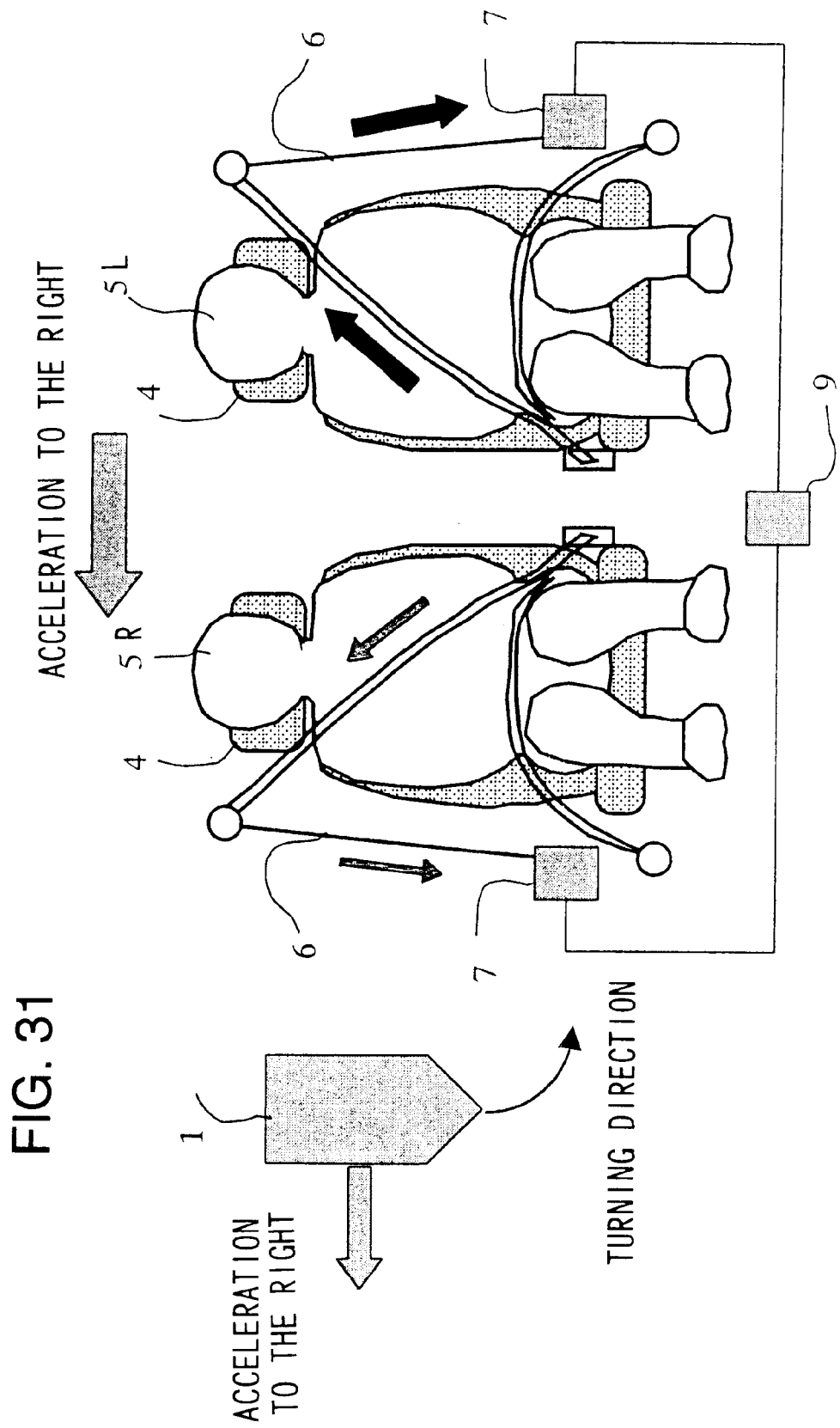
FIG. 31 illustrates the tension application operation executed in the sixth embodiment when the vehicle is turned to the left.

In the sixth embodiment, when an acceleration to the right is manifesting in the vehicle 1, for instance, the seat belt tension at the left-side seats is set higher than the seat belt tension at the right-side seats, as shown in FIG. 31. As a result, the movement of the upper body of an occupant 5L in a left-side seat can be restrained more effectively, which means that the restraint on the occupants 5L and 5R achieved by the seat belts gives an appropriate sense of restraint even more effectively and that more effective protection is provided against a possible subsequent vehicle collision. The seat belt tension at the right-side seats is set higher than the seat belt tension at the left-side seats when acceleration to the left is manifesting in the vehicle 1 to achieve a similar advantage. It is to be noted that other functions and advantages achieved in this embodiment are similar to those of the fifth embodiment.

(Seventh Embodiment)

Figure 32:
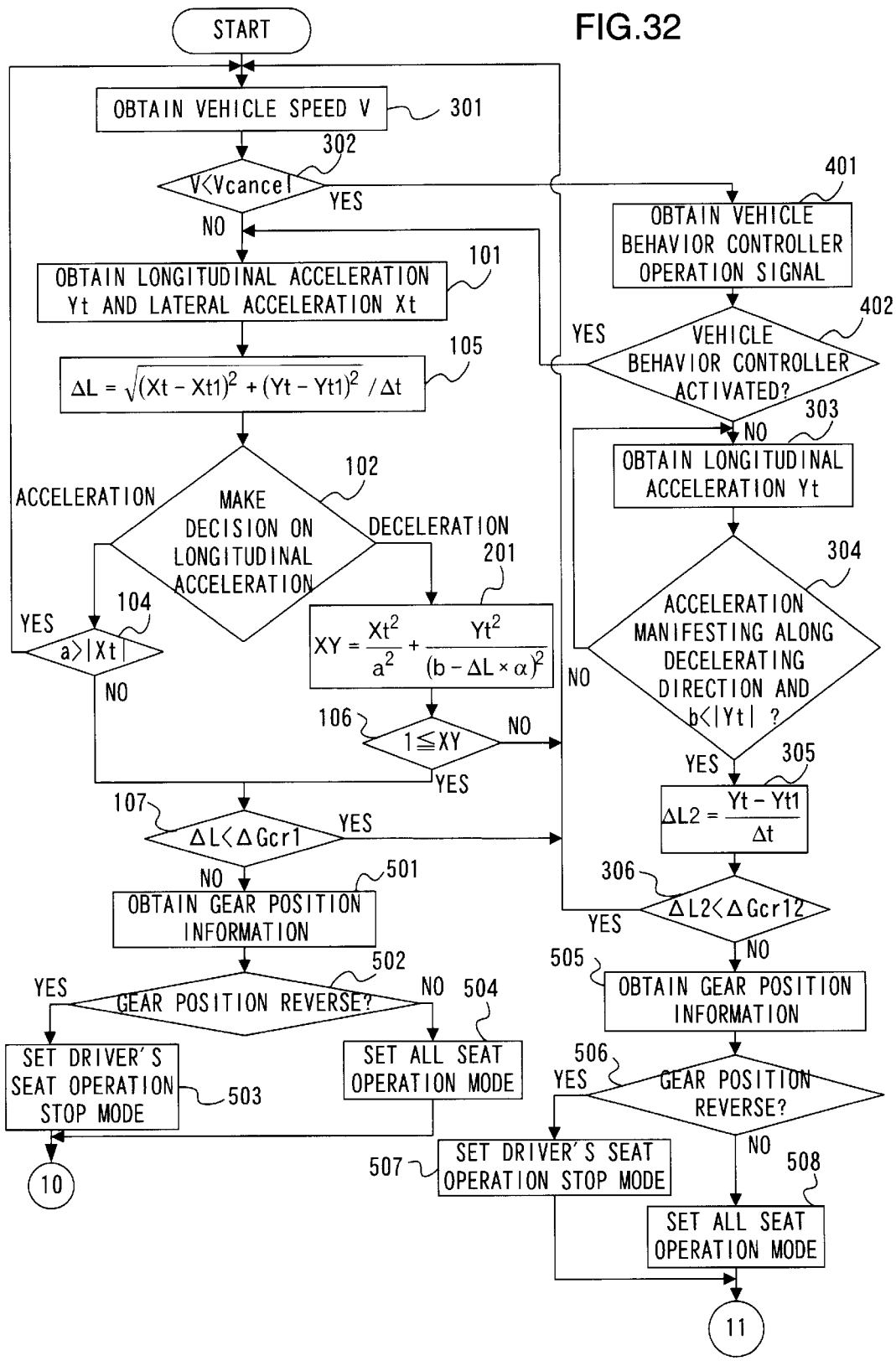
FIG. 32 presents a flowchart of the tension application operation executed in a seventh embodiment.
Figure 33:
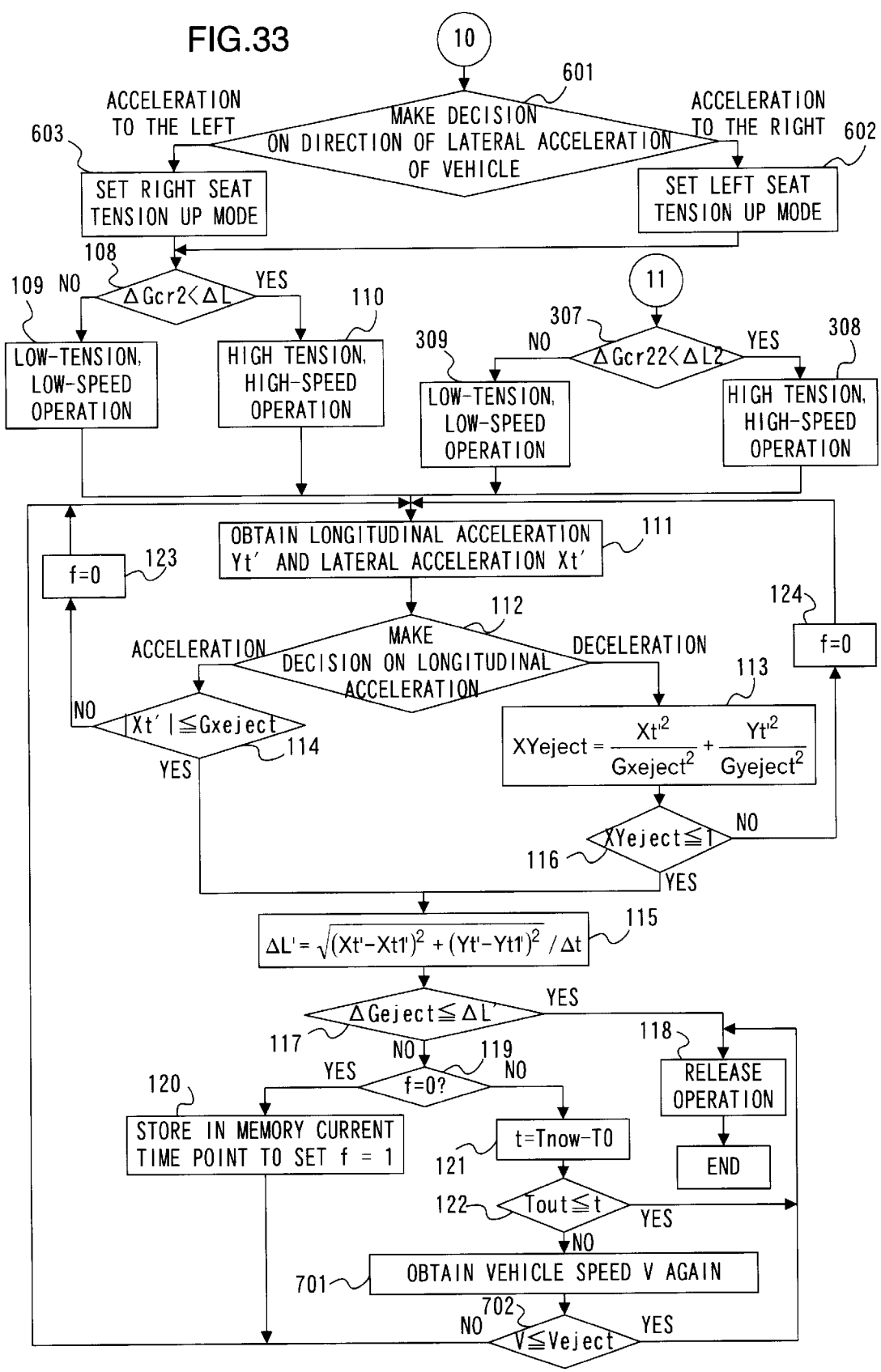
FIG. 33 presents a flowchart of the tension application operation executed in the seventh embodiment, in continuation from FIG. 32.

The seventh embodiment is now explained in reference to FIGS. 32 and 33. It is to be noted that since the structure adopted in the occupant restraint system in the seventh embodiment is identical to that of the fifth embodiment shown in FIG. 23, its explanation is omitted.

FIGS. 32 and 33 present a flowchart of the tension application operation executed in the seventh embodiment. It is to be noted that the same step numbers are assigned to steps in which processing identical to that in FIGS. 26 and 27 is executed and the following explanation focuses on the features that differentiate the seventh embodiment. In the seventh embodiment, steps 701 and 702 are executed between steps 122 and 111 (see FIG. 33). In steps 701 and 702, the speed V of the vehicle 1 is ascertained and a decision is made with regard to the operation release of the reversible seat belt tension application mechanism 7. Other aspects of the operation are identical to those of the sixth embodiment.

In step 701, the current speed V of the vehicle 1 is obtained from the vehicle speed sensor 27 and then the operation shifts to step 702. In step 702, the vehicle speed V is compared with a value Veject set in advance in the controller 9 to make a decision with regard to a release of the reversible seat belt tension application mechanism 7 already engaged in operation. The applicable decision-making conditions are as follows.

Condition 32; V≦Veject (the operation shifts to step 118)

Condition 33; Veject<V (the operation returns to step 111)  (expression 25)

Condition 32 means that the state of the vehicle 1 satisfies the operation release condition and the speed V of the vehicle 1 has become low enough while still making a decision as to whether or not the length of time Tout has elapsed. If the speed V of the vehicle 1 becomes lower than the preset value Veject, the operation shifts to step 118. In step 118, a release signal for stopping the operation of the reversible seat belt tension application mechanism 7 to eliminate the tension at the seat belt 6 is transmitted.

If, on the other hand, condition 33 is satisfied, the speed of the vehicle 1 is not low enough yet and thus, it is still necessary to continuously restrain the upper body of the occupant 5 by sustaining the tension at the seat belt 6. In this case, the operation shifts to step 111 again to execute the release decision-making.

In the seventh embodiment, by executing the processing in steps 701 and 702, the tension at the seat belt 6 can be eliminated with appropriate timing when the speed of the vehicle 1 is lowered to a level at which the occupant 5 no longer feels the need for the restraint by the seat belt 6. As a result, the passenger is more effectively spared the discomfort of unnecessary restriction from the seat belt 6. If, on the other hand, the speed of the vehicle 1 is high, the tension at the seat belt 6 is sustained and thus, the restraint on the occupant 5 achieved by the seat belt 6 imparts a more appropriate amount of restraint. In addition, in the event of a subsequent vehicle collision, another restraint system can be deployed more effectively. It is to be noted that other functions and advantages achieved in the embodiment are identical to those of the sixth embodiment.

(Eighth Embodiment)

The eighth embodiment is now explained in reference to FIGS. 34~38. It is to be noted that since the structure adopted in the occupant restraint system in the eighth embodiment is identical to that of the fifth embodiment shown in FIG. 23, its explanation is omitted. In the eighth embodiment, the controller 9 stores in memory a left-side seat map 12a shown in the FIG. 34A and a right-side seat map 12b shown in FIG. 34B.

Figure 35:
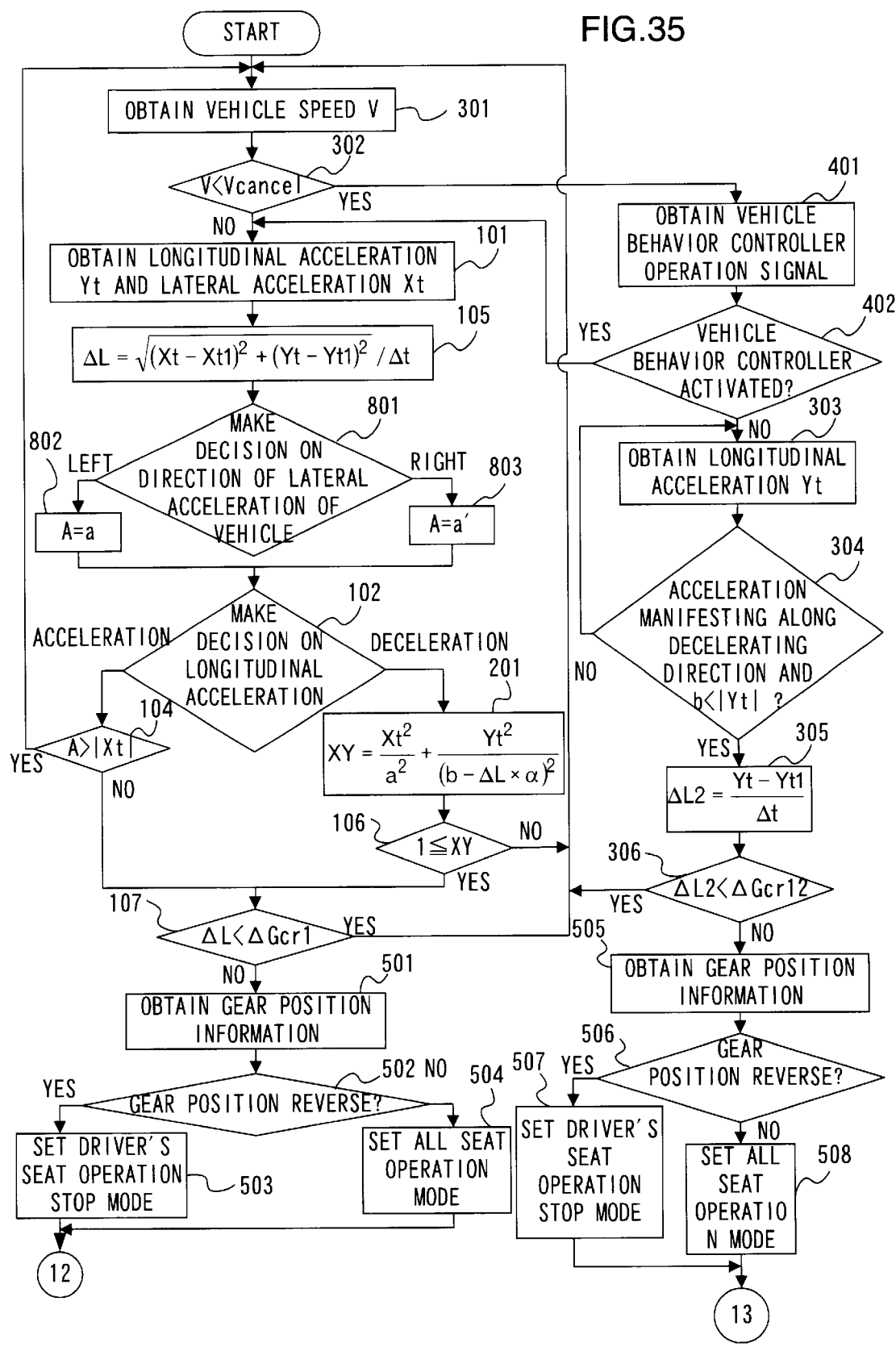
FIG. 35 presents a flowchart of the tension application operation executed exclusively for the left-side seat in an eighth embodiment.
Figure 36:
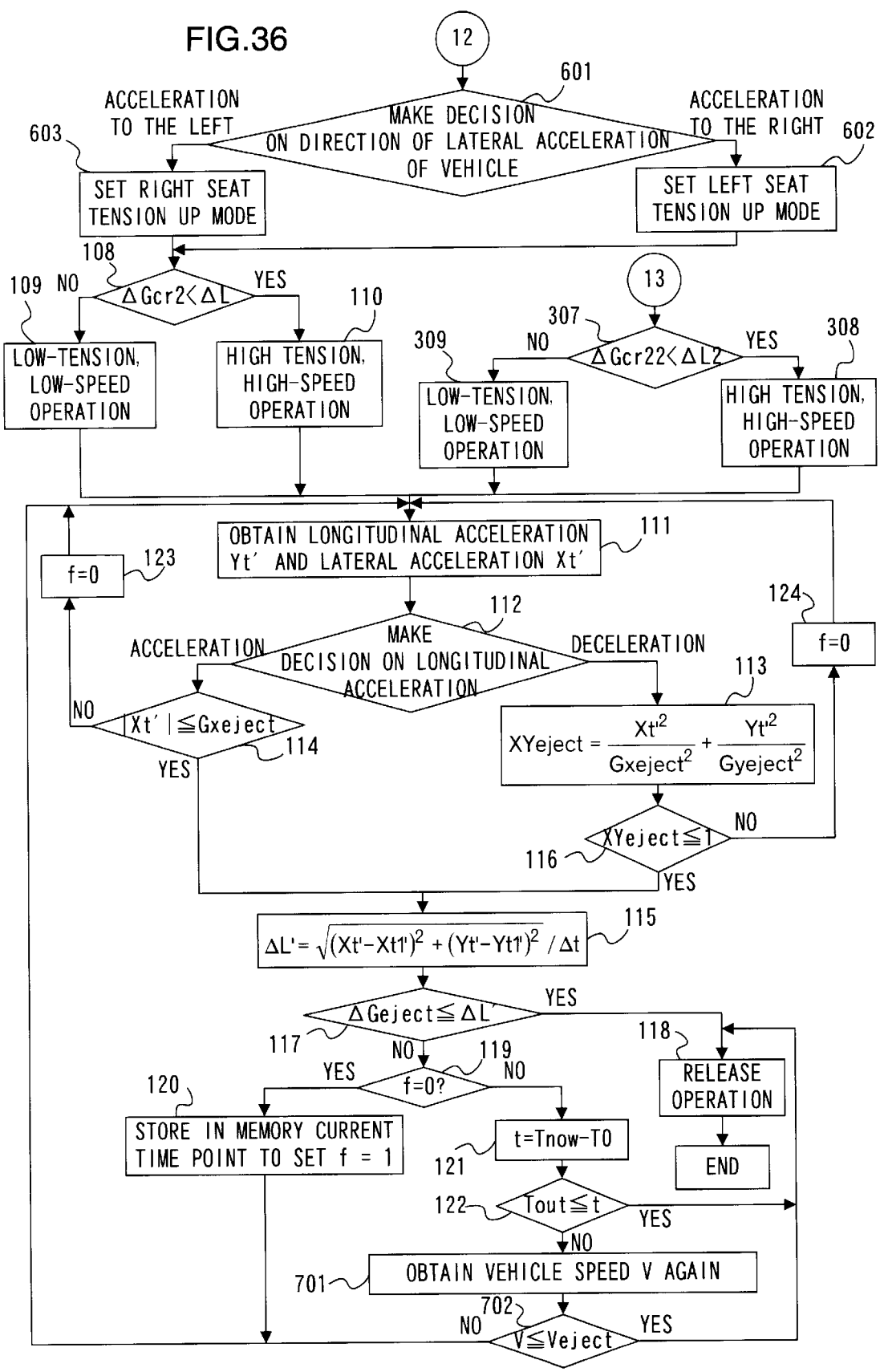
FIG. 36 presents a flowchart of a tension application operation executed exclusively for the left-side seat in the eighth embodiment, in continuation from FIG. 35.
Figure 37:
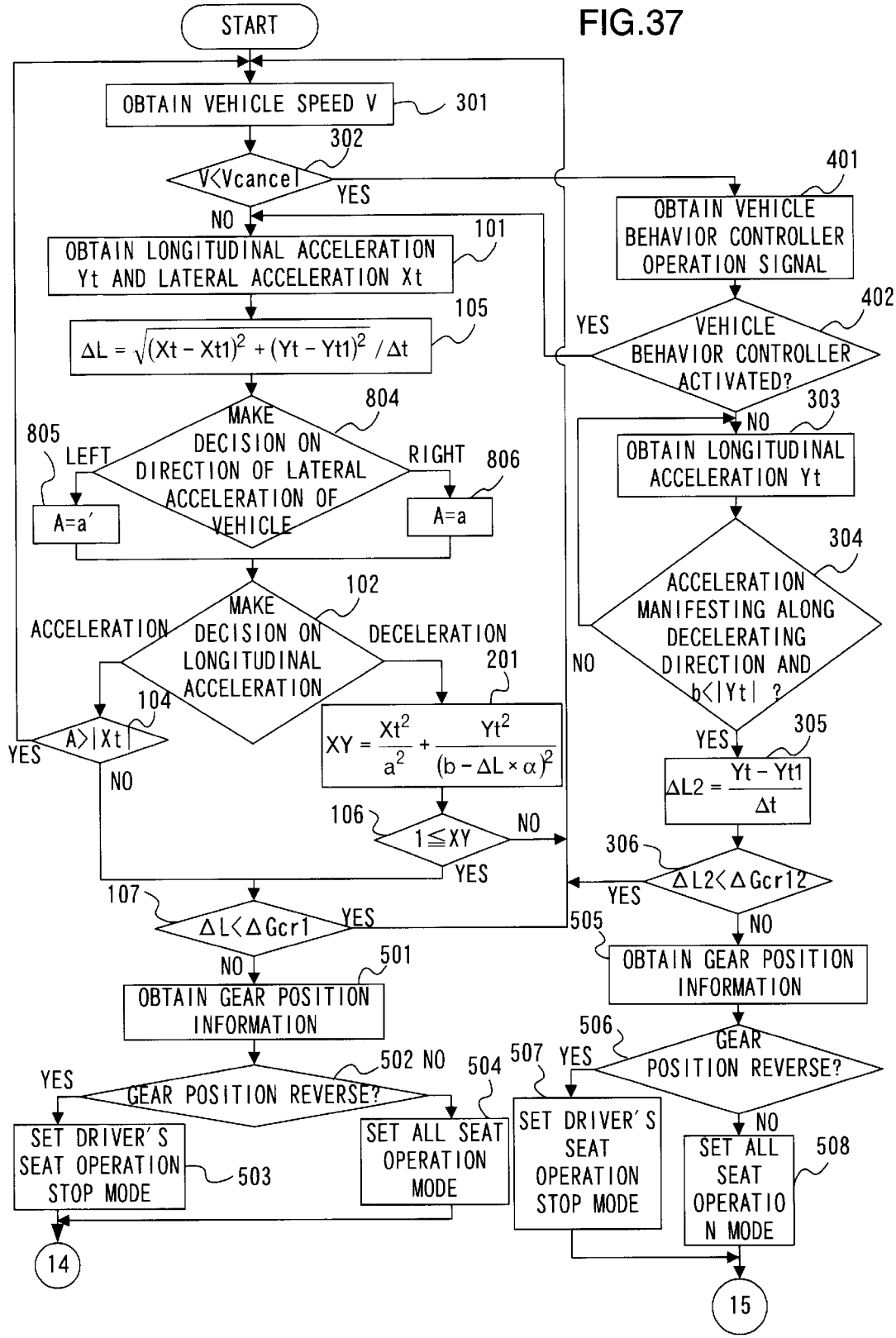
FIG. 37 presents a flowchart of the tension application operation executed exclusively for the right-side seat in the eighth embodiment.
Figure 38:
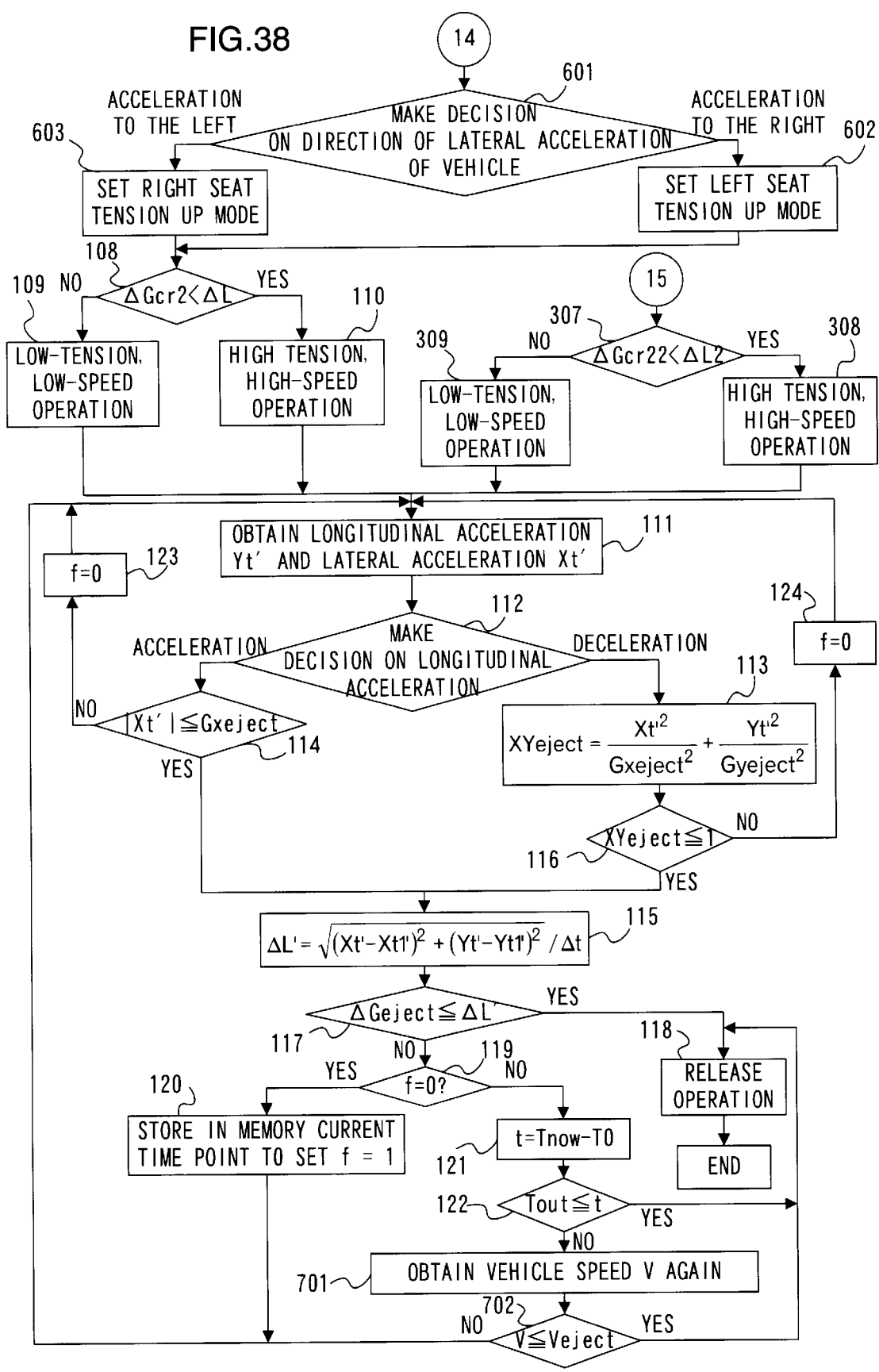
FIG. 38 presents a flowchart of the tension application operation executed exclusively for the right-side seat in the eighth embodiment, in continuation from FIG. 37.

FIGS. 35 and 36 present a flowchart of the tension application operation executed for left-side seats and FIGS. 37 and 38 present a flowchart of the tension application operation executed for a right-side seat. While these operations are basically identical to each other, they differ in that the left-side seat map 12a is used in the tension application operation for the left-side seats in FIGS. 35 and 36, whereas the right-side seat map 12b is used in the tension application operation for the right-side seats in FIGS. 37 and 38.

In the tension application operation for the left-side seats shown in FIGS. 35 and 36, steps 801~803 are executed between steps 105 and 102 to determine the direction of the lateral (left/right) acceleration of the vehicle 1 and to set the parameters accordingly. Likewise, in the tension application operation for the right-side seats in FIGS. 37 and 38, steps 804~806 are executed between steps 105 and 102 to determine the direction of the lateral (left/right to) acceleration of the vehicle 1 and to set the parameters accordingly. Other aspects of the processing are identical to those of the processing executed in the seventh embodiment explained earlier.

Now, the explanation is given to the tension application operation for the left-side seats in reference to FIGS. 35 and 36.

In step 801, the direction of the lateral (left/right) acceleration manifesting in the vehicle 1 is determined based upon the sign attached to the value indicating the lateral (left/right) acceleration of the vehicle 1, and then the operation shifts to either step 802 or step 803. The applicable decision-making conditions are as follows.

Condition 34; acceleration to the right (the operation shifts to step 803)

Condition 35; acceleration to the left (the operation shifts to step 802)  (expression 26)

If an acceleration to the left is manifesting in the vehicle, the horizontal axis intersecting value 18a of the semi-elliptic operation decision-making threshold line 17a is set to the initial setting value −a in step 802. If acceleration to the right is manifesting in the vehicle, the horizontal axis intersecting value 18b of the semi-elliptic operation decision-making threshold line 17a is set to value a' which is smaller than the initial setting value a in step 803.

If condition 34 is satisfied, the lateral acceleration generated at the vehicle 1 manifests along the direction whereby the upper bodies of the occupant 5 is caused to move to the right. Thus, the upper body of the left-side seat occupant 5 moves as if to slip out of the shoulder belt. For this reason, when condition 34, in which the acceleration is manifesting to the right is present, the intersecting value 18b of the semi-elliptic operation decision-making threshold line 17a is changed to the smaller value a' (<a), as shown in FIG. 34A. In addition, a threshold line 17f indicating that X=a' is selected as the rectilinear operation decision-making threshold line in the fourth quadrant.

When condition 35 is satisfied, the lateral acceleration of the vehicle 1 is not manifesting along the direction whereby the upper body of the left-side seat occupant 5 moves as if to slip out of the shoulder belt. Accordingly, the intersecting value 18a is set to −a to use the semi-elliptic operation decision-making threshold line 17a and a threshold line 17b indicating that X=−a is selected for the rectilinear operation decision-making threshold line in the third quadrant.

It is to be noted that in the tension application operation for the right-side seat shown in FIGS. 37 and 38, steps 805 and 806 is executed instead of the processing in steps 802 and 803 for setting the parameters for the left side seat tension application operation. When an acceleration is generated at the vehicle 1 along the direction whereby the upper body of the occupant 5 is moved to the left, the upper body of the right-side seat occupant 5 moves as if to slip out of the shoulder belt. Accordingly, when an acceleration to the left is manifesting in the vehicle, the intersecting value 18a of the semi-elliptic operation decision-making threshold line 17a is changed to a large value −a' (>−a), as shown in FIG. 34B. In addition, a threshold line 17g indicating that X=−a' is selected as the rectilinear operation decision-making threshold line in the third quadrant. If, on the other hand, an acceleration to the right is manifesting, the lateral acceleration of the vehicle 1 does not cause the upper body of the right-side seat occupant 5 to move as if to slip out of the shoulder belt. Accordingly, the intersecting value 18b is set to the preset value a to use the semi-elliptic operation decision-making threshold line 17a and the threshold line 17c indicating that X=a is selected for the rectilinear operation threshold line in the fourth quadrant.

When the left-side seat tension application operation and the right-side seat tension application operations are executed separately in this manner, the timing of the operation start decision-making for the left-side seat and the timing for the operation starting decision-making for the right-side seat become different from each other and, accordingly, it is necessary to execute the individual steps of the left-side seat tension application operation and the right-side seat tension application operation in parallel to each other. For this purpose, separate microcomputers for executing the left-side seat tension application operation and the right-side seat tension application operation may be provided within the controller 9, for instance. Alternatively, a common microcomputer may be utilized to execute in parallel the left-side seat tension application operation and the right-side seat tension application operations, one step at a time.

In the eighth embodiment, the left-side seat tension application operation and the right-side seat tension application operation are executed independently of each other and, as a result, the reversible seat belt tension application mechanism 7 for the left-side seat can be activated sooner than the reversible seat belt tension application mechanism 7 for the right-side seat while the acceleration is still low when an acceleration is manifesting to the right. If, on the other hand, an acceleration is manifesting to the left, the reversible seat belt tension application mechanism 7 for the right-side seat can be activated sooner than the reversible seat belt tension application mechanism 7 for the left-side seat. Thus, tension can be applied to the seat belts on the appropriate side sooner in conformance to the specific direction of the lateral (left/right) acceleration of the vehicle 1 to prevent the occupant 5 seated on that side from slipping out from the seat belt 6 along the lateral direction. In addition, by restraining the upper bodies of the occupants 5 with the tension of the seat belts 6, an appropriate amount of restraint can be imparted more effectively. Furthermore, since the movement of the upper bodies of the occupants 5 are restrained in case a collision occurs subsequently another restraint system can be deployed with more effectiveness. It is to be noted that other functions and advantages achieved in the embodiment are identical to those of the seventh embodiment.

The first~eighth embodiments described above eliminate the need for the vehicle forward object detection sensor provided in the occupant restraint systems in the related art that determine whether to apply tension to a seat belt by detecting an object ahead of the vehicle with the sensor and judging the condition existing between the vehicle and the object based upon the detection results and, consequently, they achieve a reduction in the system production cost.

In addition, in the first eighth embodiments explained above, the upper bodies of the occupants can be restrained with a high degree of reliability at an early stage while the vehicle is traveling through a turn on a winding road without having to detect any vehicle coming from the opposite direction on the inner lane of the road and thus, an appropriate feeling of restraint can be imparted to the occupants.

(Ninth Embodiment)

The ninth embodiment is now explained in reference to FIGS. 39~43. It is to be noted that since the structure adopted in the ninth embodiment is identical to that shown in FIG. 1, its explanation is omitted.

Figure 39:
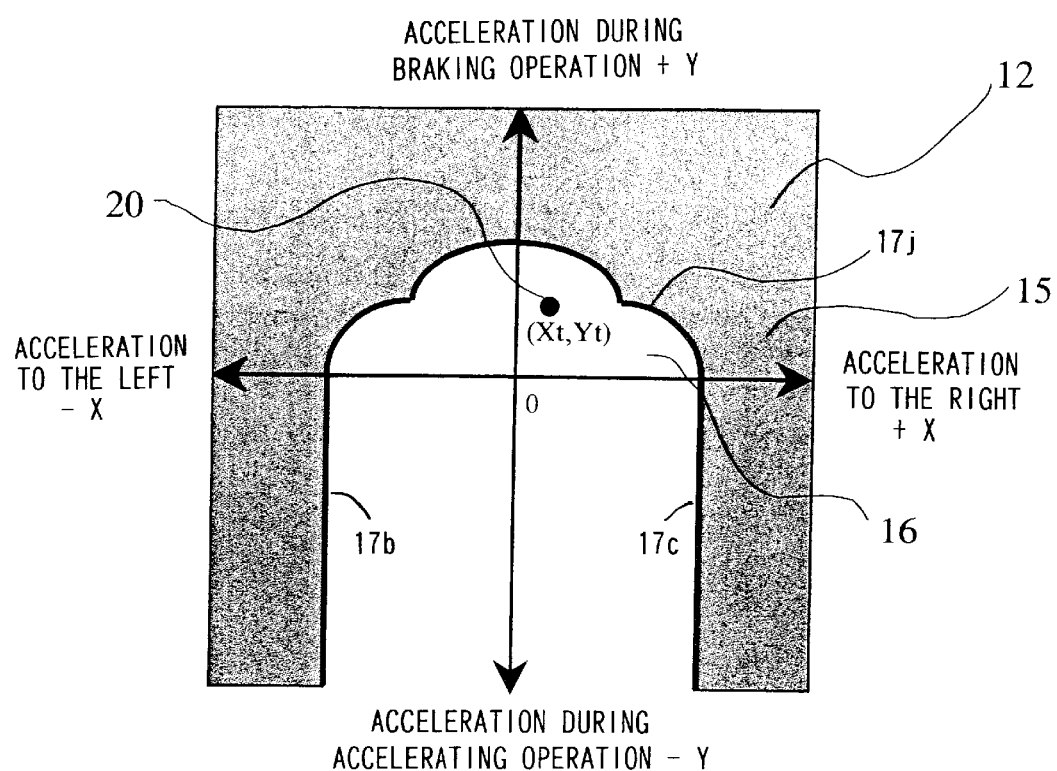
FIG. 39 shows the operation/non-operation decision-making map used in a ninth embodiment.

In the ninth embodiment, an operation decision-making threshold line 17j such as the one shown in FIG. 39 is used instead of the semi-elliptic operation decision-making threshold line 17a explained earlier in reference to the map in FIG. 2. The operation decision-making threshold line 17j has a substantial semi-elliptic shape achieved by connecting three quadratic curves at two inflection points. As explained earlier, the range 15 on the outside of the threshold lines 17j, 17b and 17c is the operating range 15 over which the reversible seat belt tension application mechanism 7 is activated to apply tension to the seat belt 6. The area 16 enclosed by the threshold lines 17j, 17b and 17c is the non-operating range 16 in which the reversible seat belt tension application mechanism 7 is not engaged in operation and thus no tension is applied to the seat belt 6.

Figure 40:
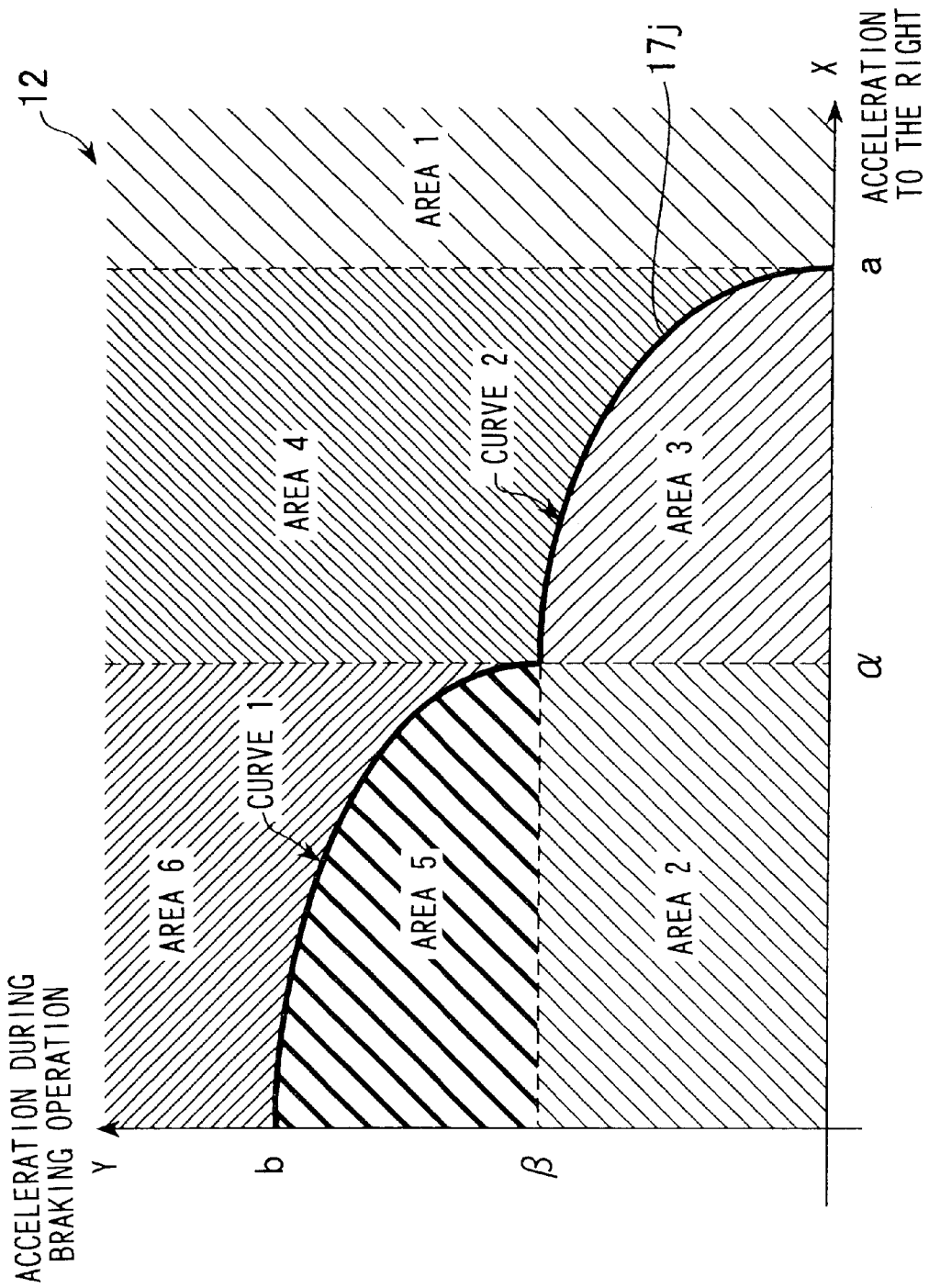
FIG. 40 shows an enlargement of the first quadrant of the map in FIG. 39.

FIG. 40 is an enlargement of the first quadrant of the map 12 shown in FIG. 39. In the first quadrant of the map 12, the longitudinal acceleration manifests as a deceleration and the lateral acceleration manifests to the right. In the first quadrant of the map 12, the operation decision-making threshold line 17j includes two quadratic curves connected at one inflection point. With (α, β) representing the coordinates of the inflection point, the two quadratic curves are defined as follows.

Curve 1; $Y=AX^2+BX+C$

Curve 2; $Y=A'X^2+B'X+C'$ (expression 27)

It is to be noted that the curve 1 and the curve 2 may have identical shapes and one of them may be shifted so that there are two curves in the quadrant.

Figure 41:
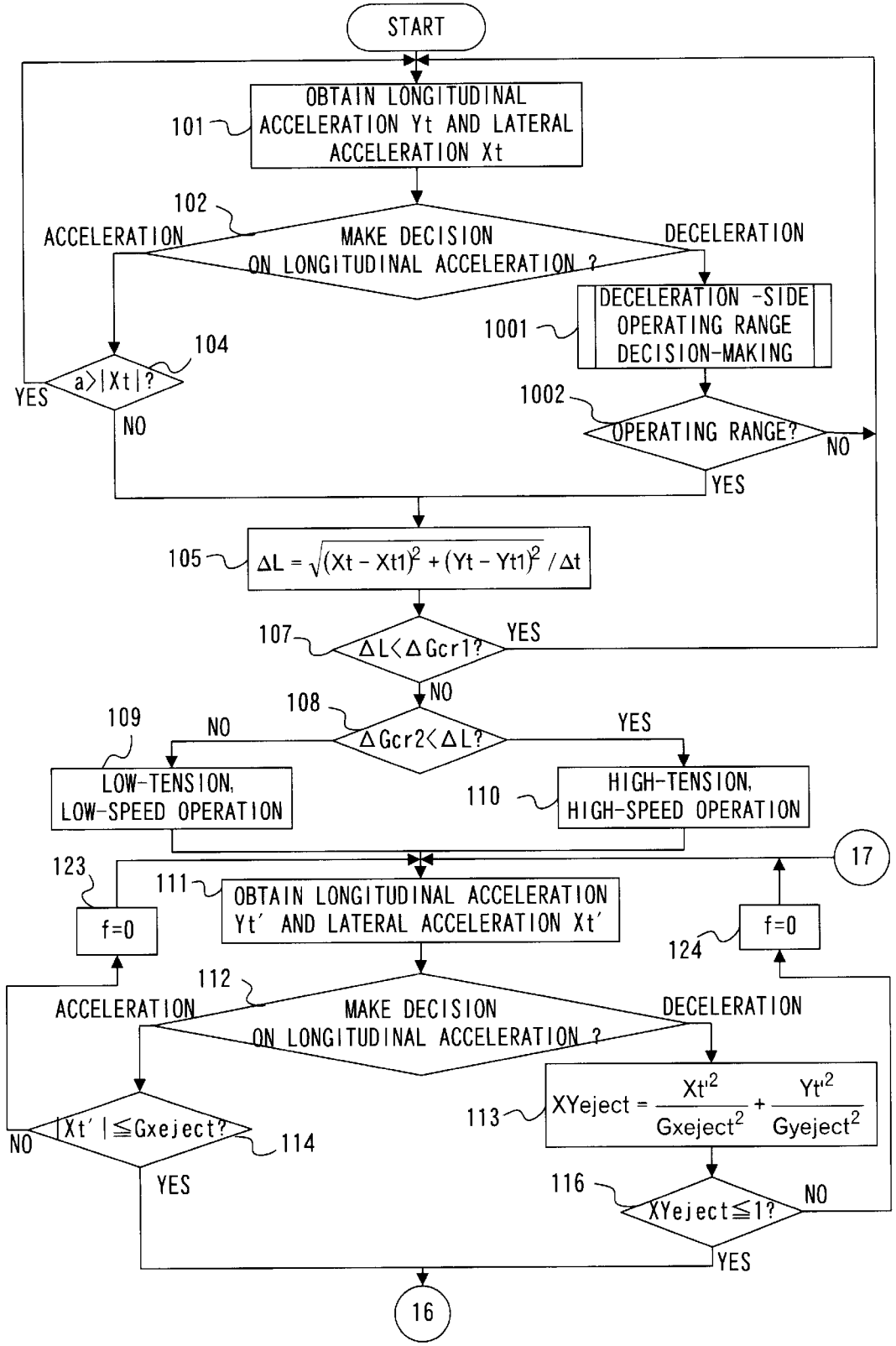
FIG. 41 presents a flowchart of the tension application operation executed in the ninth embodiment.
Figure 42:
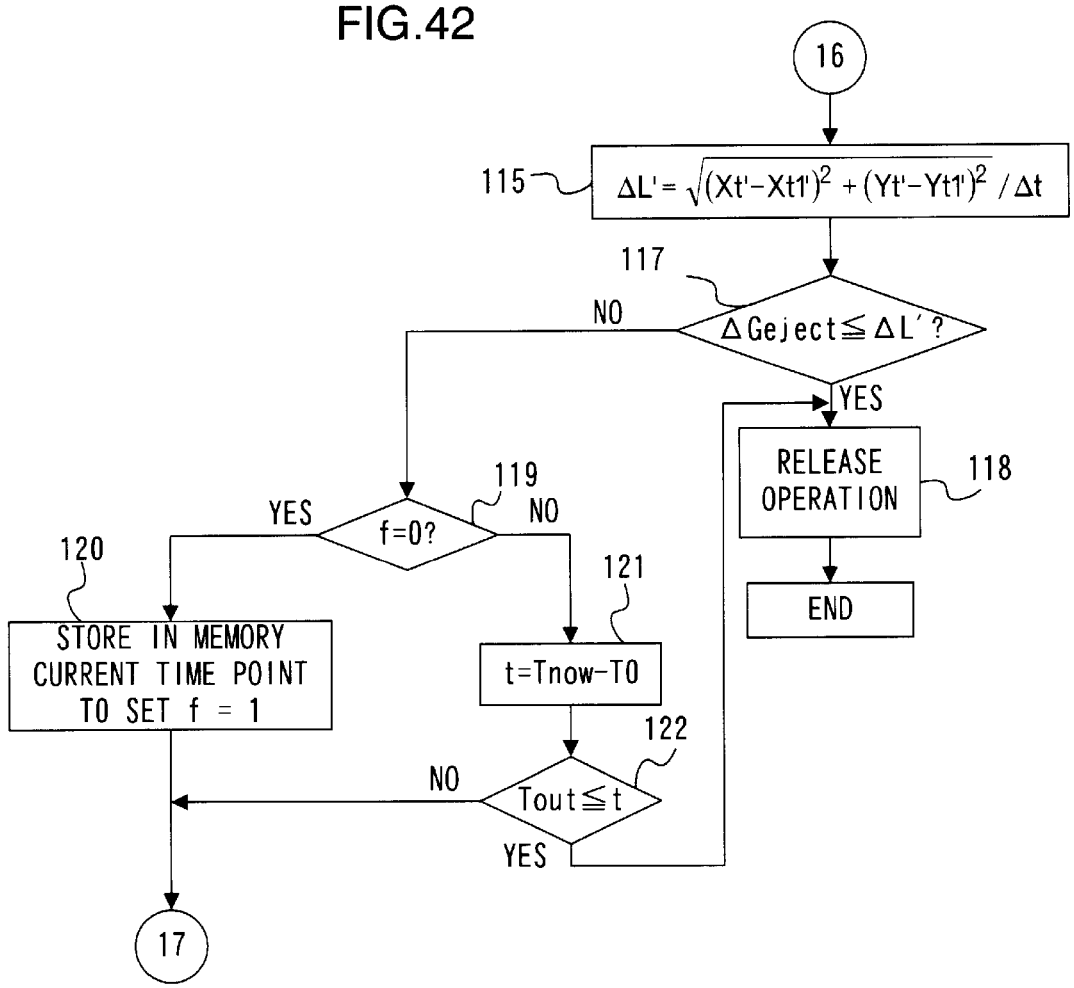
FIG. 42 presents a flowchart of the tension application operation executed in the ninth embodiment, in continuation from FIG. 41.

FIGS. 41 and 42 present a flowchart of the tension application operation executed in the ninth embodiment. It is to be noted that the same step numbers are assigned to steps in which processing identical to that in FIGS. 6 and 7 is executed and the following explanation focuses on the features that differentiate the ninth embodiment.

If it is decided in step 102 that the value of the longitudinal acceleration Yt indicates that the vehicle is being braked (decelerating) the operation proceeds to step 1001. In step 1001, the subroutine shown in FIG. 43 is executed to determine whether the state of the vehicle is in the operating range 15 over which the reversible seat belt tension application mechanism 7 needs to engage in operation as the vehicle decelerates or in the non-operating range 16 in which the reversible seat belt tension application mechanism 7 is not activated.

Figure 43:
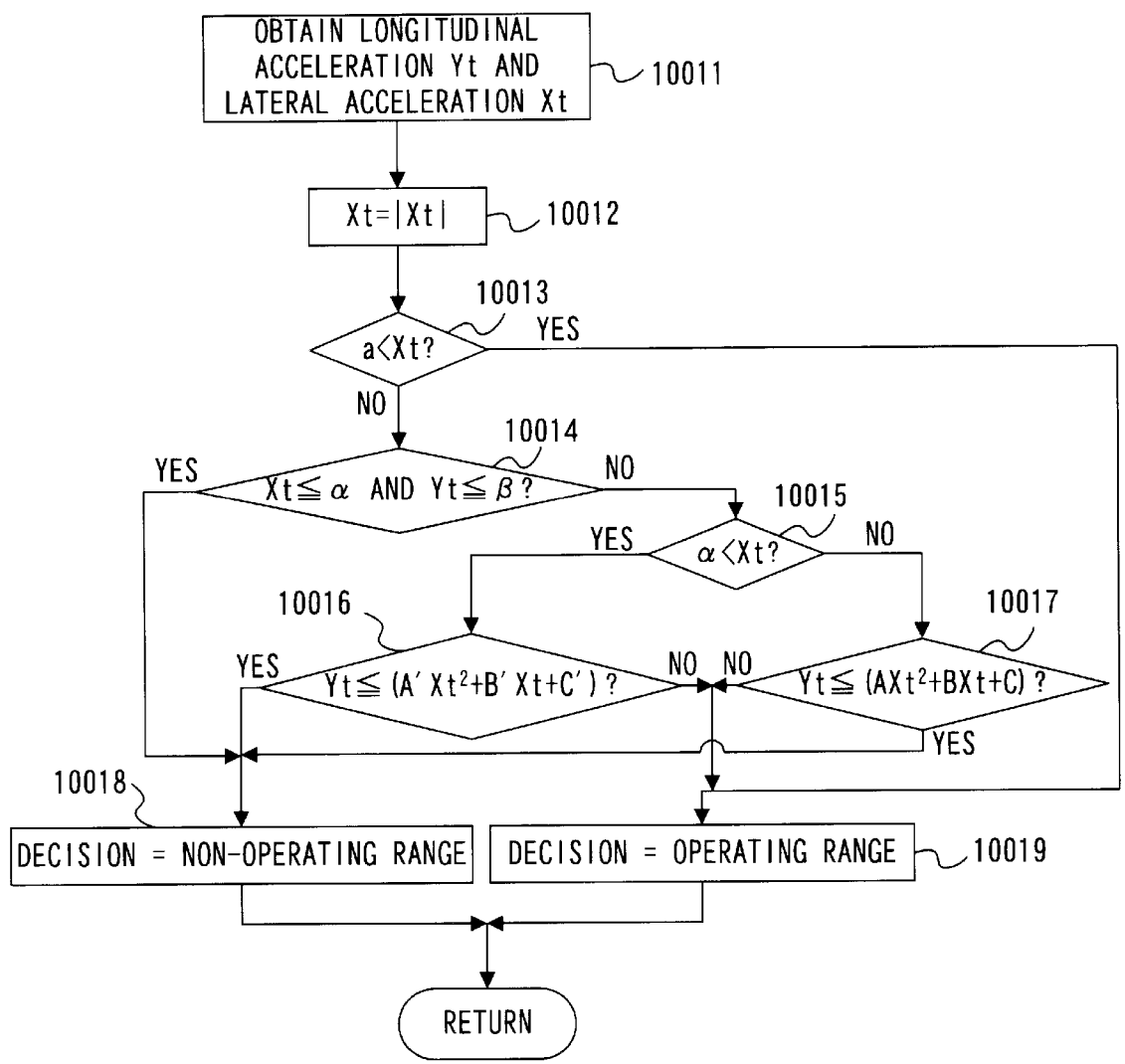
FIG. 43 presents a flowchart of the operating range/non-operating range decision-making subroutine executed in the ninth embodiment.

In step 10011 in FIG. 43, the longitudinal acceleration Yt and the lateral (left/right) acceleration Xt are obtained. In the following step 10012, the absolute value of the lateral (left/right) acceleration Xt is determined. This step is executed by using the operation decision-making threshold line 17j in the map 12 shown in FIG. 40, which achieves symmetry relative to the Y axis so that the processing load in the decision-making steps implemented to determine whether or not the reversible seat belt tension application mechanism 7 is to be engaged in operation is reduced. Therefore, the onus on the controller 9 is lessened so that, as a result, the length of time required for the operation decision-making processing is reduced to activate the reversible seat belt tension application mechanism 7 quickly if it needs to be engaged in operation. Then, a verification is made to ascertain whether the acceleration indicator point 20 determined by the longitudinal acceleration Yt and the lateral acceleration Xt the absolute value of which has been determined is in the operating range 15 or in the non-operating range 16.

The first quadrant of the map 12 is divided into a plurality of areas as shown in FIG. 40, and a decision is made as to whether each area is contained in the operating range 15 or the non-operating range 16.

Area 1; $a<Xt$ . . . operating range 15

Area 2; $0≦Xt≦α$ and $0≦Yt≦β$ . . . non-operating range 16

Area 3; $α<Xt≦a$ and $Yt≦(A'Xt^2+B'Xt+C')$ . . . non-operating range 16

Area 4; $α<Xt≦a$ and $(A'Xt^2+B'Xt+C')<Yt$ . . . operating range 15

Area 5; $0≦Xt≦α$ and $β<Yt≦(AXt^2+BXt+C)$ . . . non-operating range 16

Area 6; $0≦Xt≦α$ and $(AXt^2+BXt+C)<Yt$ . . . operating range 15 (expression 28)

In step 10013, a decision is made as to whether or not the current acceleration indicator point 20 (Xt, Yt) is in the area 1.

Condition 36; $Xt>a$ (the operation shifts to step 10019)

Condition 37; $Xt≦a$ (the operation shifts to step 10014)

If condition 36 is confirmed, the operation proceeds to step 10019 to determine that the current acceleration indicator point 20 (Xt, Yt), which is present in the area 1 in FIG. 40, is in the operating range 15. If, on the other hand, condition 37 is confirmed, the operation proceeds to step 10014 to continue the decision-making processing.

In step 10014, a verification is made to ascertain whether or not the current acceleration indicator point (Xt, Yt) is in the area 2 in FIG. 40 which is enclosed by α and β.

Condition 38; $Xt≦α$ and $Yt≦β$ (the operation shifts to step 10018)

Condition 39; $Xt>α$ or $Yt>β$ (the operation shifts to step 10015) (expression 30)

If condition 38 is confirmed, the operation proceeds to step 10018 to determine that the current acceleration indicator point 20 (Xt, Yt), which is present in the area 2, is in the non-operating range 16. If, on the other hand, condition 39 is confirmed, the operation proceeds to step 10015 to continue the decision-making processing.

In step 10015, a decision is made as to which of the two curves constituting the operation decision-making threshold curve is to be used. The two curves, i.e., the curve 1 and the curve 2, constituting the operation decision-making threshold curve are connected at the inflection point (α, β) One of the curves is selected based upon the relationship between the inflection point (α, β) and the lateral acceleration Xt.

Condition 40; $α<Xt$ (the operation shifts to step 10016)

Condition 41; $Xt≦α$ (the operation shifts to step 10017) (expression 31)

Condition 40 means that the current acceleration indicator point 20 (Xt, Yt) is further to the right in relation to the inflection point (α, β) and, accordingly, if condition 40 is confirmed, the operation proceeds to step 10016 to make the operation/non-operation decision by using the operation decision-making threshold curve 2. Condition 41, on the other hand, means that the current acceleration indicator point 20 (Xt, Yt) is further to the left relative to the inflection point (α, β) and, accordingly, if condition 41 is confirmed, the operation proceeds to step 10017 to engage in the decision-making processing by using the operation decision-making threshold curve 1.

In step 10016, a decision is made as to whether the current acceleration indicator point 20 (Xt, Yt) is in the area 3 or the area 4.

Condition 42; $Yt≦(A'Xt^2+B'Xt+C')$ (the operation shifts to step 10018)

Condition 43; $(A'Xt^2+B'Xt+C')<Yt$ (the operation shifts to step 10019) (expression 32)

If condition 42 is confirmed, the operation proceeds to step 10018 to determine that the current acceleration indicator point 20 (Xt, Yt) which is present in the area 3, is in the non-operating range 16. If, on the other hand, condition 43 is confirmed, the operation proceeds to step 10019 to determine that the current acceleration indicator point 20 (Xt, Yt) which is present in the area 4, is in the operating range 15.

In step 10017, a decision is made as to whether the current acceleration indicator point 20 (Xt, Yt) is in the area 5 or the area 6.

Condition 44; $Yt≦(AXt^2+BXt+C)$ (the operation shifts to step 10018)

Condition 45; $(AXt^2+BXt+C)<Yt$ (the operation shifts to step 10019) (expression 33)

If condition 44 is confirmed, the operation proceeds to step 10018 to determine that the current acceleration indicator point 20 (Xt, Yt) which is present in the area 5 is in the non-operating range 16. If, on the other hand, condition 45 is confirmed, the operation proceeds to step 10019 to determine that the current acceleration indicator point 20 (Xt, Yt), which is present in the area 6, is in the operating range 15.

After it is determined whether the current acceleration indicator point 20 (Xt, Yt) is in the operating range 15 or the non-operating range 16, the operation returns to step 1002 in FIG. 41. After step 1002, the processing branches based upon the results of the decision made in step 1002.

Condition 46; decision-making results=non-operating range 16: the operation returns to step 101

Condition 47; decision-making results=operating range 15: the operation shifts to step 105                    (expression 34)

If the decision-making results indicate the non-operating range 16, the current longitudinal acceleration Yt and lateral (left/right) acceleration Xt are not represented by values in the range over which the reversible seat belt tension application mechanism 7 needs to be activated to apply tension to the seat belt 6, and accordingly, the operation returns to step 101. If, on the other hand, the decision-making results indicate the operating range 15, the operation proceeds to step 105 to determine the operating mode to be assumed in the reversible seat belt tension application mechanism 7 as explained earlier.

As explained above, in the ninth embodiment an XY two-dimensional map with its +Y axis representing the deceleration (negative acceleration) of the vehicle along the longitudinal direction, its −Y axis representing the acceleration of the vehicle along the longitudinal direction, its +X axis representing the acceleration of the vehicle to the right and its −X axis representing the acceleration of the vehicle to the left is used. In the first and second quadrants of the map, a substantial semi-elliptic operation decision-making threshold line intersecting the +X axis at a (a is an arbitrary value), intersecting the −X axis at −a and intersecting the +Y axis at +b (b is an arbitrary value satisfying b<a), which is achieved by connecting three quadratic curves at two inflection points, is set. Tension is applied to the seat belt if the point on the map determined by the vehicle longitudinal acceleration value and the vehicle lateral acceleration value detected as the vehicle decelerates is outside the range enclosed by the semi-elliptic operation decision-making threshold line 17j and the X axis.

In the ninth embodiment, tension is applied to the seat belts at a lower vehicle longitudinal deceleration rate. Thus, the extent to which the upper bodies of the occupants are allowed to move forward during a vehicle deceleration is reduced to prevent them from moving too close to the steering wheel on the driver's seat side or to the dashboard on the passenger's seat side. As a result, since ample distances are assured between the occupants and the steering wheel and between the occupants and the dashboard, the air bags can be deployed more effectively in the event of a subsequent collision at the front of the vehicle.

In addition, the intersecting value a at which the operation decision-making threshold line 17j intersects the X axis representing the vehicle lateral acceleration is set larger than the intersecting value b at which the operation decision-making threshold line 17j intersects the Y axis representing the vehicle longitudinal acceleration. Accordingly, the vehicle must accelerate laterally at a higher rate to activate the reversible seat belt tension application mechanism 7 to apply tension to the seat belt compared to the acceleration along the longitudinal direction. As a result, tension is not applied to the seat belt every time a slight lateral acceleration occurs at the vehicle as the vehicle travels on a winding road or engages in a turning operation. Thus, the occupants are spared the discomfort of unnecessary restriction.

In other words, in the ninth embodiment, the movement of the upper bodies of the occupants toward the front of the vehicle is effectively minimized during deceleration of the vehicle and also, frequent tension application while the vehicle travels on a winding road or is engaged in a turning operation is avoided to lessen the feeling of restriction.

(Tenth Embodiment)

Figure 44:
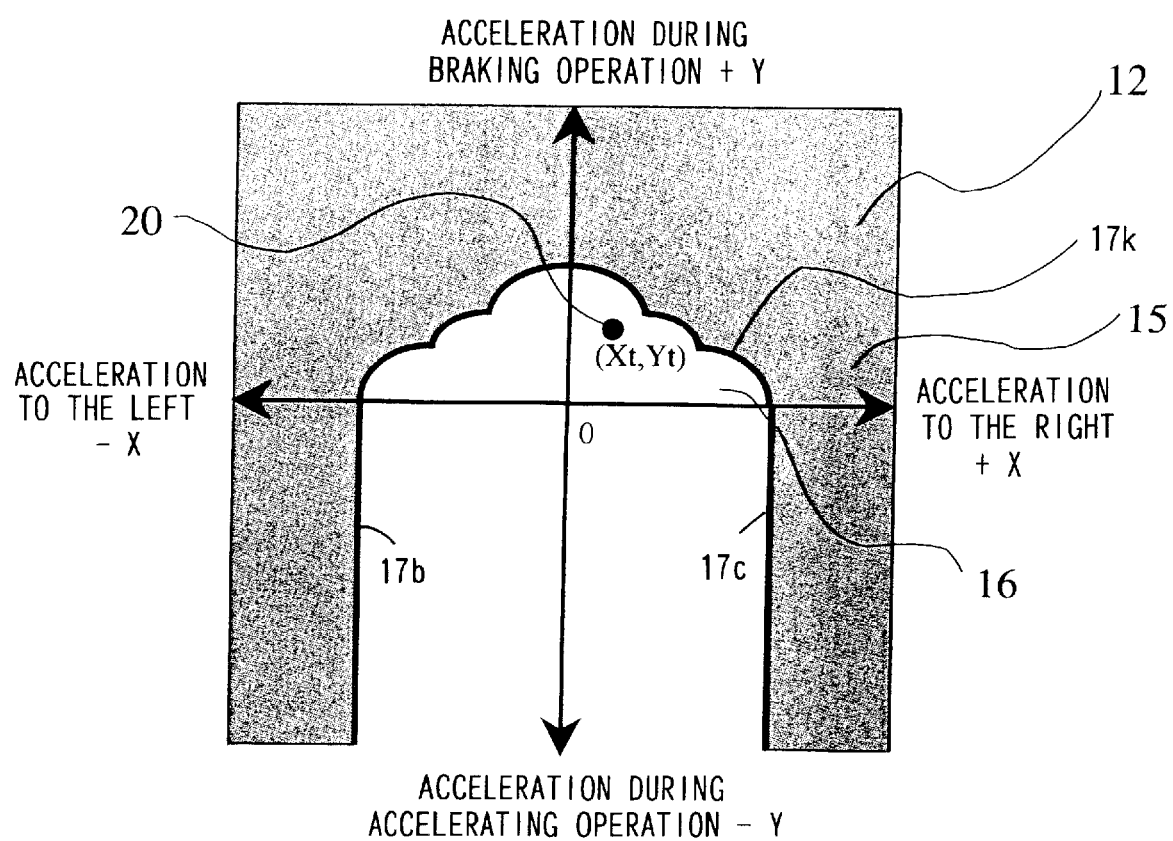
FIG. 44 shows the operation/non-operation decision-making map used in a tenth embodiment.
Figure 45:
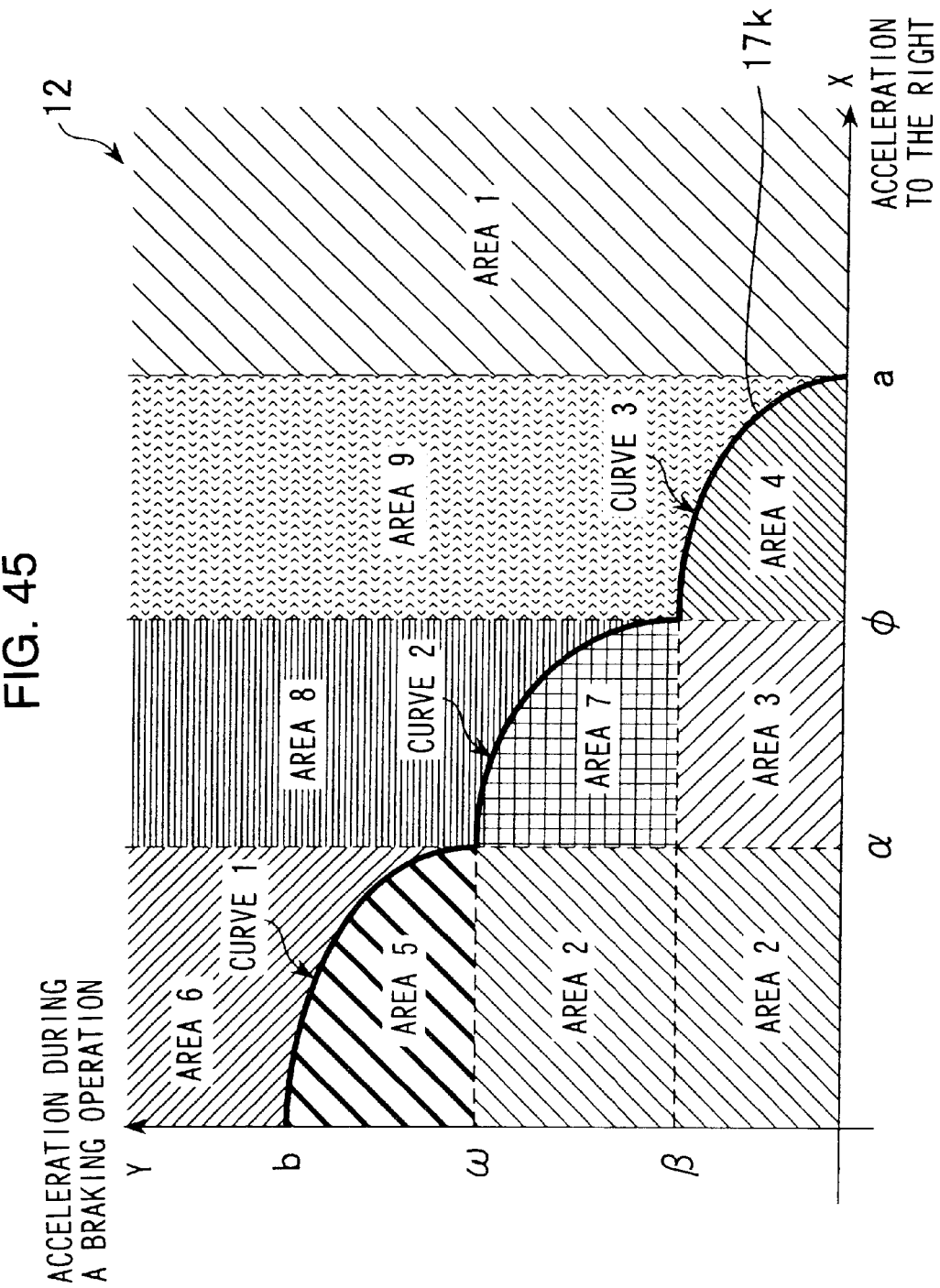
FIG. 45 shows an enlargement of the first quadrant of the map in FIG. 44.
Figure 46:
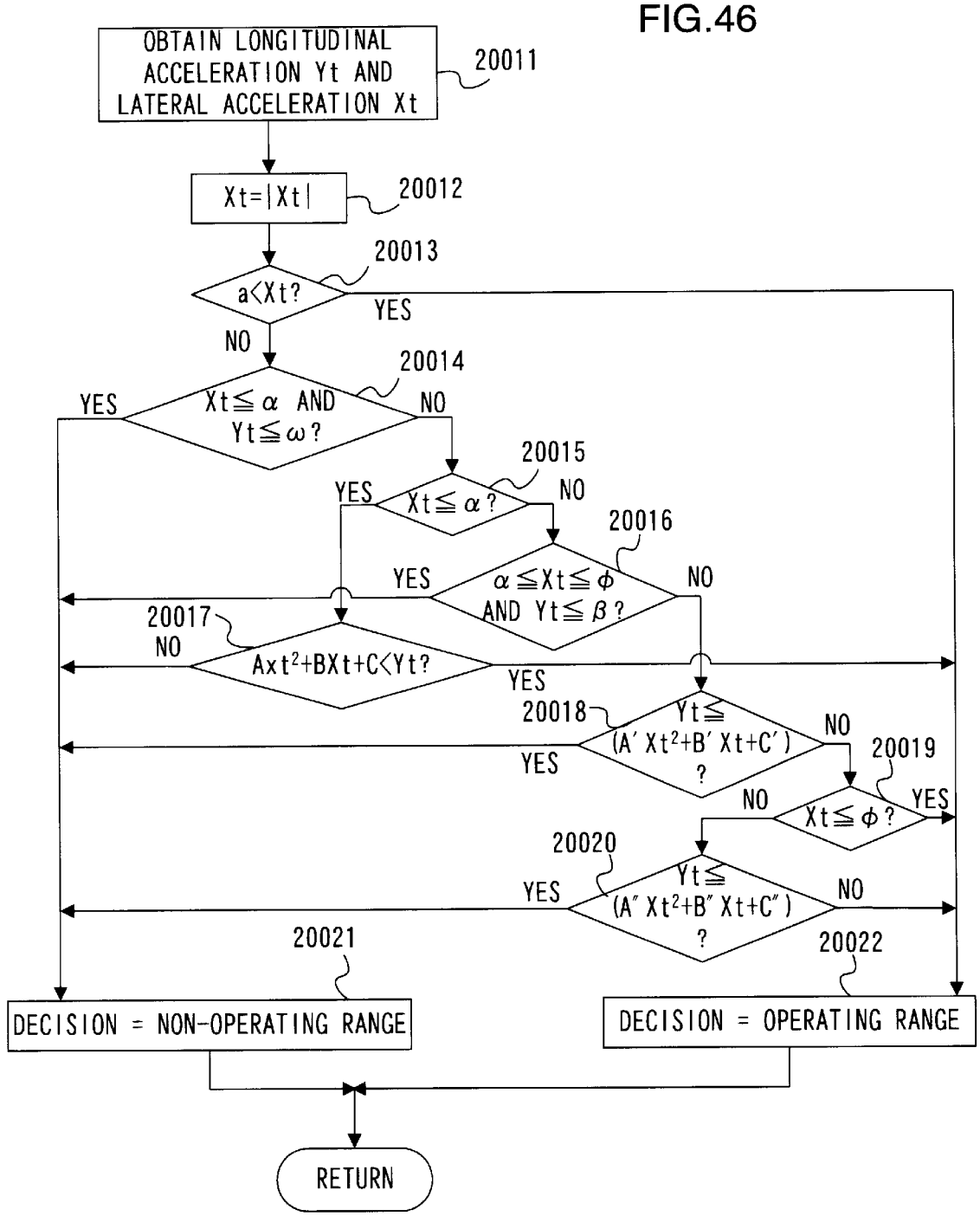
FIG. 46 presents a flowchart of the operating range/non-operating range decision-making subroutine executed in the tenth embodiment.

The tenth embodiment is now explained in reference to FIGS. 44–46. It is to be noted that since the structure adopted in the tenth embodiment is identical to that in FIG. 1, its explanation is omitted.

In the tenth embodiment, an operation decision-making threshold line 17k, which includes five quadratic curves and four inflection points, as shown in FIG. 44, is used instead of the operation decision-making threshold line 17j having three quadratic curves and two inflection points shown in FIG. 39. As explained earlier, the range 15 on the outside of the threshold lines 17k, 17b and 17c is the operating range over which the reversible seat belt tension application mechanism 7 needs to be activated to apply tension to the seat belt 6 and the area 16 enclosed by the threshold lines 17k, 17b and 17c is the non-operating range 16 over which the reversible seat belt tension application mechanism 7 is not activated to apply tension to the seat belt 6.

FIG. 45 is an enlargement of the first quadrant of the map 12 shown in FIG. 44. In the first quadrant of the map 12, the longitudinal acceleration manifests as a deceleration and the lateral (left/right) acceleration manifest to the right. In the first quadrant, the operation decision-making threshold line 17k includes three quadratic curves connected at two inflection points. With (α, ω) and (ø, β) representing the coordinates of these inflection points, the three quadratic curves are defined as follows.

Curve 1; $Y=AX^2+BX+C$

Curve 2; $Y=A'X^2+B'X+C'$

Curve 3; $Y=A''X^2+B''X+C''$                    (expression 35)

It is to be noted that two of, or all three of the curves 1, 2 and 3 may have shapes identical to one another and any of them may be shifted so that the threshold line includes three quadratic curves.

Since the tension application operation executed in the tenth embodiment is identical to the operation described in reference to FIGS. 41 and 42, its explanation is omitted. FIG. 46 presents a flowchart of the operating range/non-operating range decision-making subroutine executed in the tenth embodiment. This subroutine is executed instep 1001 in FIG. 41.

In step 20011 in FIG. 46, the longitudinal acceleration Yt and the lateral (left/right) acceleration Xt are obtained. In the following step 20012, the absolute value of the lateral (left/right) acceleration Xt is determined. This step is executed by using the operation decision-making threshold line 17k in the map 12 shown in FIG. 44, which achieves symmetry relative to the Y axis so that the processing load in the decision-making steps implemented to determine whether or not the reversible seat belt tension application mechanism 7 is to be engaged in operation is reduced. Therefore, the onus on the controller 9 is lessened so that, as a result, the length of time required for the operation decision-making processing is reduced to activate the reversible seat belt tension application mechanism 7 quickly if it needs to be engaged in operation. Then, a decision is made to ascertain whether the acceleration indicator point 20 (Xt, Yt) determined by the longitudinal acceleration Yt and the lateral acceleration Xt the absolute value of which has been determined is in the operating range 15 or in the non-operating range 16.

The first quadrant of the map 12 is divided into a plurality of areas as shown in FIG. 45, and a decision is made as to whether each area is contained in the operating range 15 or in the non-operating range 16.

Area 1; $a<Xt$ ... operating range 15

Area 2; $0 \leq Xt \leq \alpha$ and $0 \leq Yt \leq \omega$ ... non-operating range 16

Area 3; $\alpha \leq Xt \leq \phi$ and $0 \leq Yt \leq \beta$ ... non-operating range 16

Area 4; $\phi < Xt \leq a$ and $Yt < (A''Xt^2 + B''Xt + C'')$ ... non-operating range 16

Area 5; $0 \leq Xt \leq \alpha$ and $\omega < Yt \leq (AXt^2 + BXt + C)$ ... non-operating range 16

Area 6; $0 \leq Xt \leq \alpha$ and $(AXt^2 + BXt + C) < Yt$ ... operating range 15

Area 7; $\alpha < Xt \leq \phi$ and $Yt \leq (A'Xt^2 + B'Xt + C')$ ... non-operating range 16

Area 8; $\alpha < Xt \leq \phi$ and $(A'Xt^2 + B'Xt + C') < Yt$ ... operating range 15

Area 9; $\phi < Xt \leq a$ and $(A''Xt^2 + B''Xt + C'') < Yt$ ...
operating range 15  (expression 36)

In step 20013, a decision is made as to whether or not the lateral acceleration Xt is higher than the intersecting value a at which the decision-making threshold line 17k intersects the X axis. If Xt>a, the operation proceeds to step 20022 to determine that the current acceleration indicator point 20 (Xt, Yt), which is present in the area 1 in FIG. 45, is in the operating range 15. If, on the other hand, Xt≦a, the operation proceeds to step 20014.

In step 20014, a decision is made as to whether or not the current acceleration indicator point 20 (Xt, Yt) is present in the area 2.

Condition 48; $Xt \leq \alpha$ and $Yt \leq \omega$  (expression 37)

If condition 48 is satisfied, the operation proceeds to step 20021, in which the current acceleration indicator point 20 (Xt, Yt), which is present in the area 2, is determined to be in the non-operating range 16. If, on the other hand, condition 48 is not satisfied, the operation proceeds to step 20015.

In step 20015, a decision is made as to whether the current acceleration indicator point 20 (Xt, Yt) is present in the area 5 or 6 or in one of the other areas 3, 4 and 7~9.

Condition 49; $Xt \leq \alpha$  (expression 38)

If condition 49 is satisfied, the current acceleration indicator point 20 (Xt, Yt) is present either in the area 5 or in the area 6 and, accordingly, the operation proceeds to step 20017. If, on the other hand, condition 49 is not satisfied, the current acceleration indicator point (Xt, Yt) is present in neither the area 5 nor the area 6 and, accordingly, the operation proceeds to step 20016 to continue the decision-making processing.

In step 20017, a decision is made as to whether the current acceleration indicator point 20 (Xt, Yt) is present in the area 5 or the area 6.

Condition 50; $(AXt^2 + BXt + C) < Yt$  (expression 39)

If condition 50 is satisfied, the operation proceeds to step 20022 to determine that the current acceleration indicator point 20 (Xt, Yt), which is present in the area 6, is in the operating range 15. If, on the other hand, condition 50 is not satisfied, the operation proceeds to step 20021 to determine that the current acceleration indicator point 20 (Xt, Yt) which is present in the area 5, is in the non-operating range 16.

In step 20016, a decision is made as to whether the current acceleration is present in the area 3 or either of the area 7 and the area 8.

Condition 51; $\alpha < Xt \leq \phi$ and $Yt \leq \beta$  (expression 40)

If condition 51 is satisfied, the operation proceeds to step 20021 to determine that the current acceleration indicator point 20 (Xt, Yt), which is present in the area 3 is in the non-operating range 16. If, on the other hand, condition 51 is not satisfied, the operation proceeds to step 20018 to continue the decision-making processing.

In step 20018, a decision is made as to whether or not the current acceleration indicator point 20 (Xt, Yt) is present in the area 7.

Condition 52; $\alpha < Xt \leq \phi$ and $Yt \leq (A'Xt^2 + B'Xt + C')$  (expression 41)

If condition 52 is satisfied, the operation proceeds to step 20021 to determine that the current acceleration indicator point 20 (Xt, Yt) which is present in the area 7, is in the non-operating range 16. If, on the other hand, condition 52 is not satisfied, the operation proceeds to step 20019 to continue the decision-making processing since the current acceleration indicator point 20 (Xt, Yt) is present in one of the areas 4, 8 and 9.

In step 20019, a decision is made as to whether the current acceleration indicator point 20 (Xt, Yt) is present in the area 8 or either of the areas 4 and 9.

Condition 53; $Xt \leq \phi$  (expression 42)

If condition 53 is satisfied, the operation proceeds to step 20022 to determine that the current acceleration indicator point 20 (Xt, Yt), which is present in the area 8, is in the operating range 15. If, on the other hand, condition 53 is not satisfied, the operation proceeds to step 20020 to continue the decision-making processing.

In step 20020, a decision is made as to whether the current acceleration indicator point 20 (Xt, Yt) is present in the area 4 or the area 9.

Condition 54; $Yt \leq (A''Xt^2 + B''Xt + C'')$  (expression 43)

If condition 54 is satisfied, the operation proceeds to step 20021 to determine that the current acceleration indicator point 20 (Xt, Yt), which is present in the area 4, is in the non-operating range 16. If, on the other hand, condition 54 is not satisfied, the operation proceeds to step 20022 to determine that the current acceleration indicator point 20 (Xt, Yt), which is present in the area 9, is in the operating range 15.

As explained above, in the tenth embodiment, an XY two-dimensional map with its +Y axis representing the deceleration (negative acceleration) of the vehicle along the longitudinal direction, its −Y axis representing the acceleration of the vehicle belonged the longitudinal direction, its +X axis representing the acceleration of the vehicle to the right and its −X axis representing the acceleration of the vehicle to the left is used. In the first and second quadrants of the map, a substantial semi-elliptic operation decision-making threshold line intersecting at the +X axis at a (a is an arbitrary value), intersecting −X axis at −a and intersecting the +Y axis at +b (b is an arbitrary satisfying b<a), and achieved by connecting five quadratic curves at four inflection points is set. Tension is applied to the seat belt if the point on the map determined by the vehicle longitudinal acceleration value and the vehicle lateral acceleration value detected as the vehicle decelerates is outside the range enclosed by the operation decision-making threshold line 17k and the X axis.

As explained above, in the tenth embodiment, tension is applied to the seat belt at a lower vehicle longitudinal acceleration rate. Thus, the extent to which the upper bodies of the occupants are allowed to move forward during a vehicle deceleration is reduced to prevent them from moving too close to the steering wheel on the driver's seat side or to the dashboard on the passenger's seat side. As a result, since ample distances are assured between the occupants and the steering wheel and between the occupants and the dashboard, the air bags can be deployed more effectively in the event of a subsequent collision at the front of the vehicle.

In addition, the intersecting value a at which the operation decision-making threshold line 17k intersects the X axis representing the vehicle lateral acceleration is set larger than the intersecting value b at which the operation decision-making threshold line 17k intersects the Y axis representing the vehicle longitudinal acceleration. Accordingly, the vehicle needs to accelerate at a higher rate along the lateral direction than along the longitudinal direction to activate the reversible seat belt tension application mechanism 7 to apply tension to the seat belt. As a result, tension is not applied to the seat belt every time a slight lateral acceleration occurs at the vehicle as the vehicle travels on a winding road or is engaged in a turning operation. Consequently, the occupants are spared the discomfort of unnecessary restriction.

In other words, in the tenth embodiment, the movement of the upper bodies of the occupants toward the front of the vehicle is effectively minimized during a vehicle deceleration and also, frequent tension application while the vehicle travels on a winding road or is engaged in a turning operation is avoided to lessen the feeling of restriction.

(Eleventh Embodiment)

Figure 47:
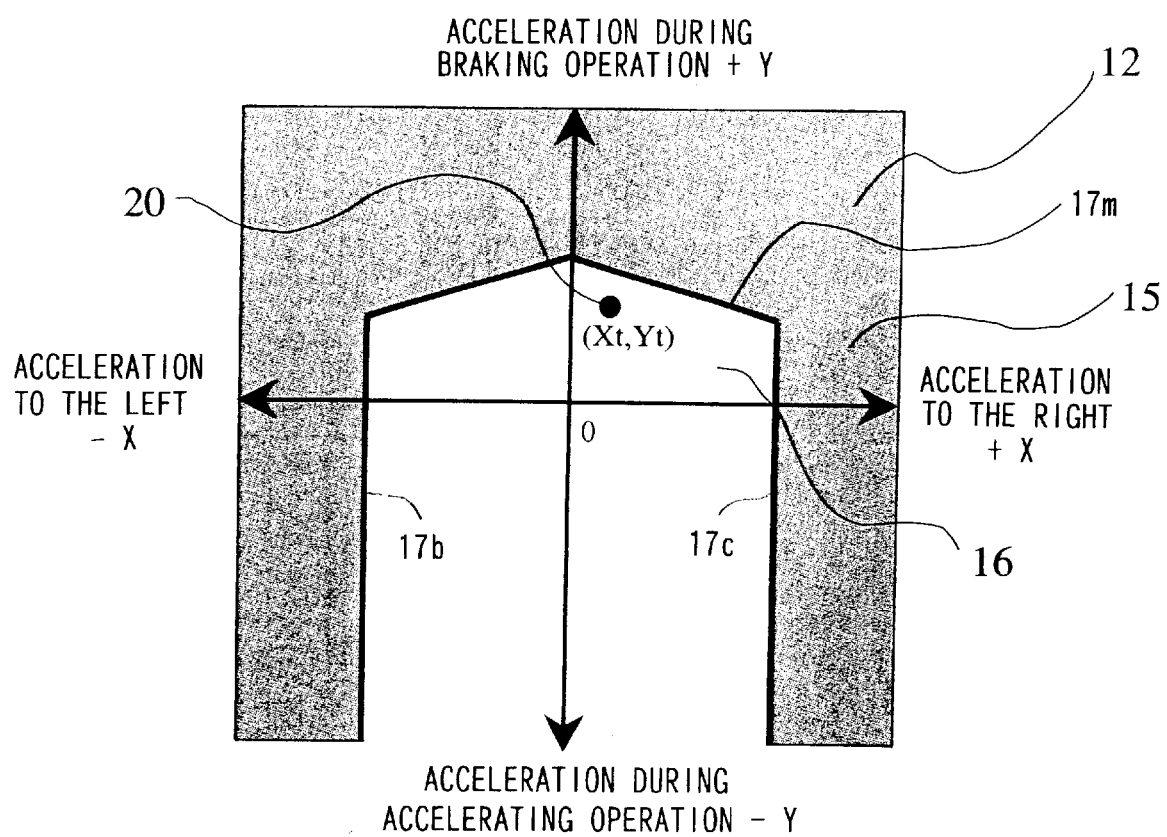
FIG. 47 shows the operation/non-operation decision-making map used in an eleventh embodiment.

Another embodiment of the operation/non-operation decision-making map 12 is explained. FIG. 47 shows the operation/non-operation decision-making map 12 used in the eleventh embodiment. In this embodiment, a threshold line 17m, which contains a triangular shape, is used as the braking (deceleration)-side operation decision-making threshold line. The area 15 on the outside of the threshold lines 17m, 17b and 17c constitutes the operating range 15 over which the reversible seat belt tension application mechanism 7 is engaged in operation to apply tension to the seat belt 6 and the area 16 enclosed by the threshold lines 17m, 17b and 17c constitutes the non-operating range 16 over which the reversible seat belt tension application mechanism 7 is not activated to apply tension to the seat belt 6.

Figure 48:
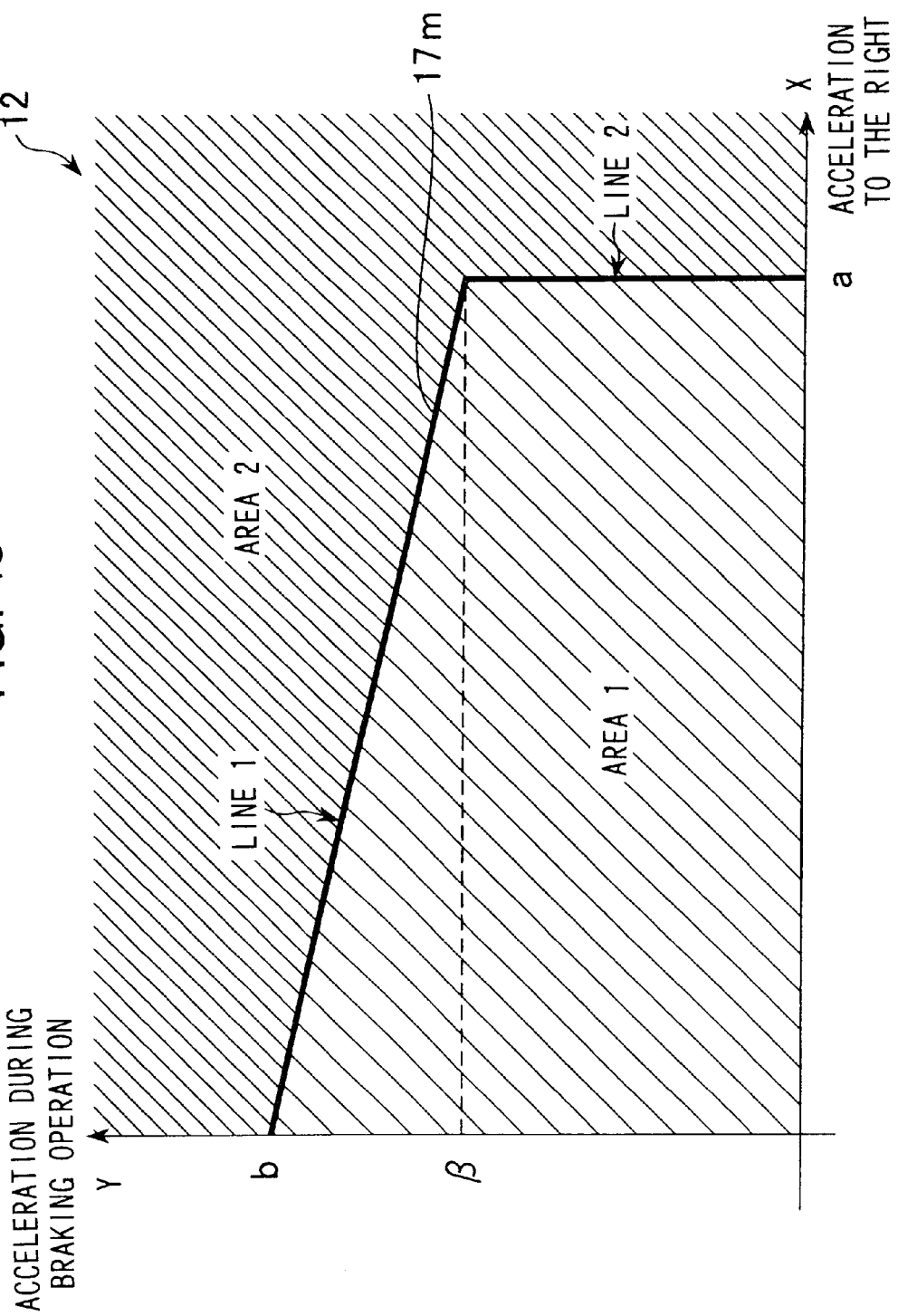
FIG. 48 shows an enlargement of the first quadrant of the map in FIG. 47.

FIG. 48 is an enlargement of the first quadrant of the map 12 shown in FIG. 47. In the first quadrant of the map 12, the longitudinal acceleration manifests as deceleration and lateral (left/right) acceleration manifests to the right. The operation decision-making threshold line 17m in the first quadrant is achieved by connecting two rectilinear lines at one inflection point. With (a, β) representing the coordinates of the inflection point, the two rectilinear lines can be expressed as follows.

Line 1; $Y=(\beta-b)/a*X+b$

Line 2; $X=a$ (expression 44)

The line 2 is an extension of the threshold line 17c in the fourth quadrant shown in FIG. 47, which is extended to the inflection point (a, β) in the first quadrant. It is to be noted that the threshold line in the second quadrant shown in FIG. 47 is symmetrical to the threshold line in the first quadrant relative to the Y axis.

In the first quadrant of the map 12, an area 1 enclosed by the threshold line 17m achieved by connecting the two rectilinear lines described above at the inflection point (a, β), the X axis and the Y axis is the non-operating range 16 and an area 2 on the outside is the operating range 15.

Area 1; $0 \leq Xt \leq a$ and $0 \leq Yt \leq ((\beta-b)/a*Xt+b)$ ... non-operating range 16

Area 2; $a<Xt$ or $((\beta-b)/a*Xt+b)<Yt$ ...
operating range 15 (expression 45)

Since the structure adopted in the eleventh embodiment is identical to that shown in FIG. 1, its explanation is omitted. In addition, since the tension application operation executed in the eleventh embodiment is identical to the operation shown in FIGS. 41 and 42, its explanation is also omitted.

Figure 49:
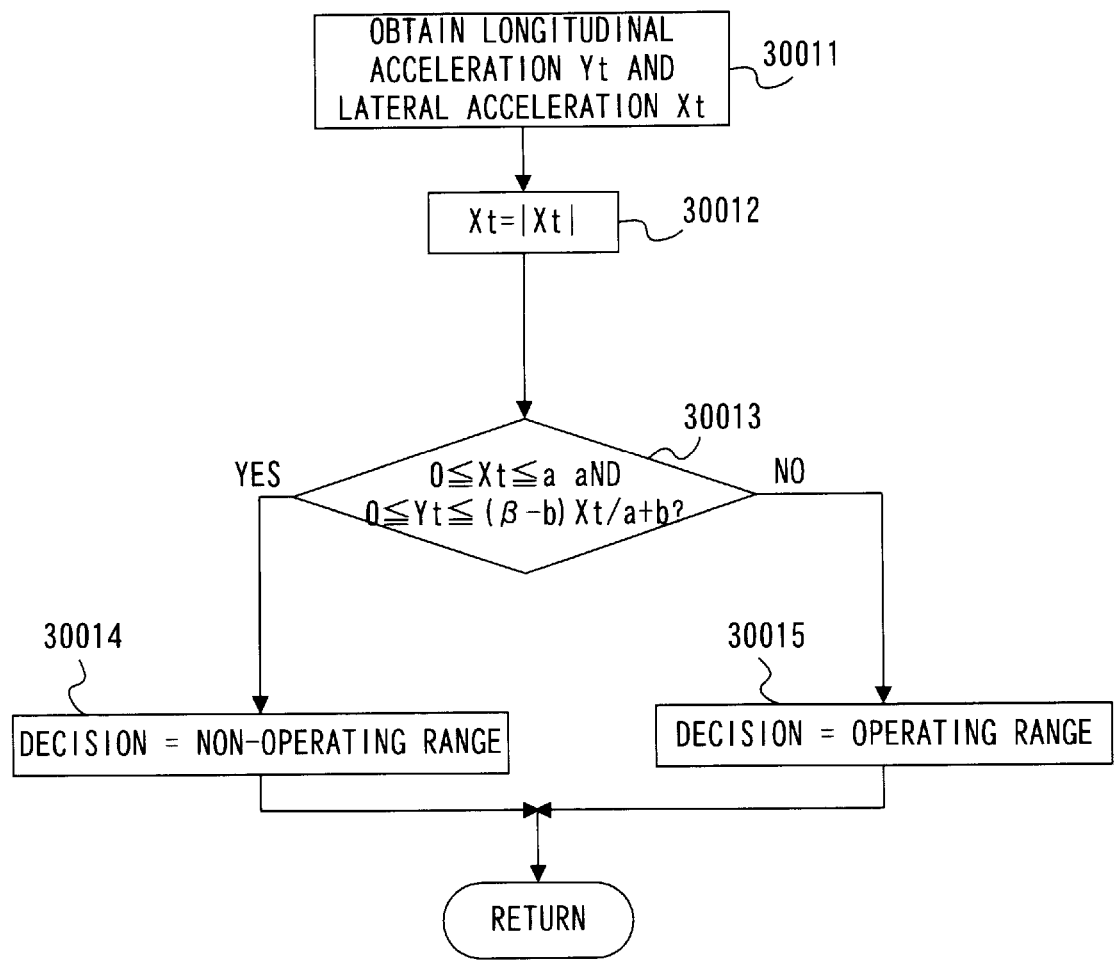
FIG. 49 presents a flowchart of the operating range/non-operating range decision-making subroutine executed in the eleventh embodiment.

FIG. 49 presents a flowchart of the operating range/non-operating range decision-making subroutine executed in the eleventh embodiment. This subroutine is executed in step 1001 in FIG. 41. In step 30011, the longitudinal acceleration Yt and the lateral (left/right) acceleration Xt are obtained. In the following step 30012, the absolute value of the lateral (left/right) acceleration Xt is determined. This step is executed by using the operation decision-making threshold line 17m in the map 12 shown in FIG. 47, which achieves symmetry relative to the Y axis so that the processing load in the decision-making steps implemented to determine whether or not the reversible seat belt tension application mechanism 7 is to be engaged in operation is reduced. Therefore, the onus on the controller 9 is lessened so that, as a result, the length of time required for the operation decision-making processing is reduced to activate the reversible seat belt tension application mechanism 7 quickly if it needs to be engaged in operation. Then, a decision is made to ascertain whether the acceleration indicator point 20 (Xt, Yt) determined by the longitudinal acceleration Yt and the left/right acceleration Xt the absolute value of which has been determined is in the operating range 15 or in the non-operating range 16.

In step 30013, a decision is made as to whether the current acceleration indicator point 20 (Xt, Yt) is present in the area 1 or the area 2.

Condition 55; $0 \leq Xt \leq a$ and $0 \leq Yt \leq ((\beta-b)/a*Xt+b)$ (expression 46)

If condition 55 is satisfied, the operation proceeds to step 30014 to determine that the current acceleration indicator point 20 (Xt, Yt), which is present in the area 1, is in the non-operating range 16. If, on the other hand, condition 55 is not satisfied, the operation proceeds to step 30015 to determine that the current acceleration indicator point 20 (Xt, Yt), which is present in the area 2, is in the operating range 15.

As explained above, in the eleventh embodiment, an XY two-dimensional map with its +Y axis representing the deceleration (negative acceleration) of the vehicle along the longitudinal direction, its −Y axis representing the acceleration of the vehicle along the longitudinal direction, its +X axis representing the acceleration of the vehicle to the right and its −X axis representing the acceleration of the vehicle to the left is used. In the first and second quadrants of the map, a polygonal decision-making threshold line having four sides thereof connected at three inflection points which intersect the +X axis at a (a is an arbitrary value), intersects the −X axis at −a and intersects the +Y axis at +b (b is an arbitrary satisfying b<a), is set. Tension is applied to the seat belt if the point on the map determined by the vehicle longitudinal acceleration value and the vehicle lateral acceleration value detected as the vehicle decelerates is outside the range enclosed by the polygonal operation decision-making threshold line 17m and the X axis.

In the eleventh embodiment, tension is applied to the seat belts at a lower vehicle longitudinal acceleration rate. Thus, the extent to which the upper bodies of the occupants are allowed to move forward during a vehicle deceleration is reduced to prevent them from moving too close to the steering wheel on the driver's seat side or to the dashboard on the passenger's seat side. As a result, since ample distances are assured between the occupants and the steering wheel and between the occupants and the dashboard, the air bags can be deployed more effectively in the event of a subsequent collision at the front of the vehicle.

In addition, the intersecting value a at which the operation decision-making threshold line intersects the X axis representing the vehicle lateral acceleration is set larger than the intersecting value b at which the operation decision-making threshold line intersects the Y axis representing the vehicle longitudinal acceleration. Accordingly, the vehicle needs to accelerate along the lateral acceleration at a higher acceleration rate than along the longitudinal direction to activate the reversible seat belt tension application mechanism 7 to apply tension to the seat belt. As a result, tension is not applied to the seat belt every time a slight lateral acceleration occurs at the vehicle as the vehicle travels on a winding road or is engaged in a turning operation. Thus, the occupants are spared an unnecessary feeling of restriction.

In other words, in the eleventh embodiment, the movement of the upper bodies of the occupants toward the front of the vehicle is effectively minimized during a vehicle deceleration and also frequent tension application while the vehicle travels on a winding road or is engaged in a turning operation is avoided to lessen the discomfort of unnecessary restriction.

(Twelfth Embodiment)

Figure 50:
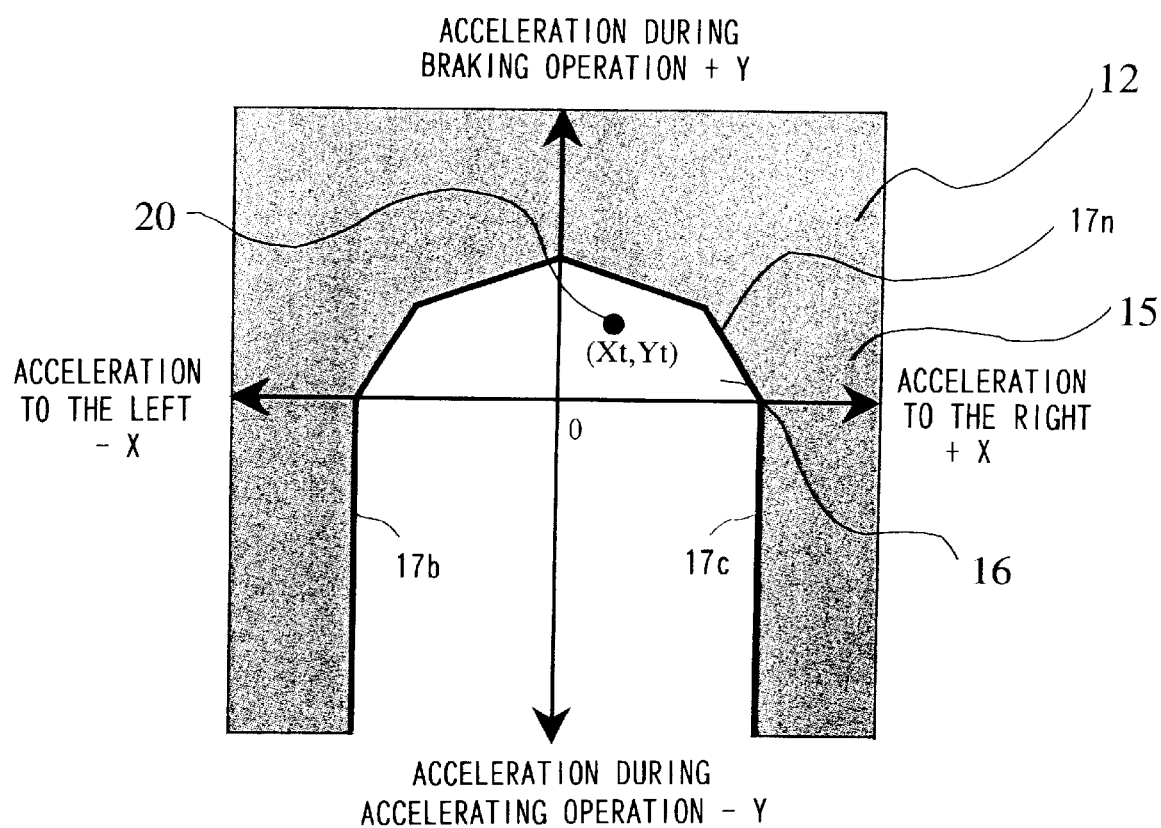
FIG. 50 shows the operation/non-operation decision-making map used in a twelfth embodiment.

Another embodiment of the operation/non-operation decision-making map 12 is explained. FIG. 50 shows the operation/non-operation decision-making map 12 used in the twelfth embodiment. In this embodiment, a threshold line 17n, that tapers in steps to a peak, is used as the braking (deceleration)-side operation decision-making threshold line. The area 15 on the outside of the threshold lines 17n, 17b and 17c constitutes the operating range 15 over which the reversible seat belt tension application mechanism 7 is engaged in operations to apply tension to the seat belt 6 and the area 16 enclosed by the threshold lines 17n, 17b and 17c constitutes the non-operating range 16 over which the reversible seat belt tension application mechanism 7 is not activated to apply tension to the seat belt 6.

Figure 51:
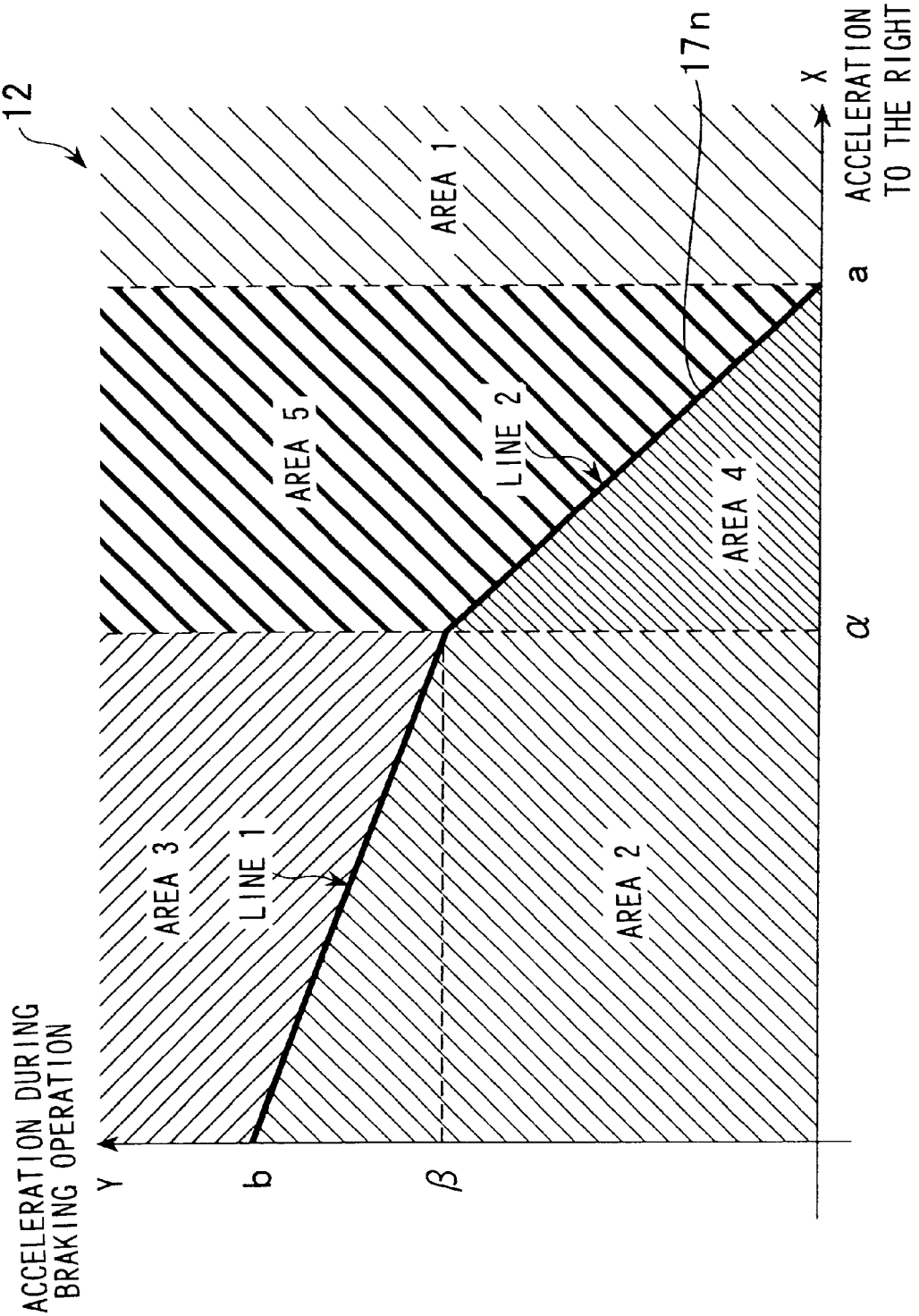
FIG. 51 shows an enlargement of the first quadrant of the map in FIG. 50.

FIG. 51 is an enlargement of the first quadrant of the map 12 in FIG. 50. In the first quadrant of the map 12, the longitudinal acceleration manifests as a deceleration and the lateral (left/right) acceleration manifests to the right. The operation decision-making threshold line 17n in the first quadrant is achieved by connecting two rectilinear lines at one inflection point. With ($\alpha$, $\beta$) representing the coordinates of the inflection point, the two rectilinear lines can be expressed as follows.

Line 1; $Y=(\beta-b)/\alpha * X+b$

Line 2; $Y=\beta/(\alpha-a)*(X-a)$ (expression 47)

It is to be noted that the threshold line in the second quadrant shown in FIG. 50 is symmetrical to the threshold line in the first quadrant relative to the Y axis.

In the first quadrant of the map 12, the area enclosed by the threshold line 17n achieved by connecting the two rectilinear lines described above at the inflection point ($\alpha$, $\beta$), the X axis and the Y axis is the non-operating range 16 and the area on the outside is the operating range 15. The first quadrant of the map 12 is divided into a plurality of areas as shown in FIG. 51 and a decision is made as to whether each area is contained in the operating range 15 or in the non-operating range 16.

Area 1; $a<Xt$ ... operating range 15

Area 2; $0 \leq Xt \leq \alpha$ and $0 \leq Yt \leq ((\beta-b)/\alpha * Xt+b)$ ... non-operating range 16;

Area 3; $0<Xt \leq a$ and $((\beta-b)/\alpha*Xt+b)<Yt$ ... operating range 15

Area 4; $\alpha<Xt \leq a$ and $0 \leq Yt \leq (\beta/(\alpha-a)*(Xt-a))$ ... non-operating range 16

Area 5; $\alpha<Xt \leq a$ and $(\beta/(\alpha-a)*(Xt-a))<Yt$ ... operating range 15 (expression 48)

Since the structure adopted in the twelfth embodiment is identical to that shown in FIG. 1, its explanation is omitted. In addition, since the tension application operation executed in the twelfth embodiment is identical to the operation shown in FIGS. 41 and 42, its explanation is also omitted.

Figure 52:
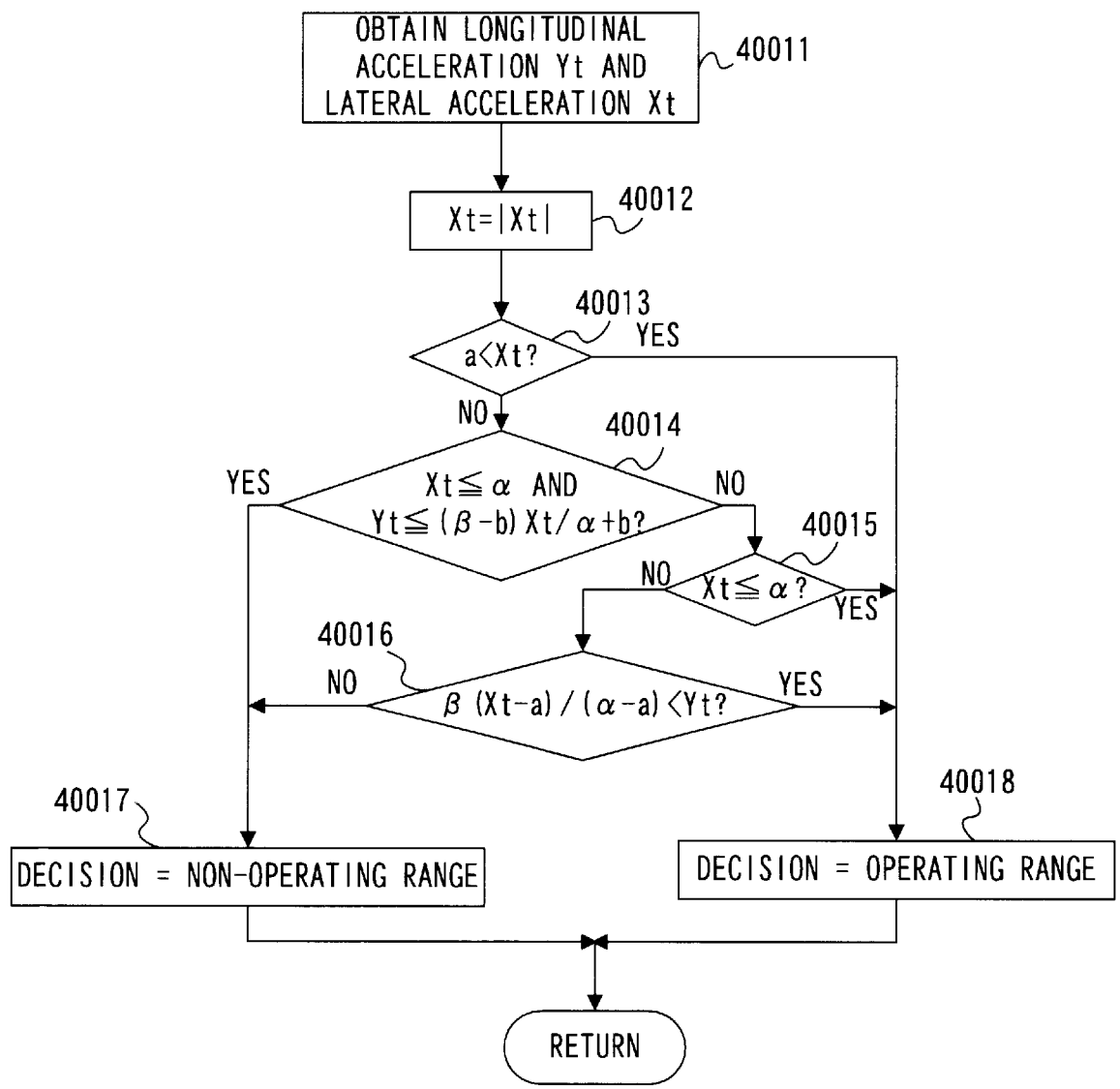
FIG. 52 presents a flowchart of the operating range/non-operating range decision-making subroutine executed in the twelfth embodiment.

FIG. 52 presents a flowchart of the operating range/non-operating range decision-making subroutine executed in the twelfth embodiment. This subroutine is executed in step 1001 in FIG. 41.

In step 40011, the longitudinal acceleration Yt and the lateral (left/right) acceleration Xt are obtained. In the following step 40012, the absolute value of the lateral (left/right) acceleration Xt is determined. This step is executed by using the operation decision-making threshold line 17n in the map 12 shown in FIG. 50, which achieves symmetry relative to the Y axis so that the processing load in the decision-making steps implemented to determine whether or not the reversible seat belt tension application mechanism 7 is to be engaged in operation is reduced. Therefore, the onus on the controller 9 is lessened so that, as a result, the length of time required for the operation decision-making processing is reduced to activate the reversible seat belt tension application mechanism 7 quickly if it needs to be engaged in operation. Then, a decision is made to ascertain whether the acceleration indicator point 20 (Xt, Yt) determined by the longitudinal acceleration Yt and the lateral acceleration Xt the absolute value of which has been determined is in the operating range 15 or in the non-operating range 16.

In step 40013, a decision is made as to whether or not the current acceleration indicator point 20 (Xt, Yt) is in the area 1.

Condition 56; $a<Xt$ (expression 49)

If condition 56 is satisfied, the operation proceeds to step 40018 to determine that the current acceleration indicator point 20 (Xt, Yt) which is present in the area 1, is in the operating range 15. If, on the other hand, condition 56 is not satisfied, the operation proceeds to step 40014 to continue the decision-making processing since the current acceleration indicator point 20 (Xt, Yt) is in one of the areas 2~5.

In step 40014, a decision is made as to whether or not the current acceleration indicator point 20 (Xt, Yt) is present in the area 2.

Condition 57; $0 \leq Xt \leq \alpha$ and $0 \leq Yt \leq ((\beta-b)/\alpha *Xt+b)$ (expression 50)

If condition 57 is satisfied, the operation proceeds to step 40017 to determine that the current acceleration indicator point 20 (Xt, Yt) which is present in the area 2, is in the non-operating range 16. If, on the other hand, condition 57 is not satisfied, the operation proceeds to step 40015.

In step 40015, a decision is made as to whether or not the current acceleration indicator point 20 (Xt, Yt) is present in the area 3.

Condition 58; $Xt \leq \alpha$ (expression 51)

If condition 58 is satisfied, the operation proceeds to step 40018 to determine that the current acceleration indicator point 20 (Xt, Yt) which is present in the area 3, is in the operating range 15. If, on the other hand, condition 58 is not satisfied, the operation proceeds to step 40016.

In step 40016, a decision is made as to whether the current acceleration indicator point 20 (Xt, Yt) is present in the area 4 or the area 5.

Condition 59; $(\beta/(\alpha-a)*(Xt-a))<Yt$ (expression 52)

If condition 59 is satisfied, the operation proceeds to step 40018 to determine that the current acceleration indicator point 20 (Xt, Yt), which is present in the area 5, is in the operating range 15. If, on the other hand, condition 59 is not satisfied, the operation proceeds to step 40017 to determine that the current acceleration indicator point 20 (Xt, Yt), which is present in the area 4, is in the non-operating range 16.

As explained above, in the twelfth embodiment, an XY two-dimensional map with its +Y axis representing the deceleration (negative acceleration) of the vehicle along the longitudinal direction, its −Y axis representing the acceleration of the vehicle along the longitudinal direction, its +X axis representing the acceleration of the vehicle to the right and its −X axis representing the acceleration of the vehicle to the left is used. In the first and second quadrants of the map, a polygonal decision-making threshold line having four sides thereof connected at three inflection points, which intersects the +X axis at a (a is an arbitrary value), intersects the −X axis at −a and intersects the +Y axis at +b (b is an arbitrary satisfying b<a), is set. Tension is applied to the seat belt if the point on the map determined by the vehicle longitudinal acceleration value and the vehicle lateral acceleration value detected as the vehicle decelerates is outside the range enclosed by the polygonal operation decision-making threshold line and the X axis.

In the twelfth embodiment, tension is applied to the seat belts at a lower vehicle longitudinal acceleration rate. Thus, the extent to which the upper bodies of the occupants are allowed to move forward during a vehicle deceleration is reduced to prevent them from moving too close to the steering wheel on the driver's seat side or to the dashboard on the passenger's seat side. As a result, since ample distances are assured between the occupants and the steering wheel and between the occupants and the dashboard, the air bags can be deployed more effectively in the event of a subsequent frontal collision of the vehicle.

In addition, the intersecting value a at which the operation decision-making threshold line 17n intersects the X axis representing the vehicle lateral acceleration is set larger than the intersecting value b at which the operation decision-making threshold line 17n intersects the Y axis representing the vehicle longitudinal acceleration. Accordingly, the vehicle needs to accelerate along the lateral acceleration at a higher acceleration rate than along the longitudinal direction to activate the reversible seat belt tension application mechanism 7 to apply tension to the seat belt. As a result, tension is not applied to the seat belt every time a slight lateral acceleration occurs at the vehicle as the vehicle travels on a winding road or is engaged in a turning operation and, consequently, the occupants are spared the discomfort of unnecessary restriction.

In other words, in the twelfth embodiment, the movement of the upper bodies of the occupants toward the front of the vehicle is effectively minimized during a vehicle deceleration and also, frequent tension application while the vehicle travels on a winding road or is engaged in a turning operation is avoided to lessen the feeling of restriction.

(Thirteenth Embodiment)

Figure 53:
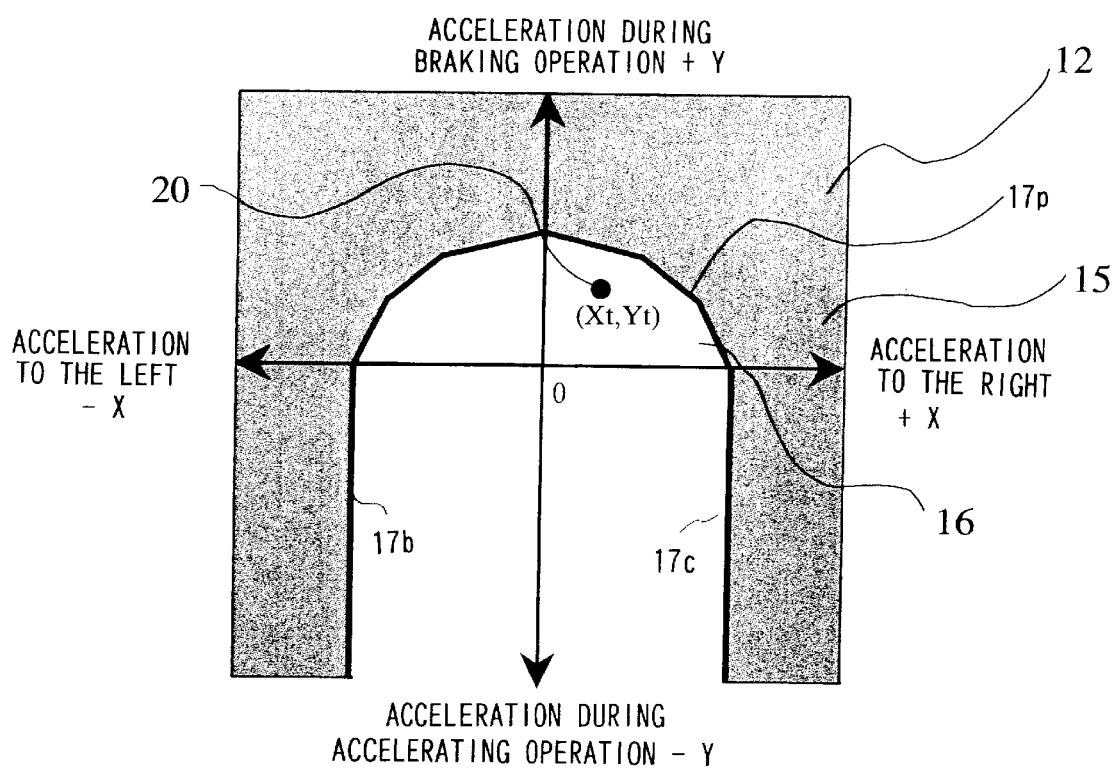
FIG. 53 shows the operation/non-operation decision-making map used in a thirteenth embodiment.

Another embodiment of the operation/non-operation decision-making map 12 is explained. FIG. 53 shows the operation/non-operation decision-making map 12 used in the thirteenth embodiment. In this embodiment, a threshold line 17p, that tapers in steps to a peak, is used as the braking (deceleration)-side operation decision-making threshold line. The operating range 15 on the outside of the threshold lines 17p, 17b and 17c constitutes the operating range 15 over which the reversible seat belt tension application mechanism 7 is engaged in operation to apply tension to the seat belt 6 and the area 16 enclosed by the threshold lines 17p, 17b and 17c constitutes the non-operating range 16 over which the reversible seat belt tension application mechanism 7 is not activated to apply tension to the seat belt 6.

Figure 54:
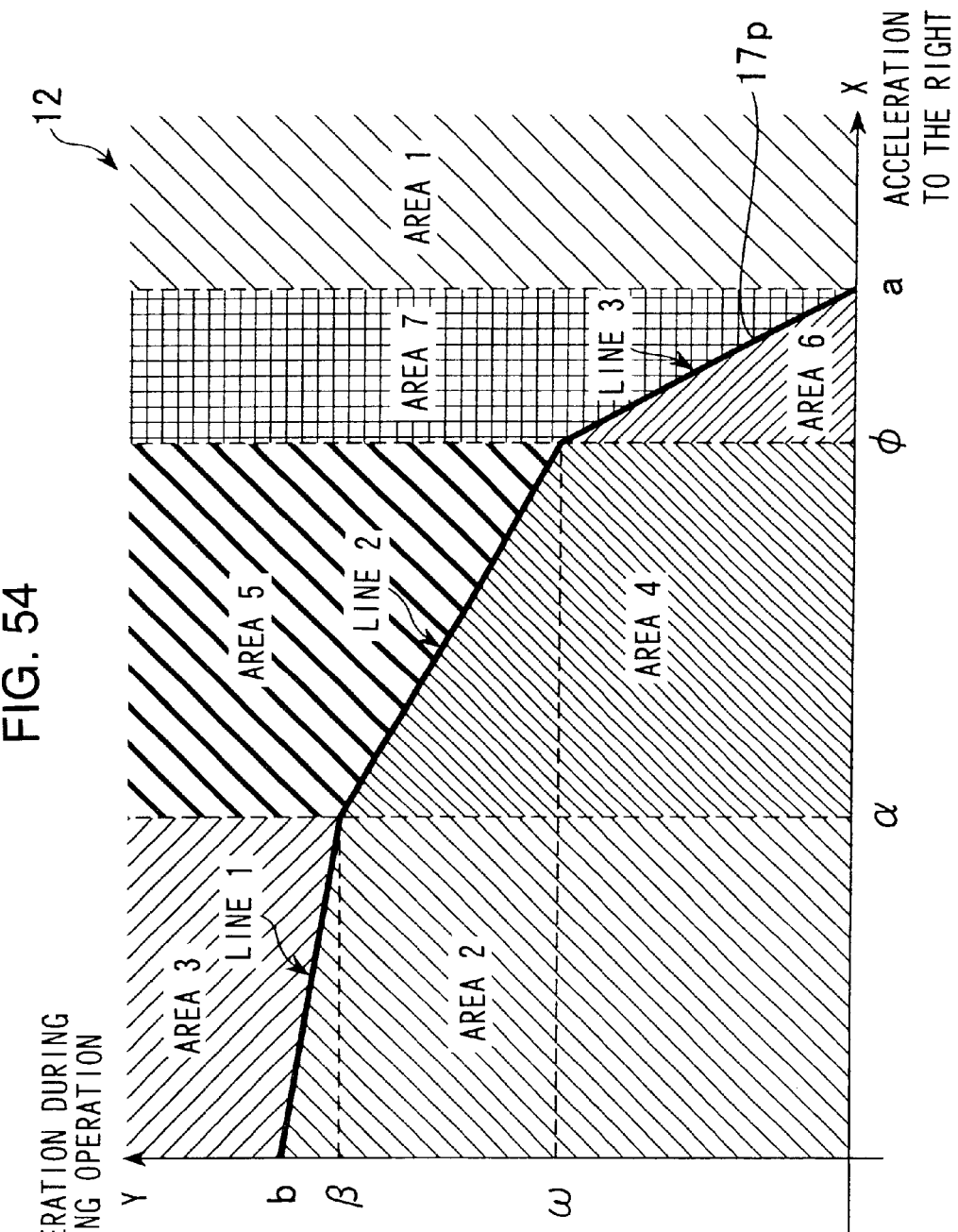
FIG. 54 shows an enlargement of the first quadrant of the map in FIG. 53.

FIG. 54 is an enlargement of the first quadrant of the map 12 shown in FIG. 53. In the first quadrant of the map 12, the longitudinal acceleration manifests as a deceleration and the lateral (left/right) acceleration manifests to the right. The operation decision-making threshold line 17p in the first quadrant is achieved by connecting three rectilinear lines at two inflection points. With $(\alpha, \beta)$ and $(\emptyset, \omega)$ representing the coordinates of the inflection points, the three rectilinear lines can be expressed as follows.

Line 1; $Y=(\beta-b)/\alpha *X+b$

Line 2; $Y=(\omega-\beta)/(\emptyset-\alpha)*X+(\beta\emptyset-\alpha\omega)/(\emptyset-\alpha)$ Line 3; $Y=(\omega/(\emptyset-a)*(X-a)$ (expression 53)

It is to be noted that the threshold line in the second quadrant shown in FIG. 53 is symmetrical to the threshold line in the first quadrant relative to the Y axis.

In the first quadrant of the map 12, the area enclosed by the threshold line 17p achieved by connecting the three rectilinear lines described above at the inflection points $(\alpha, \beta)$ and $(\emptyset, \omega)$, the X axis and the Y axis is the non-operating range 16 and the area on the outside is the operating range 15. The first quadrant of the map 12 is divided into a plurality of areas as shown in FIG. 54 and a decision is made as to whether each area is contained in the operating range 15 or in the non-operating range 16.

Area 1; $a<Xt$ . . . operating range 15

Area 2; $0 \leq Xt \leq \alpha$ and $0 \leq Yt \leq ((\beta-b)/\alpha *Xt+b)$ . . . non-operating range 16;

Area 3; $0 \leq Xt \leq \alpha$ and $((\beta-b)/\alpha *Xt+b)<Yt$ . . . operating range 15

Area 4; $\alpha <Xt \leq \emptyset$ and $0 \leq Yt \leq ((\omega-\beta)/(\emptyset-\alpha)*Xt+(\beta\emptyset-\alpha\omega)/(\emptyset-\alpha))$ . . . non-operating range 16

Area 5; $\alpha <Xt \leq \emptyset$ and $((\omega-\beta)/(\emptyset-\alpha)*Xt+(\beta\emptyset-\alpha\omega)/(\emptyset-\alpha))<Yt$ . . . operating range 15

Area 6; $\emptyset<Xt\leq a$ and $0\leq Yt\leq(\omega/(\emptyset-a)*(Xt-a))$ ... non-operating range 16

Area 7; $\emptyset<Xt\leq a$ and $(\omega/(\emptyset-a)*(Xt-a))<Yt$ ...
operating range 15        (expression 54)

Since the structure adopted in the thirteenth embodiment is identical to that shown in FIG. 1, its explanation is omitted. In addition, since the tension application operation executed in the thirteenth embodiment is identical to the operation shown in FIGS. 41 and 42, its explanation is also omitted.

Figure 55:
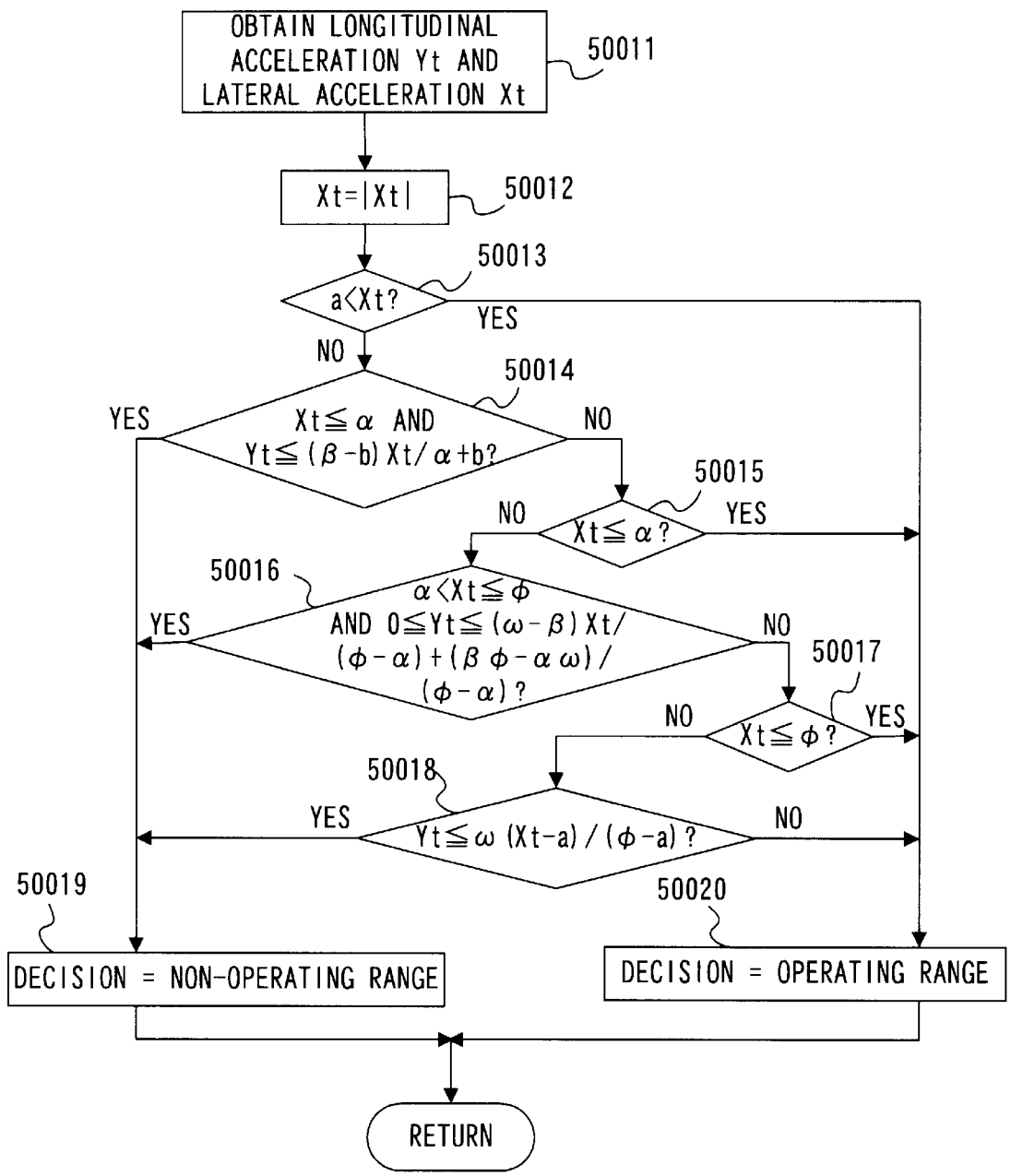
FIG. 55 presents a flowchart of the operating range/non-operating range decision-making subroutine executed in the thirteenth embodiment.

FIG. 55 presents a flowchart of the operating range/non-operating range decision-making subroutine executed in the thirteenth embodiment. This subroutine is executed in step 1001 in FIG. 41.

In step 50011, the longitudinal acceleration Yt and the lateral (left/right) acceleration Xt are obtained. In the following step 50012, the absolute value of the lateral (left/right) acceleration Xt is determined. This step is executed by using the operation decision-making threshold line 17p in the map 12 shown in FIG. 53, which achieves symmetry relative to the Y axis so that the processing load in the decision-making steps implemented to determine whether or not the reversible seat belt tension application mechanism 7 is to be engaged in operation is reduced. Therefore, the onus on the controller 9 is lessened so that, as a result, the length of time required for the operation decision-making processing is reduced to activate the reversible seat belt tension application mechanism 7 quickly if it needs to be engaged in operation. Then, a decision is made to ascertain whether the acceleration indicator point 20 (Xt, Yt) determined by the longitudinal acceleration Yt and the lateral acceleration Xt the absolute value of which has been determined is in the operating range 15 or in the non-operating range 16.

Step 50013, a decision is made as to whether or not the current acceleration indicator point 20 (Xt, Yt) is in the area 1.

Condition 60; $a<Xt$        (expression 55)

If condition 60 is satisfied, the operation proceeds to step 50020 to determine that the current acceleration indicator point 20 (Xt, Yt), which is present in the area 1, is in the operating range 15. If, on the other hand, condition 60 is not satisfied, the operation proceeds to step 50014.

In step 50014, a decision is made as to whether or not the current acceleration indicator point 20 (Xt, Yt) is present in the area 2.

Condition 61; $0\leq Xt\leq\alpha$ and $0\leq Yt\leq((\beta-b)/\alpha*Xt+b)$ (expression 56)

If condition 61 is satisfied, the operation proceeds to step 50019 to determine that the current acceleration indicator point 20 (Xt, Yt), which is present in the area 2, is in the non-operating range 16. If, on the other hand, condition 61 is not satisfied, the operation proceeds to step 50015.

In step 50015, a decision is made as to whether or not the current acceleration indicator point 20 (Xt, Yt) is present in the area 3.

Condition 62; $Xt\leq\alpha$        (expression 57)

If condition 62 is satisfied, the operation proceeds to step 50020 to determine that the current acceleration indicator point 20 (Xt, Yt), which is present in the area 3, is in the operating range 15. If, on the other hand, condition 62 is not satisfied, the operation proceeds to step 50016.

In step 50016, a decision is made as to whether or not the current acceleration indicator point 20 (Xt, Yt) is present in the area 4.

Condition 63; $\alpha<Xt\leq\emptyset$ and $0\leq Yt\leq((\omega-b)/\emptyset-\alpha)*Xt+(\beta\emptyset-\alpha\omega)/(\emptyset-\alpha))$        (expression 58)

If condition 63 is satisfied, the operation proceeds to step 50019 to determine that the current acceleration indicator point 20 (Xt, Yt), which is present in the area 4, is in the non-operating range 16. If, on the other hand, condition 63 is not satisfied, the operation proceeds to step 50017.

In step 50017, a decision is made as to whether or not the current acceleration indicator point 20 (Xt, Yt) is present in the area 5.

Condition 64; $Xt\leq\emptyset$        (expression 59)

If condition 64 is satisfied, the operation proceeds to step 50020 to determine that the current acceleration indicator point 20 (Xt, Yt), which is present in the area 5, is in the operating range 15. If, on the other hand, condition 64 is not satisfied, the operation proceeds to step 50018.

In step 50018, a decision is made as to whether or not the current acceleration indicator point 20 (Xt, Yt) is present in the area 6.

Condition 65; $0\leq Yt\leq(\omega(\emptyset-a)*(Xt-a))$        (expression 60)

If condition 65 is satisfied, the operation proceeds to step 50019 to determine that the current acceleration indicator point 20 (Xt, Yt), which is present in the area 6, is in the non-operating range 16. If, on the other hand, condition 65 is not satisfied, the operation proceeds to step 50020 to determine that the current acceleration indicator point 20 (Xt, Yt), which is present in the area 7, is in the operating range 15.

As explained above, in the thirteenth embodiment, an XY two-dimensional map with its +Y axis representing the deceleration (negative acceleration) of the vehicle along the longitudinal direction, its −Y axis representing the acceleration of the vehicle along the longitudinal direction, its +X axis representing the acceleration of the vehicle to the right and its −X axis representing the acceleration of the vehicle to the left is used. In the first and second quadrants of the map, a polygonal decision-making threshold line having six sides thereof connected at five inflection points, which intersects the +X axis at a (a is an arbitrary value), intersects the −X axis at −a and intersects the +Y axis at +b (b is an arbitrary satisfying b<a), is set. Tension is applied to the seat belt if the point on the map determined by the vehicle longitudinal acceleration value and the vehicle lateral acceleration value detected as the vehicle decelerates is outside the range enclosed by the polygonal operation decision-making threshold line and the X axis.

In the thirteenth embodiment, tension is applied to the seat belt at a lower vehicle longitudinal acceleration rate. Thus, the extent to which the upper bodies of the occupants are allowed to move forward during a vehicle deceleration is reduced to prevent them from moving too close to the steering wheel on the driver's seat side or to the dashboard on the passenger's seat side. As a result, since ample distances are assured between the occupants and the steering wheel and between the occupants and the dashboard, the air bags can be deployed more effectively in the event of a subsequent frontal collision of the vehicle.

In addition, the intersecting value a at which the operation decision-making threshold line intersects the X axis representing the vehicle lateral acceleration is set larger than the intersecting value b at which the operation decision-making threshold line intersects the Y axis representing the vehicle longitudinal acceleration. Accordingly, the vehicle needs to accelerate along the lateral acceleration at a higher acceleration rate than along the longitudinal direction to activate the reversible seat belt tension application mechanism 7 to apply tension to the seat belt. As a result, tension is not applied to the seat belt every time a slight lateral acceleration occurs at the vehicle as the vehicle travels on a winding road or is engaged in a turning operation. Thus, the occupants are spared an unnecessary feeling of restriction.

In other words, in the thirteenth embodiment, the movement of the upper bodies of the occupants toward the front of the vehicle is effectively minimized during a vehicle deceleration and also, frequent tension application while the vehicle travels on a winding road or is engaged in a turning operation is avoided to lessen the feeling of restriction.
(Fourteenth Embodiment)

Figure 56:
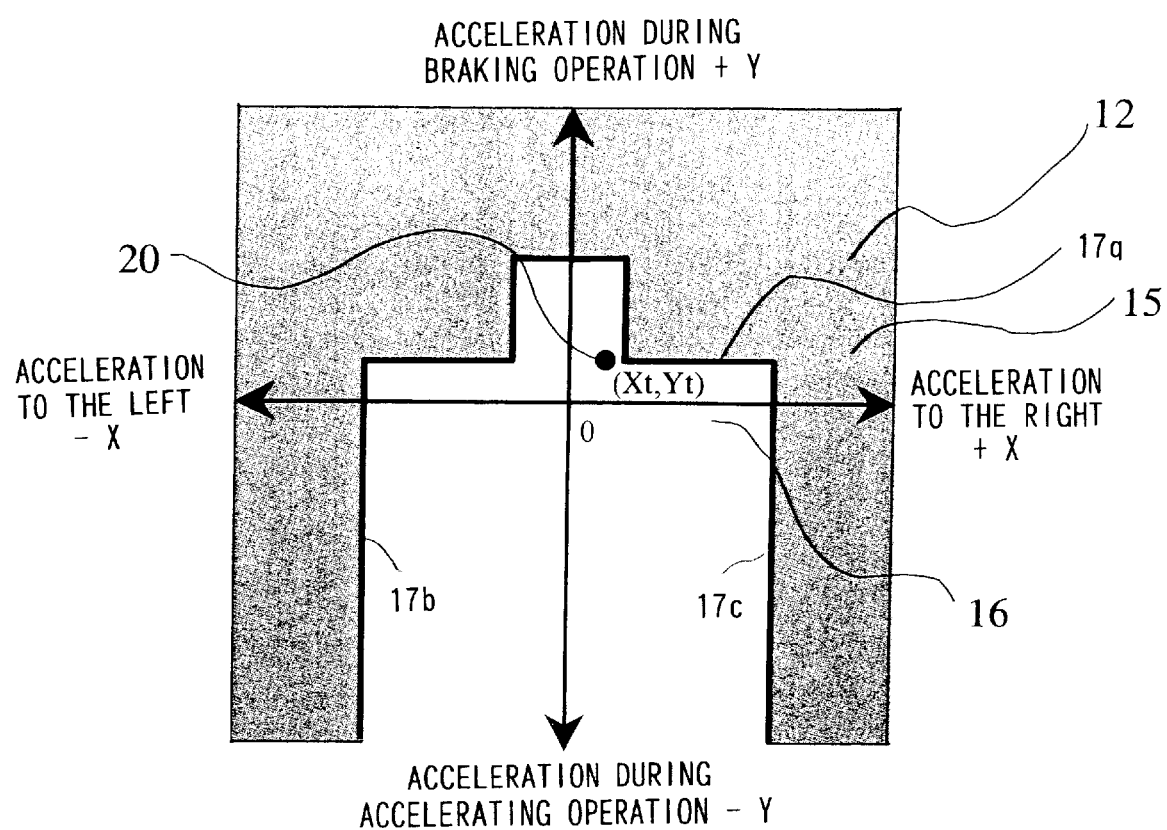
FIG. 56 shows the operation/non-operation decision-making map used in a fourteenth embodiment.

Another embodiment of the operation/non-operation decision-making map 12 is explained. FIG. 56 shows the operation/non-operation decision-making map 12 used in the fourteenth embodiment. In this embodiment, a threshold line 17*q*, with a projection, is used as the braking (deceleration)-side operation decision-making threshold line. The area 15 on the outside of the threshold lines 17*q*, 17*b* and 17*c* constitutes the operating range 15 over which the reversible seat belt tension application mechanism 7 is engaged in operation to apply tension to the seat belt 6 and the area 16 enclosed by the threshold lines 17*q*, 17*b* and 17*c* constitutes the non-operating range 16 over which the reversible seat belt tension application mechanism 7 is not activated to apply tension to the seat belt 6.

FIG. 57 is an enlargement of the first quadrant of the map 12 shown in FIG. 56. In the first quadrant of the map 12, the longitudinal acceleration manifests as deceleration and the lateral (left/right) acceleration manifests to the right. The operation decision-making threshold line 17*q* in the first quadrant is achieved by connecting four rectilinear lines at three inflection points. With (α, b), (α, β) and (a, β) representing the coordinates of the inflection points, the four rectilinear lines can be expressed as follows.

Line 1; Y=b

Line 2; X=α

Line 3; Y=β

Line 4; X=a    (expression 61)

It is to be noted that the threshold line in the second quadrant shown in FIG. 56 is symmetrical to the threshold line in the first quadrant relative to the Y axis.

In the first quadrant of the map 12, the area enclosed by the threshold line 17*q* achieved by connecting the four rectilinear lines described above at the inflection points (α, b), (α, β) and (a, β), the Xt axis and the Yt axis is the non-operating range 16 and the area on the outside is the operating range 15. The first quadrant of the map 12 is divided into a plurality of areas as shown in FIG. 57 and a decision is made as to whether each area is contained in the operating range 15 or in the non-operating range 16.

Area 1; a<Xt . . . operating range 15

Area 2; 0≦Xt≦α and 0≦Yt≦b . . . non-operating range 16

Area 3; 0≦Xt≦α and b<Yt . . . operating range 15

Area 4; α<Xt≦a and 0≦Yt≦β . . . non-operating range 16

Area 5; α<Xt≦a and β<Yt . . . operating range 15    (expression 62)

Since the structure adopted in the fourteenth embodiment is identical to that shown in FIG. 1, its explanation is omitted. In addition, since the tension application operation executed in the fourteenth embodiment is identical to the operation shown in FIGS. 41 and 42, its explanation is also omitted.

FIG. 58 presents a flowchart of the operating range/non-operating range decision-making subroutine executed in the fourteenth embodiment. This subroutine is executed in step 1001 in FIG. 41.

In step 60011, the longitudinal acceleration Yt and the lateral (left/right) acceleration Xt are obtained. In the following step 60012, the absolute value of the lateral (left/right) acceleration Xt is determined. This step is executed by using the operation decision-making threshold line 17*q* in the map 12 shown in FIG. 56, which achieves symmetry relative to the Y axis so that the processing load in the decision-making steps implemented to determine whether or not the reversible seat belt tension application mechanism 7 is to be engaged in operation is reduced. Therefore, the onus on the controller 9 is lessened so that, as a result, the length of time required for the operation decision-making processing is reduced to activate the reversible seat belt tension application mechanism 7 quickly if it needs to be engaged in operation. Then, a verification is made to ascertain whether the acceleration indicator point 20 (Xt, Yt) determined by the longitudinal acceleration Yt and the lateral acceleration Xt the absolute value of which has been determined is in the operating range 15 or in the non-operating range 16.

In step 60013, a decision is made as to whether or not the current acceleration indicator point 20 (Xt, Yt) is in the area 1.

Condition 66; a<Xt    (expression 63)

If condition 66 is satisfied, the operation proceeds to step 60018 to determine that the current acceleration indicator point 20 (Xt, Yt), which is present in the area 1, is in the operating range 15. If, on the other hand, condition 66 is not satisfied, the operation proceeds to step 60014.

In step 60014, a decision is made as to whether or not the current acceleration indicator point 20 (Xt, Yt) is present in the area 2.

Condition 67; Xt≦α and Yt≦b    (expression 64)

If condition 67 is satisfied, the operation proceeds to step 60017 to determine that the current acceleration indicator point 20 (Xt, Yt) which is present in the area 2, is in the non-operating range 16. If, on the other hand, condition 67 is not satisfied, the operation proceeds to step 60015.

In step 60015, a decision is made as to whether or not the current acceleration indicator point 20 (Xt, Yt) is present in the area 3.

Condition 68; Xt≦60    (expression 65)

If condition 68 is satisfied, the operation proceeds to step 60018 to determine that the current acceleration indicator point 20 (Xt, Yt), which is present in the area 3, is in the operating range 15. If, on the other hand, condition 68 is not satisfied, the operation proceeds to step 60016.

In step 60016, a decision is made as to whether or not the current acceleration indicator point 20 (Xt, Yt) is present in the area 4.

Condition 69; α<Xt≦a and Yt≦β    (expression 66)

If condition 69 is satisfied, the operation proceeds to step 60017 to determine that the current acceleration indicator point 20 (Xt, Yt), which is present in the area 4, is in the non-operating range 16. If, on the other hand, condition 69 is not satisfied, the operation proceeds to step 60018 to determine that the current acceleration indicator point 20 (Xt, Yt), which is present in the area 5, is in the operating range 15.

As explained above, in the fourteenth embodiment, an XY two-dimensional map with its +Y axis representing the deceleration (negative acceleration) of the vehicle along the longitudinal direction, its −Y axis representing the acceleration of the vehicle along the longitudinal direction, its +X axis representing the acceleration of the vehicle to the right and its −X axis representing the acceleration of the vehicle to the left is used. In the first and second quadrants of the map, the decision-making threshold line 17q with a projection, having seven sides thereof connected at six inflection points that intersects the +X axis at a (a is an arbitrary value), intersects the −X axis at −a and intersects the +Y axis at +b (b is an arbitrary satisfying b<a), is set. Tension is applied to the seat belt if the point on the map determined by the vehicle longitudinal acceleration value and the vehicle lateral acceleration value detected as the vehicle decelerates is outside the range enclosed by the polygonal operation decision-making threshold line and the X axis.

As explained above, in the fourteenth embodiment, tension is applied to the seat belt at a lower vehicle longitudinal acceleration rate. Thus, the extent to which the upper bodies of the occupants are allowed to move forward during a vehicle deceleration is reduced to prevent them from moving too close to the steering wheel on the driver's seat side or to the dashboard on the passenger's seat side. As a result, since ample distances are assured between the occupants and the steering wheel and between the occupants and the dashboard, the air bags can be deployed more effectively in the event of a subsequent frontal collision of the vehicle.

In addition, the intersecting value a at which the operation decision-making threshold line intersects the X axis representing the vehicle lateral acceleration is set larger than the intersecting value b at which the operation decision-making threshold line intersects the Y axis representing the vehicle longitudinal acceleration. Accordingly, the vehicle needs to accelerate along the lateral acceleration at a higher acceleration rate than along the longitudinal direction to activate the reversible seat belt tension application mechanism 7 to apply tension to the seat belt. As a result, tension is not applied to the seat belt every time a slight lateral acceleration occurs at the vehicle as the vehicle travels on a winding road or engages in a turning operation. Thus, the occupants are spared an unnecessary feeling of restriction.

In other words, in the fourteenth embodiment, the movement of the upper bodies of the occupants toward the front of the vehicle is effectively minimized during a vehicle deceleration and also, frequent tension application while the vehicle travels on a winding road or is engaged in a turning operation is avoided to lessen the feeling of restriction. Furthermore, since the operation decision-making threshold line 17q which includes a projection is utilized, the operation decision-making processing executed in the microcomputer is facilitated to lessen the onus on the microcomputer.

It is to be noted that the values a, b, and a' or the like described above in the embodiments are selected in an appropriate manner so that the occupant 5 is restrained firmly around the upper body by the seat belt 6 without feeling any discomfort or restriction when applying tension application to the seat belt 6 by the tension application mechanism 7. The values ΔGcr1, ΔGcr2 and Tout or the like are also selected in an appropriate manner so that tension application can be applied to the seat belt 6 at the desirable timing and the desirable tension amount. These values are selected based upon, for instance, the results obtained from drive_simulation.

It is to be noted that in the embodiments described above, a two-dimensional map in a two-dimensional orthogonal coordinate system, with the + side of one of the two axes, i.e., the Y axis, representing the longitudinal deceleration (the negative acceleration) of the vehicle, the − side of the axis representing the longitudinal acceleration of the vehicle, the + side of the other axis (the X axis) in the two-dimensional coordinate system representing the acceleration of the vehicle to the right and the − side of the axis representing the acceleration of the vehicle to the left, is used. In the embodiments, a semi-elliptic or polygonal operation decision-making threshold line connecting the +X axis intersecting point +a, the −X axis intersecting point −a and the +Y axis intersecting point +b is set within the range in the first and second quadrants of the map over which −a≦X≦a and 0≦Y≦b (a and b are arbitrary values satisfying b<a). However, the shape of the operation decision-making threshold line that may be adopted is not limited to the examples presented in the embodiments. For instance, the threshold line may forms a triangular shape achieved by connecting two sides at one inflection point.

In addition, while a semi-elliptic operation decision-making threshold line which includes a plurality of quadratic curves is set in some of the embodiments explained above, the operation decision-making threshold line may be set by using, for instance, exponential functions or parabolic functions instead of quadratic curves.

The occupant restraint systems achieved in any of the embodiments described above may likewise be adopted in the seat belt tension application control for rear seats in the vehicle 1.

It is to be noted that the vehicle in which the occupant restraint system according to the present invention is adopted may assume forms other than that illustrated in FIG. 1.

The above described embodiments are examples, various modifications can be made without departing from the spirit and scope of the invention.

The disclosures of the following priority applications are herein incorporated by reference:

Japanese Patent Application No. 2001-381193 filed Dec. 14, 2001

Japanese Patent Application No. 2002-279179 filed Sep. 25, 2002

What is claimed is:

1. An occupant restraint system, comprising:
a seat belt tension application device that adjusts tension applied to a seat belt to restrain an occupant with the seat belt;
a longitudinal acceleration detector that detects a longitudinal acceleration occurring in a vehicle along a longitudinal direction;
a lateral acceleration detector that detects a lateral acceleration occurring in the vehicle along a lateral direction; and
a control device that controls the tension applied by the seat belt tension application device based upon a longitudinal acceleration detection value detected by the longitudinal acceleration detector and a lateral acceleration detection value detected by the lateral acceleration detector, wherein:
a two-dimensional map, with a deceleration (negative acceleration) occurring in the vehicle along the longitudinal direction set on a + side of one of two axes orthogonally intersecting each other in a two-dimensional coordinate system, an acceleration of the vehicle manifesting along the longitudinal direction set on a − side of the one axis, an acceleration of the vehicle to a right set on a + side of the other axis in the two-dimensional coordinate system and an acceleration of the vehicle to a left set on a − side of the other axis, is provided;

an operation decision-making threshold line, which forms one of a semi-elliptic shape and a polygonal shape, intersects the other axis on the + side at A, intersects the other axis on the − side at −A and intersects the one axis on the + side at +B satisfying B<A, is set in a first quadrant and a second quadrant of the map; and the control device engages the seat belt tension application device to apply the tension to the seat belt if a point on the map determined in conformance to the longitudinal acceleration detection value and the lateral acceleration detection value obtained as the vehicle decelerates is outside a range enclosed by the operation decision-making threshold line and the other axis.

2. An occupant restraint system, comprising:

a seat belt tension application device that adjusts tension applied to a seat belt to restrain an occupant with the seat belt;

a longitudinal acceleration detector that detects a longitudinal acceleration occurring in a vehicle along a longitudinal direction;

a lateral acceleration detector that detects a lateral acceleration occurring in the vehicle along a lateral direction; and a control device that controls the tension applied by the seat belt tension application device based upon a longitudinal acceleration detection value detected by the longitudinal acceleration detector and a lateral acceleration detection value detected by the lateral acceleration detector, wherein:

an XY two-dimensional map, with a deceleration (negative acceleration) of the vehicle occurring along the longitudinal direction set on a +Y axis, an acceleration of the vehicle manifesting along the longitudinal direction set on a −Y axis, an acceleration of the vehicle to a right set on a +X axis and an acceleration of the vehicle manifesting to a left set on a −X axis, is provided;

a first operation decision-making threshold line, which forms one of a semi-elliptic shape and a polygonal shape, intersects the +X axis at A, intersects the −X axis at −A and intersects the +Y axis at +B satisfying B<A, is set in a first quadrant and a second quadrant of the map; and the control device engages the seat belt tension application device to apply the tension to the seat belt if a point on the map determined in conformance to the longitudinal acceleration detection value and the lateral acceleration detection value obtained as the vehicle decelerates is outside a range enclosed by the first operation decision-making threshold line and the X axis.

3. An occupant restraint system according to claim 2, wherein:

a rectilinear second operation decision-making threshold line satisfying X=−A and a rectilinear third operation decision-making threshold line satisfying X=A are respectively set in a third quadrant and a fourth quadrant of the map; and the control device engages the seat belt tension application device to apply the tension to the seat belt if the lateral acceleration detection value obtained as the vehicle accelerates is outside a range enclosed by the second operation decision-making threshold line and the third operation decision-making threshold line.

4. An occupant restraint system according to claim 3, wherein:

the seat belt tension application device adjusts the tension which is applied to the seat belt to restrain the occupant with the seat belt and a take-up speed with which the seat belt is taken up; and the control device controls the tension applied to the seat belt and the seat belt take-up speed based upon a time-varying rate ΔL of the longitudinal acceleration detection value and the lateral acceleration detection value after the point on the map determined in conformance to the longitudinal acceleration detection value and the lateral acceleration detection value moves out of a range enclosed by the first operation decision-making threshold line, the second operation decision-making threshold line and the third operation decision-making threshold line.

5. An occupant restraint system according to claim 4, wherein:

the control device compares the time-varying rate ΔL with preset threshold values ΔGcr1 and ΔGcr2 (ΔGcr1<ΔGcr2), (A) prohibits the tension from being applied to the seat belt if the time-varying rate ΔL is smaller than the threshold value ΔGcr1, (B) causes a first tension to be applied to the seat belt at a first take-up speed if the time-varying rate ΔL is equal to or larger than the threshold value ΔGcr1 and also is equal to or smaller than the threshold value ΔGcr2 and (C) causes a second tension higher than the first tension to be applied to the seat belt at a second take-up speed higher than the first take up speed if the time-varying rate ΔL is larger than the threshold value ΔGcr2.

6. An occupant restraint system according to claim 3, wherein:

a left-side seat map with the first operation decision-making threshold line and the third operation decision-making threshold line intersecting the +X axis at A' which is smaller than A and a right-side seat map with the first operation decision-making threshold line and the second operation decision-making threshold line intersecting the −X axis at −A' which is larger than −A are provided, and the control device implements tension application control for a seat belt at a left-side seat in the vehicle by using the left-side seat map and implements tension application control for a seat belt at a right-side seat by using the right-side seat map.

7. An occupant restraint system according to claim 3, wherein:

a release decision-making threshold line to be used when making a decision with regard to tension release at the seat belt is set further inward relative to the first operation decision-making threshold line, the second operation decision-making threshold line and the third operation decision-making threshold line on the map; and the control device releases the tension applied to the seat belt if a time-varying rate ΔL' of the longitudinal acceleration detection value and the lateral acceleration detection value becomes equal to or larger than a preset threshold value ΔGeject after the point on the map determined in conformance to the longitudinal acceleration detection value and the lateral acceleration detection value moves further inward relative to the release decision-making threshold line.

8. An occupant restraint system according to claim 7, wherein:
the control device releases the tension applied to the seat belt when a predetermined length of time Tout elapses after the point on the map determined in conformance to the longitudinal acceleration detection value and the lateral acceleration detection value moves further inward relative to the release decision-making threshold line, even if the time-varying rate ΔL' is still smaller than the threshold value ΔGeject.

9. An occupant restraint system according to claim 8, further comprising:
a vehicle speed detector that detects a vehicle speed, wherein:
the control device releases the tension applied to the seat belt once a vehicle speed detection value detected by the vehicle speed detector becomes equal to or smaller than a preset value Veject after the point on the map determined in conformance to the longitudinal acceleration detection value and the lateral acceleration detection value moves further inward relative to the release decision-making threshold line, even if the time-varying rate ΔL' is smaller than the threshold value ΔGeject and the predetermined length of time Tout has not elapsed.

10. An occupant restraint system according to claim 2, wherein:
the control device reduces the value B, at which the first operation decision-making threshold line intersects the +Y axis as the time-varying rate ΔL of the longitudinal acceleration detection value and the lateral acceleration detection value increases.

11. An occupant restraint system according to claim 2, further comprising:
a vehicle speed detector that detects a vehicle speed, wherein:
the control device sets a rectilinear fourth operation decision-making threshold line satisfying Y=B on the map instead of the first operation decision-making threshold line, the second operation decision-making threshold line and the third operation decision-making threshold line if a vehicle speed detection value detected by the vehicle speed detector is lower than a preset value and causes tension to be applied to the seat belt if the longitudinal acceleration detection value is outside the fourth operation decision-making threshold line.

12. An occupant restraint system according to claim 11, further comprising:
an operation detection device that detects that a vehicle behavior controller is engaged in operation; and
the control device makes a decision with regard to tension application to the seat belt by using the first operation decision-making threshold line, the second operation decision-making threshold line and the third operation decision-making threshold line on the map even when the vehicle speed detection value is lower than the present value if the operation detection device detects that the vehicle behavior controller is engaged in operation.

13. An occupant restraint system according to claim 2, further comprising:
a reverse operation detector that detects the vehicle is in reverse operation, wherein:
the control device stops tension application to a seat belt at a driver's seat if the reverse operation detector detects a reverse operation of the vehicle.

14. An occupant restraint system according to claim 13, wherein:
the reverse operation detector is a gear position detector that detects a gear position of a vehicle transmission, and
the control device stops tension application to the seat belt at the driver's seat if the gear position detector detects a reverse gear position.

15. An occupant restraint system according to claim 2, wherein:
the control device (A) sets the seat belt tension at a left-side seat in the vehicle higher than the seat belt tension at a right-side seat in the vehicle if the lateral acceleration detector detects an acceleration to the right occurring at the vehicle and (B) sets the seat belt tension at the right-side seat in the vehicle higher than the seat belt tension at the left-side seat in the vehicle if an acceleration to the left is detected at the vehicle.

16. An occupant restraint system according to claim 2, wherein:
hysteresis is achieved by adopting a condition for applying the tension and a condition for releasing the tension which are different from each other when applying the tension to the seat belt and releasing the tension from the seat belt based upon the longitudinal acceleration detection value and the lateral acceleration detection value.

17. An occupant restraint system according to claim 2, wherein:
the first operation decision-making threshold line adopts a shape achieved by connecting a plurality of quadratic curves at a plurality of inflection points.

18. An occupant restraint system according to claim 2, wherein:
the first operation decision-making threshold line adopts a shape achieved by connecting a plurality of sides at one or a plurality of inflection points.

19. An occupant restraint system according to claim 18, wherein:
the first operation decision-making threshold line adopts a shape with a projection.

20. A vehicle mounted with an occupant restraint system according to claim 2.

21. A vehicle according to claim 24, wherein:
the seat belt tension application device comprised in the occupant restraint system applies the tension to each seat belt to restrain occupants.

22. An occupant restraint system, comprising:
a seat belt tension application device that adjusts tension applied to a seat belt to restrain an occupant with the seat belt;
a longitudinal acceleration detector that detects a longitudinal acceleration occurring in a vehicle along a longitudinal direction;
a lateral acceleration detector that detects a lateral acceleration occurring in the vehicle along a lateral direction; and
a control device that controls the tension applied by the seat belt tension application device based upon a longitudinal acceleration detection value detected by the longitudinal acceleration detector and a lateral acceleration detection value detected by the lateral acceleration detector, wherein:

an XY two-dimensional map, with a deceleration (negative acceleration) of the vehicle occurring along the longitudinal direction set on a +Y axis, an acceleration of the vehicle occurring along the longitudinal direction set on a −Y axis, an acceleration of the vehicle to a right set on a +X axis and an acceleration of the vehicle to a left set on a −X axis, is provided;

an operation decision-making threshold line, which forms a substantial semi-elliptic shape achieved by connecting a plurality of quadratic curves at a plurality of inflection points intersects the +X axis at A, intersects the −X axis at −A and intersects the +Y axis at +B satisfying B<A, is set in a first quadrant and a second quadrant of the map; and the control device engages the seat belt tension application device to apply the tension to the seat belt if a point on the map determined in conformance to the longitudinal acceleration detection value and the lateral acceleration detection value obtained as the vehicle decelerates is outside a range enclosed by the semi-elliptic operation decision-making threshold line and the X axis.

23. An occupant restraint system, comprising:

a seat belt tension application device that adjusts tension applied to a seat belt to restrain an occupant with the seat belt;

a longitudinal acceleration detector that detects a longitudinal acceleration occurring in a vehicle along a longitudinal direction;

a lateral acceleration detector that detects a lateral acceleration occurring in the vehicle along a lateral direction; and a control device that controls the tension applied by the seat belt tension application device based upon a longitudinal acceleration detection value detected by the longitudinal acceleration detector and a lateral acceleration detection value detected by the lateral acceleration detector, wherein:

an XY two-dimensional map, with a deceleration (negative acceleration) of the vehicle occurring along the longitudinal direction set on a +Y axis, an acceleration of the vehicle occurring along the longitudinal direction set on a −Y axis, an acceleration of the vehicle to a right set on a +X axis and an acceleration of the vehicle to a left set on a −X axis, is provided;

an operation decision-making threshold line, which forms a polygonal shape achieved by connecting a plurality of sides at, at least, one inflection point intersects the +X axis at A, intersects the −X axis at −A and intersects the +Y axis at +B satisfying B<A, is set in a first quadrant and a second quadrant of the map; and the control device engages the seat belt tension application device to apply the tension to the seat belt if a point on the map determined in conformance to the longitudinal acceleration detection value and the lateral acceleration detection value obtained as the vehicle decelerates is outside a range enclosed by the polygonal operation decision-making threshold line and the X axis.

24. An occupant restraint system, comprising:

a seat belt tension application means for adjusting tension applied to a seat belt to restrain an occupant with the seat belt;

a longitudinal acceleration detection means for detecting a longitudinal acceleration occurring in a vehicle along a longitudinal direction;

a lateral acceleration detection means for detecting a lateral acceleration occurring in the vehicle along a lateral direction; and a control means for controlling the tension applied by the seat belt tension application means based upon a longitudinal acceleration detection value detected by the longitudinal acceleration detection means and a lateral acceleration detection value detected by the lateral acceleration detection means, wherein:

a two-dimensional map, with a deceleration (negative acceleration) occurring in the vehicle along the longitudinal direction set on a + side of one of two axes orthogonally intersecting each other in a two-dimensional coordinate system, an acceleration of the vehicle occurring along the longitudinal direction set on a − side of the one axis, an acceleration of the vehicle to a right set on a + side of the other axis in the two-dimensional coordinate system and an acceleration of the vehicle to a left set on a − side of the other axis, is provided;

an operation decision-making threshold line connecting an intersecting point +A at which the other axis is intersected on the + side, an intersecting point −A at which the other axis is intersected on the − side and an intersecting point +B satisfying B<A at which the one axis is intersected on the + side is set in a first quadrant and a second quadrant of the map; and the control means engages the seat belt tension application means to apply the tension to the seat belt if a point on the map determined in conformance to the longitudinal acceleration detection value and the lateral acceleration detection value obtained as the vehicle decelerates is outside a range enclosed by the operation decision-making threshold line and the other axis.

25. An occupant restraint method achieved by using a two-dimensional map, with a deceleration (negative acceleration) of a vehicle occurring along a longitudinal direction set on a + side of one of two axes orthogonally intersecting each other in a two-dimensional coordinate system, an acceleration of the vehicle occurring along the longitudinal direction set on a − side of the one axis, an acceleration of the vehicle to a right set on a + side of the other axis in the two-dimensional coordinate system and an acceleration of the vehicle to a left set on a − side of the other axis, in which a semi-elliptic or polygonal decision-making threshold line intersecting the other axis on the + side at A, intersecting the other axis on the − side at −A and intersecting the one axis on the + side at +B satisfying B<A is set, comprising:

detecting an acceleration of the vehicle occurring along the longitudinal direction;

detecting an acceleration of the vehicle occurring along the lateral direction; and applying tension to a seat belt so as to restrain an occupant when a point on the map determined in conformance to a longitudinal acceleration detection value and a lateral acceleration detection value obtained as the vehicle decelerates is outside a range enclosed by the operation decision-making threshold line and the other axis.

* * * * *